(12) United States Patent
Nigam et al.

(10) Patent No.: US 10,420,129 B2
(45) Date of Patent: Sep. 17, 2019

(54) SCHEDULING AND FEEDBACK METHOD AND APPARATUS IN MOBILE COMMUNICATION SYSTEM

(71) Applicant: Samsung Electronics Co., Ltd., Suwon-si, Gyeonggi-do (KR)

(72) Inventors: Anshuman Nigam, Bangalore (IN); Agiwal Anil, Bangalore (IN); Jungsoo Jung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 29 days.

(21) Appl. No.: 15/317,711

(22) PCT Filed: Jun. 25, 2015

(86) PCT No.: PCT/KR2015/006507
§ 371 (c)(1),
(2) Date: Dec. 9, 2016

(87) PCT Pub. No.: WO2015/199469
PCT Pub. Date: Dec. 30, 2015

(65) Prior Publication Data
US 2017/0111925 A1  Apr. 20, 2017

(30) Foreign Application Priority Data
Jun. 25, 2014 (KR) .......................... 10-2014-0078359

(51) Int. Cl.
*H04W 72/12* (2009.01)
*H04W 72/04* (2009.01)
(Continued)

(52) U.S. Cl.
CPC ....... *H04W 72/1268* (2013.01); *H04L 1/1614* (2013.01); *H04L 1/1635* (2013.01);
(Continued)

(58) Field of Classification Search
None
See application file for complete search history.

(56) References Cited

U.S. PATENT DOCUMENTS 8,855,042 B2 * 10/2014 Yuan ..................... H04L 1/1854
370/279
2005/0276266 A1 * 12/2005 Terry ..................... H04L 1/0003
370/394
(Continued)

FOREIGN PATENT DOCUMENTS

WO 2011/040788 A2 4/2011
WO 2012/150793 A2 11/2012
(Continued)

*Primary Examiner* — Eunsook Choi
(74) *Attorney, Agent, or Firm* — Jefferson IP Law, LLP

(57) ABSTRACT

The present disclosure relates to a 5G or pre-5G communication system which will be provided in order to support a higher data transmission rate than a 4G communication system such as LTE. In addition, a method for transmitting and receiving signals in a terminal of a mobile communication system, according to one embodiment of the present specification, comprises the steps of: receiving, from a base station, control information including scheduling information about a plurality of subframes; transmitting data to the base station or receiving data from the base station through resources decided based on the control information; and receiving, from the base station, feedback information about the transmitted data, or transmitting, to the base station, feedback information about the received data. According to one embodiment of the present specification, there is an effect of reducing overhead of a base station, a resource and a channel according to resource allocation by performing, at one time, resource allocation for a plurality of transmission time intervals. In addition, communication efficiency is increased by performing, in one subframe, resource allocation for one or more transmission time intervals, and when (Continued)

feedback thereon is received, performing an operation for each of a plurality of processes.

16 Claims, 36 Drawing Sheets

(51) Int. Cl.
  *H04L 1/16* (2006.01)
  *H04L 1/18* (2006.01)
(52) U.S. Cl.
  CPC .......... *H04L 1/1822* (2013.01); *H04L 1/1835* (2013.01); *H04L 1/1887* (2013.01); *H04W 72/0446* (2013.01); *H04W 72/1289* (2013.01)

(56) References Cited

U.S. PATENT DOCUMENTS

| | | | |
|---|---|---|---|
| 2011/0064061 A1* | 3/2011 | Takeuchi | H04L 1/1822 370/336 |
| 2012/0218963 A1 | 8/2012 | Kim et al. | |
| 2013/0016686 A1* | 1/2013 | Li | H04L 1/1822 370/329 |
| 2013/0322413 A1* | 12/2013 | Pelletier | H04W 72/1289 370/336 |
| 2013/0343313 A1* | 12/2013 | Takeda | H04L 5/001 370/329 |
| 2014/0071929 A1 | 3/2014 | Seo et al. | |
| 2015/0043473 A1 | 2/2015 | Kim et al. | |
| 2015/0085797 A1* | 3/2015 | Ji | H04J 3/16 370/329 |
| 2015/0373737 A1 | 12/2015 | Park | |

FOREIGN PATENT DOCUMENTS

| | | |
|---|---|---|
| WO | 2013/022267 A2 | 2/2013 |
| WO | 2013/141582 A1 | 9/2013 |
| WO | 2013/191498 A1 | 12/2013 |

* cited by examiner

SCHEDULING AND FEEDBACK METHOD AND APPARATUS IN MOBILE COMMUNICATION SYSTEM

TECHNICAL FIELD

Embodiments of the present disclosure relate to a method and an apparatus for scheduling a number of transmission time intervals in a mobile communication system and receiving feedback according to the scheduling. More specifically, the present invention relates to a method and an apparatus for allocating transmission resources to a number of transmission time intervals on a downlink control channel and performing the transmission of feedback as to whether transmitted data has been successfully received within the allocated interval.

BACKGROUND ART

Mobile communication systems have been developed to provide a communication service to users while they are moving. With the rapid development of technology, mobile communication systems have been developed to provide data communication services at a high speed as well as voice communication.

In order to meet the increase in the demand for wireless data traffic after the commercialization of 4G communication systems, considerable effort has been made to develop pre-5G communication systems or improved 5G communication systems. This is one reason why '5G communication systems' or 'pre-5G communication systems' are called 'beyond 4G network communication systems' or 'post LTE systems.'

In order to achieve a high data transmission rate, 5G communication systems are being developed to be implemented in a band of extremely high frequency, or millimeter wave (mmWave), e.g., a band of 60 GHz. In order to reduce the occurrence of stray electric waves in a band of extremely high frequency energy and to increase the transmission distance of electric waves in 5G communication systems, various technologies being explored, for example: beam-forming, massive MIMO, Full Dimensional MIMO (FD-MIMO), array antennas, analog beam-forming, large scale antennas, etc.

In order to improve system networks for 5G communication systems, various technologies have been developed, e.g.: evolved small cell, advanced small cell, cloud radio access network (cloud RAN), ultra-dense network, Device to Device communication (D2D), wireless backhaul, moving network, cooperative communication, Coordinated Multi-Points (CoMP), interference cancellation, etc.

In addition, for 5G communication systems, other technologies have been developed, e.g., Hybrid FSK and QAM Modulation (FQAM) and Sliding Window Superposition Coding (SWSC), as Advanced Coding Modulation (ACM), Filter Bank Multi Carrier (FBMC), non-orthogonal multiple access (NOMA), sparse code multiple access (SCMA), etc.

Meanwhile, unlike voice services, data services are allocated resources, etc., depending on a channel status and an amount of data to be transmitted. In wire communication systems such as mobile communication systems, schedulers perform transmission resource management, such as allocation of transmission resources, etc., considering the amount of resources for transmission, the channel status, the amount of data, etc. These are also carried out in the same manner as LTE as one of the next generation mobile communication systems, and a scheduler located in a base station may manage and allocate wireless transmission resources.

Mobile communication systems have been developed to provide voice call services, supporting users' mobility. With the development of communication technology, mobile communication systems have recently been evolved to such an extent that they provide data communication services at a high data transfer rate. However, as mobile communication systems evolve to provide more various services, they face lack of resources and users' demands for high speed data services. Therefore, the development of more advanced mobile communication systems is required.

In order to meet the demand, Long Term Evolution (LTE) that has been developed as a next generation mobile communication system is in process of standardization by the 3rd Generation Partnership Project (3GPP). LTE is a technology that is being developed to be commercialized in about 2010, implementing high speed packet-based communication with a transmission rate of maximum 100 Mbps. To this end, various proposals have been discussed. For example, a scheme has been proposed to reduce the number of nodes on communication paths by simplifying network architecture. Another scheme has been proposed to apply wireless protocols to wireless channels as close as possible.

Communication systems include: a downlink (DL) transmitting signals from transmission points, such as Base Stations (BSs) or NodeBs, to User Equipments (UEs, terminals); and an uplink (UL) transmitting signals from UEs to reception points such as NodeBs. User Equipment (UE) is also referred to as a mobile station. The UE or a mobile station is fixed or mobile. Examples of the UE or a mobile station are a mobile phone, a personal computer, etc. NodeB is referred to as a fixed station or an access point. NodeB may also be called any other name equivalent thereto.

DL signals include: data signals containing information content, control signals, and Reference Signal (RSs) known as pilot signals. A NodeB transmits, to UEs, information on data via Physical Downlink Shared Channels (PDSCHs), and control information via Physical Downlink Control Channels (PDCCHs). UL signals include: data signals, control signals, and RSs. The UEs transmit, to NodeBs, information on data via Physical Uplink Shared Channels (PUSCHs), and control information via Physical Uplink Control Channels (PUCCHs). A UE may also transmit data information and control information via the PUSCH.

The LTE system, as a typical example of the broadband wireless communication systems, employs Orthogonal Frequency Division Multiplexing (OFDM) on the downlink and Single Carrier-Frequency Division Multiple Access (SC-FDMA) on the uplink. The multiple access scheme performs allocation and management of time-frequency resources to carry data and control information according to users, so as not to overlap with each other, i.e., so as to achieve orthogonality between them, thereby distinguishing data or control information between respective users.

The LTE system employs a Hybrid Automatic Repeat reQuest (HARQ) scheme for retransmitting data, which has failed in decoding in the initial transmission, via the physical layer. HARQ is a scheme that allows a receiver to transmit, when not correctly decoding data from a transmitter, information (NACK) indicating the decoding failure to the transmitter so that the transmitter can perform re-transmission of the data from the physical layer. The receiver combines the data re-transmitted from the transmitter with the existing data for which decoding has failed, thereby increasing the capability of data reception. When correctly decoding data, the receiver transmits information (ACK) indicating the success of decoding to the transmitter so that the transmitter can perform transmission of new data.

In broadband wireless communication systems, one of the important factors in providing high transmission rate wireless data services is the ability to support scalable bandwidths. For example, LTE systems are capable of supporting various bandwidths, such as 20/15/10/5/3/1.4 MHz, etc. Therefore, service providers are capable of selecting a particular one of the various bandwidths and providing services via the bandwidth. There are various types of User Equipments (terminals) that are capable of supporting bandwidths from a minimum of 1.4 MHz to a maximum of 20 MHz.

LTE-Advanced (LTE-A) systems, aiming to provide a level of service for IMT-Advanced requirements, are capable of providing services in broadband up to a maximum of 100 MHz, by carrier-aggregating LTE carriers. LTE-A systems require a band broader than that of LTE systems for high-speed data transmission. In addition, LTE-A systems need to allow for the backward compatibility with LTE terminals, so that the LTE terminals can access and receive the services of the LTE-A systems. To do this, LTE-A systems divide the entire system bandwidth into sub-bands or component carriers (CC), through which the LTE terminals are capable of transmission or reception, and aggregate part of the component carriers. LTE-A systems are capable of creating data according to respective component carriers and performing the transmission of the created data. LTE-A systems are capable of high speed data transmission through the transmission/reception processes of the legacy LTE systems used according to the respective component carriers.

In recent years, a method of transmitting signal via a femto-NodeB has been proposed in order to provide a UE with services in a confined space, such as an indoor space of a building. When the femto-NodeB performs the transmission of signals, the channel status may differ from that of a macro base station. Therefore, the femto-NodeB needs a transmission method and apparatus to meet the channel status.

DISCLOSURE OF INVENTION

Technical Problem

The present invention has been made to address the above problems and disadvantages, and to provide at least the advantages described below. Accordingly, various embodiments of the present invention provide a method and apparatus that is capable of scheduling the allocation of resources to a terminal, simultaneously or once, for a number of transmission time intervals, in a mobile communication system, and transmitting/receiving feedback containing an HARQ according to the scheduling results. More specifically, various embodiments of the present invention provide a method of allocating transmission resources in a number of transmission time intervals, and a method and apparatus of performing the transmission/reception of uplink and downlink HARQ according to the allocation of transmission resources.

Solution to Problem

In accordance with an aspect of the present invention, a method for a terminal to perform the transmission/reception of signals in a mobile communication system is provided. The method includes: receiving control information containing scheduling information regarding a number of subframes from a base station; transmitting or receiving data to or from the base station, via resources determined based on the control information; and receiving feedback information regarding the transmitted data from the base station or transmitting feedback information regarding the received data to the base station. In accordance with another aspect of the present invention, a method for a base station to perform the transmission/reception of signals in a mobile communication system is provided. The method includes: transmitting control information containing scheduling information regarding a number of subframes to a terminal; transmitting or receiving data to or from the terminal, via resources determined based on the control information; and receiving feedback information regarding the transmitted data from the terminal or transmitting feedback information regarding the received data to the terminal.

In accordance with another aspect of the present invention, a terminal of a mobile communication system is provided. The terminal includes: a transceiver for transmitting/receiving signals to/from a base station; and a controller for: controlling the transceiver; receiving control information containing scheduling information regarding a number of subframes from the base station; transmitting or receiving data to or from the base station, via resources determined based on the control information; and receiving feedback information regarding the transmitted data from the base station or transmitting feedback information regarding the received data to the base station.

In accordance with another aspect of the present invention, a base station of a mobile communication system is provided. The base station includes: a transceiver for transmitting/receiving signals to/from a terminal; and a controller for: controlling the transceiver; transmitting control information containing scheduling information regarding a number of subframes to the terminal; transmitting or receiving data to or from the terminal, via resources determined based on the control information; and receiving feedback information regarding the transmitted data from the terminal or transmitting feedback information regarding the received data to the terminal.

Advantageous Effects of Invention

Embodiments of the present invention are capable of allocating resources for a number of transmission time intervals, simultaneously or once, thereby reducing the overhead in channels, resources and base stations, according to the resource allocation. Embodiment of the present invention are capable of allocating resources for one or more transmission time intervals on one subframe, and performing operations corresponding to a number of processes, respectively, when receiving feedback regarding the allocation result, thereby increasing the communication efficiency.

MODE FOR THE INVENTION

Figure 1:
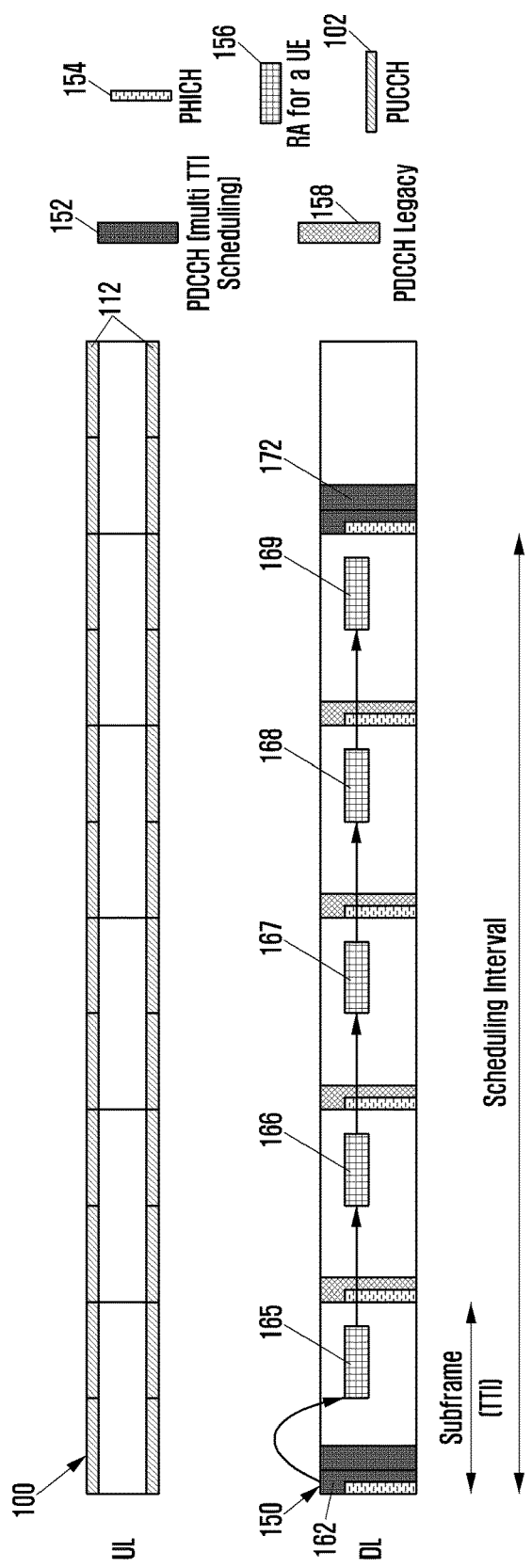
FIG. 1 shows uplink and downlink subframes according to an embodiment of the present disclosure.

Embodiments of the present invention are described in detail referring to the accompanying drawings.

Descriptions of functions and structures which are well-known to those skilled in the art and are not directly related to the present invention may be omitted. This is to make the subject matter of the present invention clear and to avoid obscuring it.

Although the drawings represent an embodiment of the invention, the drawings are not necessarily to scale and certain features may be exaggerated or omitted in order to better illustrate and explain the invention. The same reference numbers are used throughout the drawings to refer to the same or similar parts.

The features and advantages of the invention and the method to achieve them will become more apparent from the following detailed description in conjunction with the accompanying drawings. It will be easily appreciated to those skilled in the art that various modifications are possible from the embodiments of the invention that are illustrated and described in detail in the following description, and the scope of the invention should not be limited to the following embodiments. The present invention is defined as in the appended claims. In the description, the same elements are denoted by the same reference numbers.

In addition, it should be understood that the blocks, processes and operations and a combination thereof, in the flowcharts, can be performed via computer programming instructions. These computer programming instructions can be installed to processors of data processing equipment that can be programmed, special computers, or universal computers. The instructions, performed via the processors of data processing equipment or the computers, can generate means that perform functions described in a block (blocks) of the flow chart. In order to implement functions in a particular mode, the computer programming instructions can also be stored in a computer available memory or computer readable memory that can support computers or data processing equipment that can be programmed. Therefore, the instructions, stored in the computer available memory or computer readable memory, can be installed to the products, and perform the functions therein, described in the blocks of the flow chart therein. In addition, since the computer programming instructions can also be installed to computers or data processing equipment that can be programmed, they can create processes that perform a series of operations therein, described in the blocks of the flow chart therein.

The blocks of the flow chart refer to part of codes, segments or modules that include one or more executable instructions to perform one or more logic functions. It should be noted that the functions described in the blocks of the flow chart may be performed in a different order from the embodiments described above. For example, the functions described in two adjacent blocks may be performed at the same time or in reverse order.

In the embodiments, the terminology, component '~unit,' refers to a software element or a hardware element such as a field programmable gate array (FPGA), an application specific integrated circuit (ASIC), etc., and performs a corresponding function. It should be, however, understood that the component '~unit' is not limited to a software or hardware element. The component '~unit' may be implemented in storage media that can be designated by addresses. The component '~unit' may also be configured by one or more processors. For example, the component '~unit' may include various types of elements (e.g., software elements, object-oriented software elements, class elements, task elements, etc.), segments (e.g., processes, functions, achievements, attributes, procedures, sub-routines, program codes, etc.), drivers, firmware, micro-codes, circuit, data, data base, data structures, tables, arrays, variables, etc. Functions provided by elements and the components '~units' may be formed by combining the small number of elements and components '~units' or may be divided into additional elements and components '~units.' In addition, elements and components '~units' may also be implemented by one or more central processor units (CPUs) in devices or security multi-cards.

In embodiments of the present disclosure, a small cell including a femto-cell has channels whose states may differ from those of the channels of a macro-cell. More specifically, a small cell may have a channel coherence time and a coherence bandwidth greater than those of a macro-base station, respectively. A small cell may have a number of users in its coverage area, which is less than the number of users in the coverage area of a macro-base station, and thus may more flexibly perform the scheduling procedure than a macro-cell does. When a terminal uses a number of Transmission Time Intervals (TTIs), it needs to process heavy data traffic. In the following description, embodiments may employ one or more subframes for TTI. Therefore, a synchronous hybrid Automatic Repeat request (HARQ) may be applied to uplink and downlink.

Embodiments of the present disclosure are capable of performing Multi Subframe Scheduling (MSS) in a specified channel environment. When MSS is performed, this may reduce the overhead transmitting control signals for the allocation of resources. More specifically, scheduling information regarding a number of subframes is transmitted once, and this may reduce the overhead related to the allocation of resources.

In order to perform MSS, resource allocation, ACK/NACK transmission, New Data Indicator (NDI) transmission, and transmission and retransmission of Redundancy Version (RV) are required.

FIG. 1 shows uplink and downlink subframes according to an embodiment of the present disclosure.

With reference to FIG. 1, a base station and terminal perform the transmission/reception via an uplink 100 and downlink 150 wireless resources.

In the embodiment, a TTI corresponds to one subframe, and a Scheduling Interval (SI) is configured to include a number of subframes. In the embodiment, an SI is configured to include a total of 5 TTIs. The following embodiments of the present disclosure employ a specified length of TTI and a specified length of SI; however, the lengths of TTI and SI are just examples and thus they may be selectively set to any other lengths according to embodiments.

Reference number 112 is Physical Uplink Control Channel (PUCCH); reference number 152 is Physical Downlink Control Channel (PDCCH) for scheduling a number of TTIs; reference number 154 is Physical Hybrid ARQ Indicator Channel (PHICH); reference number 156 is Resource Allocation (RA) for the terminal; and reference number 158 is a PDCCH resource area corresponding to a legacy subframe structure. The diagram showing the individual resource areas may be commonly applied to all the embodiments of the present disclosure.

The PDCCH may contain information related to areas of allocated resources and successively scheduled subframe numbers. The PDCCH may also contain information related to the format of an NDI transmitted by the base station or feedback method of transmitted/received information. More specifically, the PDCCH may contain: an indicator showing whether feedback is performed according to processes or for the entire process contained in an SI; and an indicator whether NDIs indicate new data according to individual processes or for the entire process contained in an SI.

The uplink wireless resource 100 is capable of transmitting PUCCH 112 via both ends of a frequency domain, through which control information is transmitted from the terminal to the base station.

Scheduling information for the terminal may be transmitted from the base station to the terminal on PDCCH area, indicated by reference number 162, during the SI. Resource areas, indicated by reference numbers 165 to 169, may be allocated for the transmission of data to the terminal, based on the scheduling information. In the embodiment, resource allocation information may be transmitted on PDCCH 162 of the first subframe of the SI in the MSS. When the resource allocation information is transmitted via only the first subframe, at least one of the following: another control information, reference signal and data may be transmitted on another area of the PDCCH in the SI. In addition, the PDCCH including resource allocation information may be transmitted via only the first subframe of the SI. In addition, the area, indicated by reference number 158, may not transmit control information or may transmit additional data. In another embodiment, the area, indicated by reference number 158, may also transmit a signal containing the same content.

Feedback information in response to data received by the terminal may be transmitted via part of the PUCCH 112. In addition, control information for the transmission/reception of signals between the base station and terminal may also be transmitted via the PUCCH 112.

In the embodiment, feedback in response to the transmission of uplink data may be transmitted on PHICH area 154. In addition, PHICH may also be transmitted every SI or via one subframe selected during the SI. In the following embodiments, various methods and apparatuses for operating the nodeB are provided.

Figure 2:
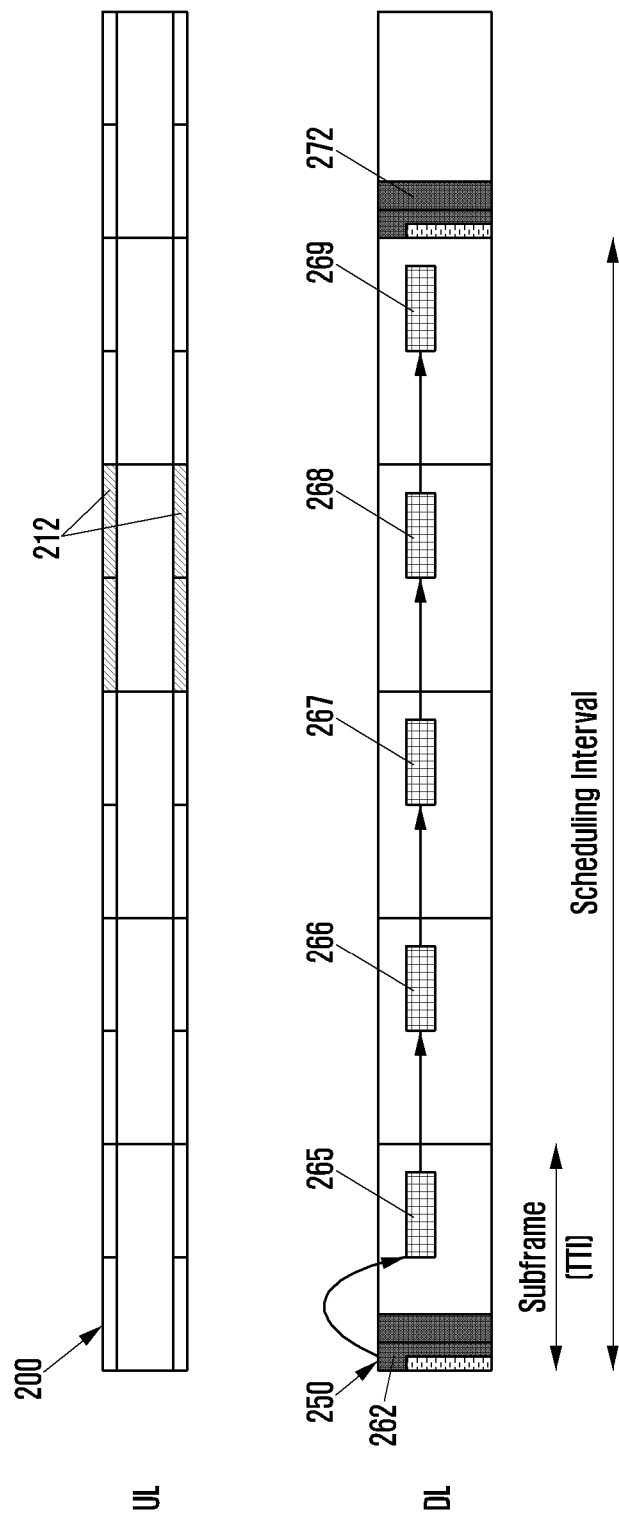
FIG. 2 shows uplink and downlink subframes according to another embodiment of the present disclosure.

FIG. 2 shows uplink and downlink subframes according to another embodiment of the present disclosure.

With reference to FIG. 2, a base station and terminal perform the transmission/reception via an uplink 200 and downlink 250 wireless resources.

In the embodiment, a TTI corresponds to one subframe, and a Scheduling Interval (SI) is configured to include a number of subframes. In the embodiment, an SI is configured to include a total of 5 TTIs.

In the embodiment, terminal scheduling information may be transmitted via a subframe of an SI on PDCCH 262 of the first subframe of the SIs, and data may thus be transmitted via the next subframe resource allocation areas 265 to 269. The scheduling information regarding the next SI may be transmitted on PDCCH 272. The following embodiments of the present disclosure employ a specified length of TTI and a specified length of SI; however, the lengths of TTI and SI are just examples and thus they may be selectively set to any other lengths according to embodiments.

In the embodiment shown in FIG. 2, the terminal is capable of transmitting feedback information in response to downlink data via part 212 of the PUCCH. The feedback may be transmitted by at least one of the following: a method of simultaneously transmitting feedback regarding the entire SI, a method of transmitting feedback corresponding to a specified process and a method of transmitting feedback information corresponding to each subframe resource allocation area in the bitmap format. Another data signal and/or another control signal may be transmitted via a PUCCH area on which feedback information is not transmitted.

In the embodiment shown in FIG. 2, PHICH and PUCCH may be transmitted via only one subframe of the SIs, and thus Round Trip Time (RTT) may increase.

Figure 3:
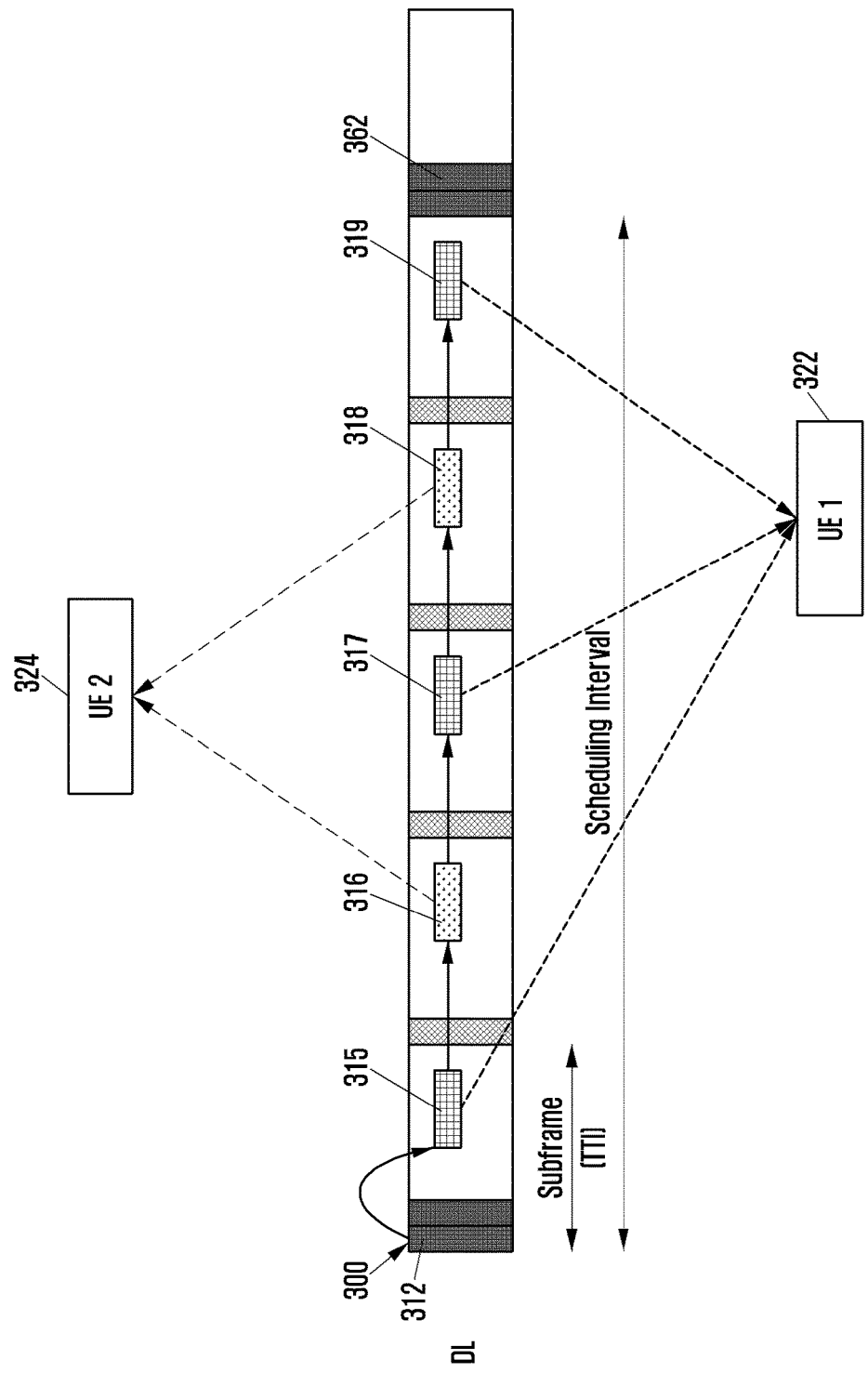
FIG. 3 shows a structure of a downlink subframe scheduled for a number of terminals according to an embodiment of the present disclosure.

FIG. 3 shows a structure of a downlink subframe scheduled for a number of terminals according to an embodiment of the present disclosure.

With reference to FIG. 3, a base station and terminal perform the transmission/reception via a downlink wireless resource 300. The downlink is received by the first terminal 322 and the second terminal 324 selectively.

In the embodiment, a TTI corresponds to one subframe, and a Scheduling Interval (SI) is configured to include a number of subframes. In the embodiment, an SI is configured to include a total of 5 TTIs.

PDCCH 312 may include scheduling information regarding individual terminals. More specifically, the scheduling information may contain: information regarding resource transmission areas 315 to 319 for a terminal in SIs; and control information representing individual transmission areas allocated to terminals. The control information may contain information specifying individual resource allocation areas of the SIs, allocated to the terminals. More specifically, the control information may contain bitmaps indicating subframes allocated to the terminals, respectively. In the embodiment, the first terminal 322 (also called terminal 1) is capable of receiving a bitmap, e.g., 10101, as information related to a resource allocation area, and the second terminal 324 (also called terminal 2) is capable of receiving a bitmap, e.g., 01010, as information related to a resource allocation area.

As described above, scheduling information is transmitted once during the SI, and a data area to be transmitted to the scheduled areas may be divided and transmitted to a number of terminals.

In the embodiment, information regarding resource blocks (RBs) related to scheduling information may be transmitted once during one SI. More specifically, indexes of allocated RB(s) may be transmitted.

Alternatively, when allocation information specifying subframes corresponding to a number of terminals is transmitted, the terminals may simultaneously receive divided parts of a data area transmitted during the SI.

Individual terminals are capable of transmitting feedback information regarding the received information to the base station. Individual terminals are also capable of transmitting, to the base station, information containing indexes of subframes failing or succeeding in reception. In this case, the base station may perform the re-transmission based on the received information.

In order to transmit control information, a legacy downlink control information (DCI) format or a new DCI format may be defined.

Although it is not shown, feedback information regarding uplink data may be transmitted via PHICH, and PHICH may be transmitted on a part of the area of the entire subframe or part of the subframes selected from the SI.

Figure 4:
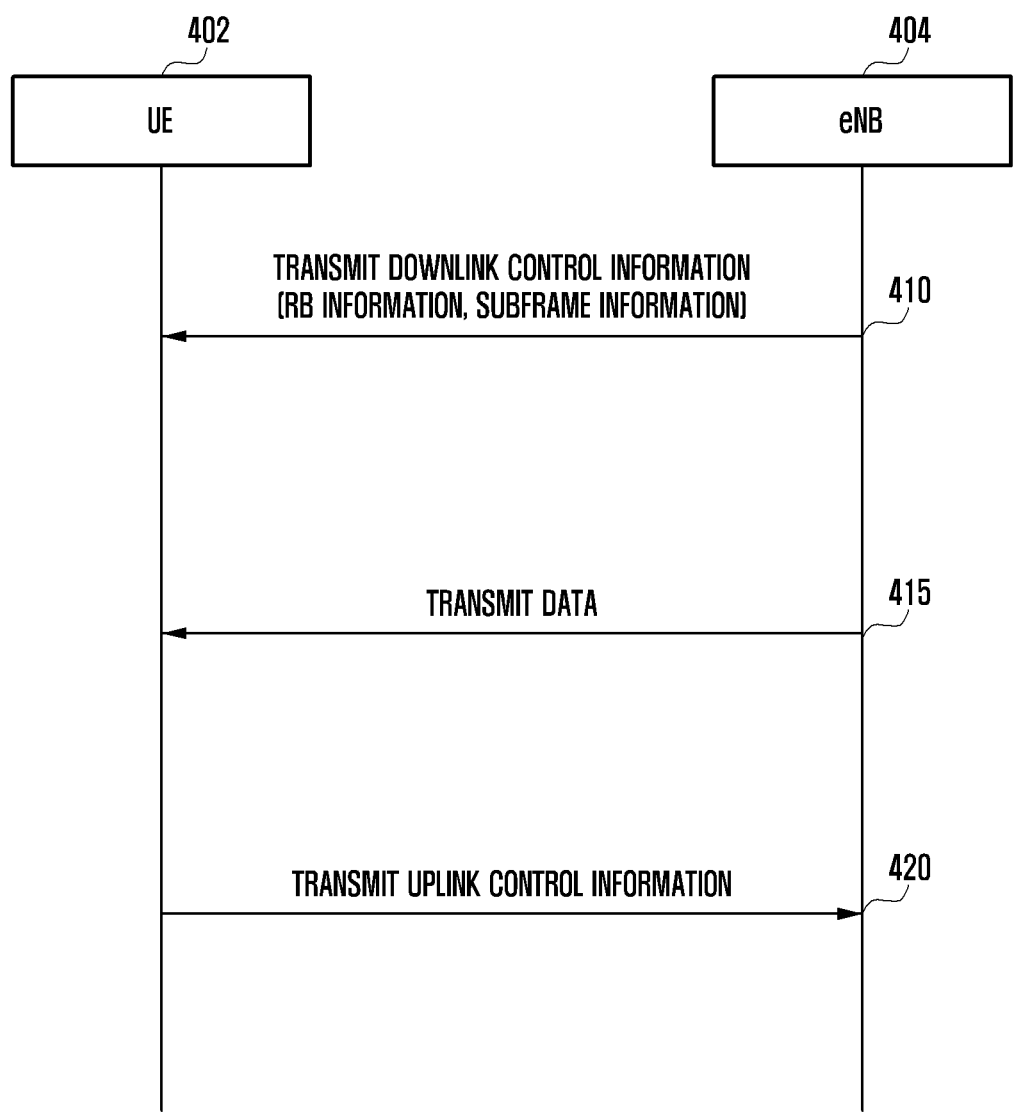
FIG. 4 is a flow diagram that describes a method of performing the transmission/reception of signals between a base station and terminal according to an embodiment of the present disclosure.

FIG. 4 is a flow diagram that describes a method of performing the transmission/reception of signals between a base station and terminal according to an embodiment of the present disclosure.

With reference to FIG. 4, a terminal 402 and base station 404 perform the transmission/reception of signals to/from each other. More specifically, when the base station 404 transmits, to the terminal 402, control information regarding MSS and the corresponding data, the terminal 402 transmits, to the base station 404, uplink control information containing feedback in response to the information and data received from the base station 404.

The base station 404 is capable of transmitting downlink control information to the terminal 402 in operation 410. More specifically, the base station 404 transmits scheduling information regarding the MSS to the terminal 402. The scheduling information may contain information related to RBs allocated to the terminal and/or information regarding subframes allocated to the terminal. The subframe information may contain a bitmap specifying a subframe allocated to a corresponding terminal, from among the subframes transmitted during one SI. The downlink control information may also contain scheduling information that the terminal uses to transmit uplink data.

The base station 404 is capable of transmitting, to the terminal 402, data based on the scheduling information in operation 415. The data may be transmitted to a number of terminals. Subframes transmitting data, except for the first subframe, may not contain scheduling information.

The terminal 402 is capable of transmitting uplink control information to the base station 404 in operation 420. More specifically, the terminal 402 is capable of transmitting feedback information in response to the received data to the base station 404. The feedback information may contain information indicating whether the terminal 402 succeeds in receiving at least one of a number of subframes.

Alternatively, the terminal may perform the uplink transmission, based on scheduling information regarding the transmission of the uplink data received in operation 410. The scheduling information regarding the transmission of the uplink data may also be created in a unit of SI.

After that, the base station 404 may perform the re-transmission or the transmission of new data, based on the received uplink control information. The terminal 402 and base station 404 may exchange feedback information regarding the transmission of uplink data or downlink data with each other.

Figure 5:
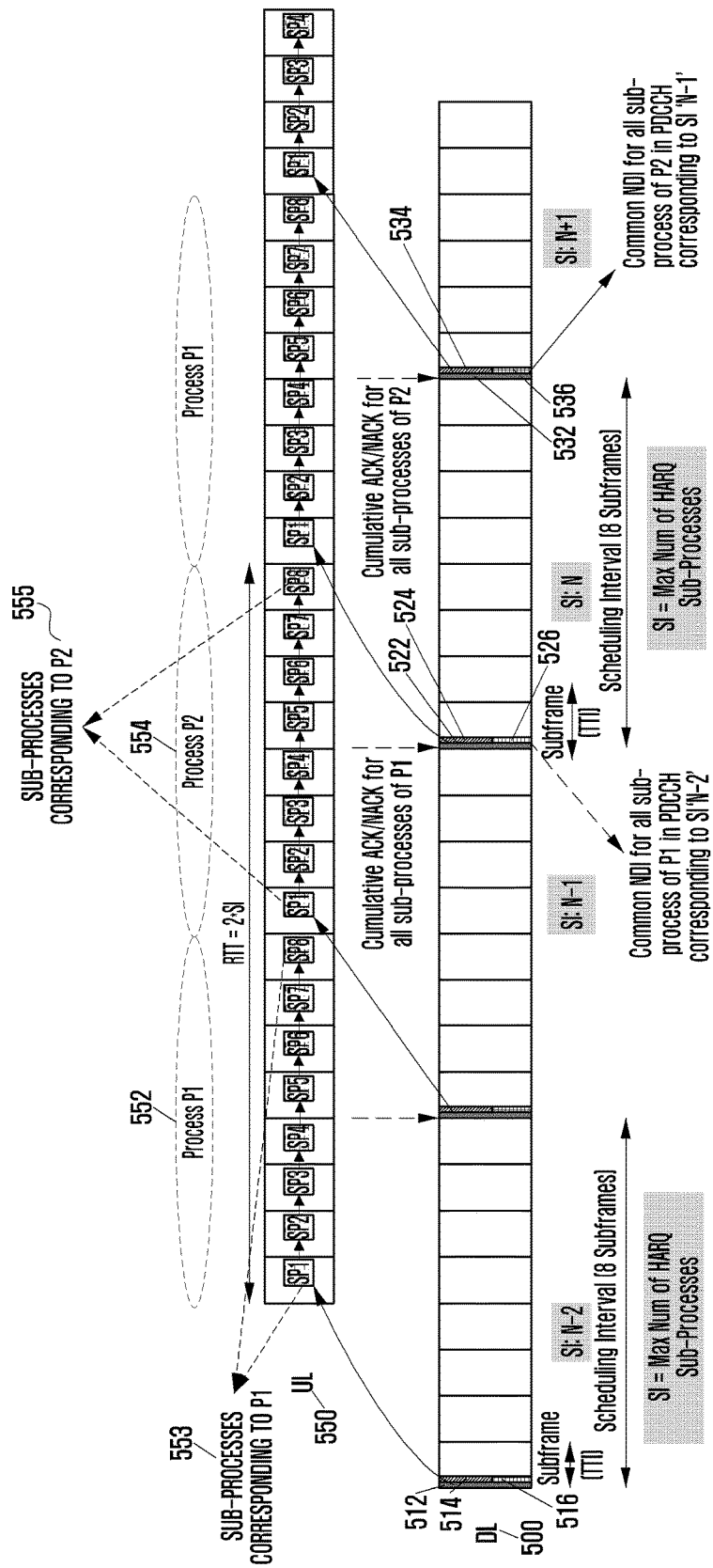
FIG. 5 is a structure of a subframe for an uplink hybrid automatic repeat request (HARQ) according to a first embodiment of the present disclosure.

FIG. 5 is a structure of a subframe for an uplink hybrid automatic repeat request (HARQ) according to a first embodiment of the present disclosure.

With reference to FIG. 5, a terminal is capable of transmitting, to a base station, data via an uplink channel 550 and receiving, from the base station, the feedback information via a downlink channel 500.

In the embodiment, one process corresponds to a length of SI and may be configured to include eight subframes. The number of subframes configuring one process may be set to any other value according to embodiments.

In the embodiment, the transmission of uplink 550 may be performed via first process 552 and second process 554. More specifically, these processes may be sequentially performed for the transmission. Each of the processes may contain at least one sub-process. Each sub-process may be transmitted on one subframe. One process may contain sub-processes corresponding to the number of SIs. The uplink transmission is performed via two processes, and thus an RTT may be twice the length of SI. In the embodiment, the SI may correspond to a maximum number of HARQs for sub-processes. HARQs may be performed, corresponding to individual processes.

In the embodiment, the downlink 500 indicates details related to the uplink transmission, and may transmit control information or data information in the description where it does not include an additional explanation. Downlink control information, containing at least one of the following: PHICHs 512, 522, and 532, PDCCHs 514, 524, and 534 or NDIs 516, 526, and 536, may be transmitted via the first subframe of each SI.

The uplink transmission of a first process 522 may be performed according to uplink scheduling information allocated on PDCCH 514. The transmission of a second process 554 may be performed according to uplink scheduling information allocated on PDCCH 524 of the next SI.

Feedback Ack/Nack information, accumulated to the transmission of uplink data in all the sub-processes of the first process 552, is transmitted via PHICH 532. Feedback Ack/Nack information, accumulated to the transmission of uplink data in all the sub-processes of the second process 554, is transmitted via PHICH 532. When at least any one of the sub-processes has a reception result of Nack, the accumulated Ack/Nack information may be transmitted by a method of transmitting Nack for the entire sub-process or a bitmap corresponding to the Ack/Nack result of each sub-process may be transmitted.

The transmission result for all the sub-processes included in the entire first process 552 may be transmitted via NDI 526. The transmission result for all the sub-processes of the second process 554 may be transmitted via NDI 536. When at least any one of the sub-processes is not an NDI, the NDI may not be triggered. Alternatively, a bitmap corresponding to each sub-process may be transmitted by an additional method.

In the embodiment, uplink scheduling information corresponding to the uplink process may be transmitted on a specified subframe of the downlink. More specifically, the resource allocation for all the sub-processes included in the uplink process may be performed on the first PDCCH of the SI.

In the embodiment, NDIs may be created according to processes. More specifically, an NDI of the uplink transmitted in the N-2nd SI may be transmitted via a specified subframe of the downlink corresponding to the Nth process, and the same NDI corresponding to all the sub-processes included in each process may be transmitted. Therefore, an NDI may be determined based on the uplink transmission of the previous process.

HARQ feedback may also be performed according to processes. More specifically, Ack/Nack of the uplink transmitted in the N-2nd SI may be transmitted via a specified subframe of the downlink corresponding to the Nth process, and feedback in response to data transmitted in all the sub-processes included in each process may be transmitted simultaneously. Therefore, an Ack/Nack may be determined based on the uplink transmission of the previous process.

In the embodiment, one process may be related to one or more transmissions per SI.

Individual sub-processes may be successively configured in a process. In this case, the uplink transmission is performed via two processes, and thus an RTT may be twice the value of a legacy RTT.

Figure 6:
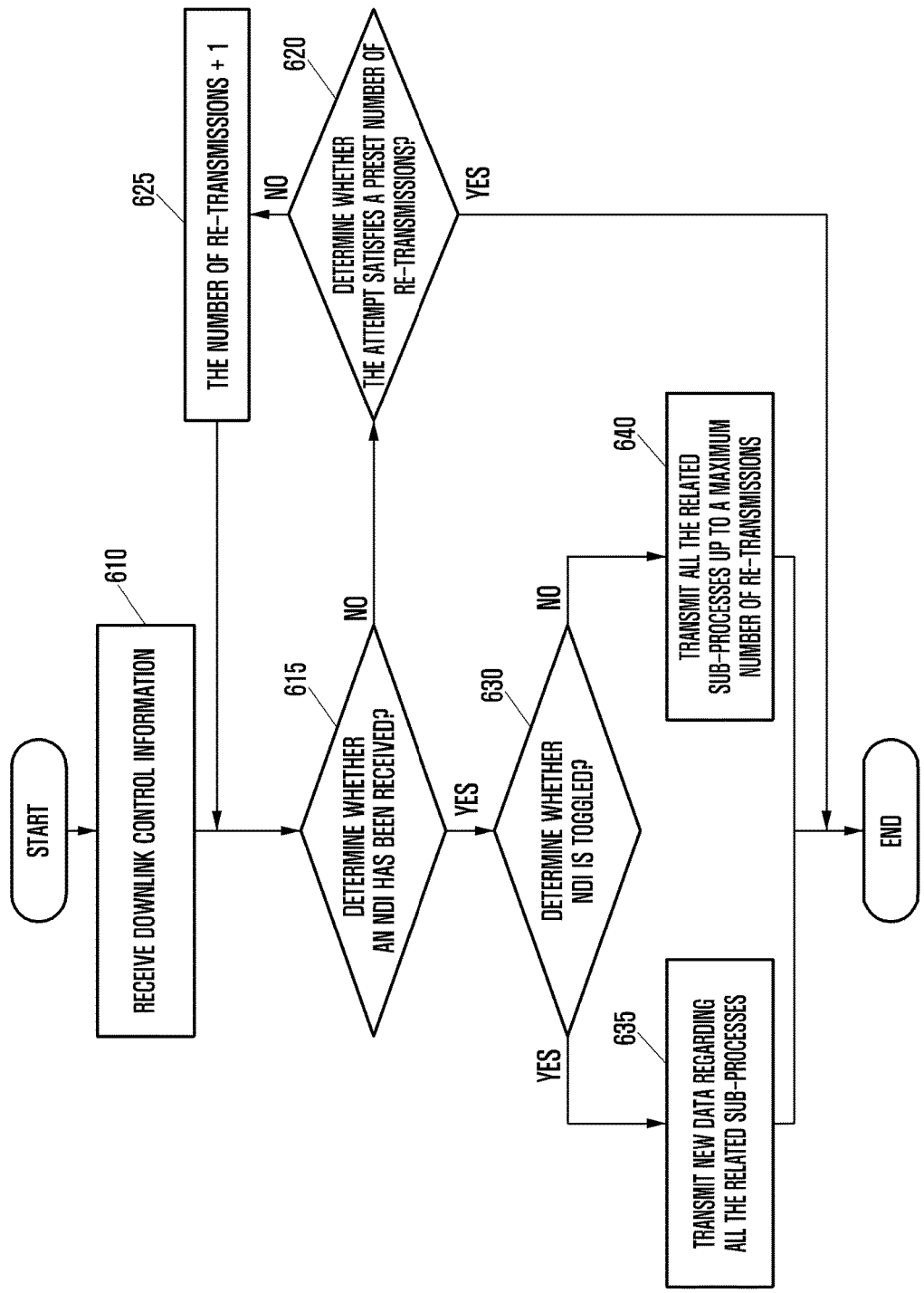
FIG. 6 is a flowchart that describes operations of a terminal according to a first embodiment of the present disclosure.

FIG. 6 is a flowchart that describes operations of a terminal according to a first embodiment of the present disclosure.

With reference to FIG. 6, the terminal is capable of transmitting/receiving signals to/from a base station.

The terminal is capable of receiving downlink control information from the base station in operation 610. More specifically, the terminal is capable of receiving downlink control information on the first downlink subframe corresponding to one SI. The downlink control information may contain at least one of the following: scheduling information, feedback information and an NDI.

The terminal is capable of determining whether an NDI has been received based on the received downlink control information in operation 615.

When an NDI has been received based on the received downlink control information in operation 615, the terminal is capable of determining whether the NDI is toggled in operation 630. When the NDI is toggled in operation 630, the terminal is capable of transmitting new data regarding all the related sub-processes in operation 635. On the other hand, when the NDI is not toggled in operation 630, the terminal is capable of re-transmitting all the related sub-processes up to a maximum number of re-transmissions in operation 640.

When an NDI has not been received in operation 615, the terminal is capable of determining whether the number of re-transmission attempts satisfies a preset value in operation 620. When the number of re-transmission attempts satisfies a preset value in operation 620, the terminal is capable of performing the transmission of new data in operation 6. On the other hand, when the number of re-transmission attempts does not satisfy a preset value in operation 620, the terminal increases the number of re-transmission attempts by one and returns to operation 615 determining whether an NDI is received.

In the embodiment, when a process is set in the first transmission, the terminal considers that an NDI regarding all the related sub-processes has been toggled and may perform the transmission of new data.

In the embodiment, downlink control information may be received once per SI. When a process is indicated in the downlink control information, the terminal is capable of performing the operations.

In the embodiment, when an NDI has been received but has not been toggled, the terminal is capable of performing the re-transmission in all the related sub-processes until the number of re-transmission attempts satisfies a preset value. When an NDI has been received and toggled, the terminal is capable of performing the transmission of new data in all the related sub-processes.

In the embodiment, when an NDI per a common ACK/NACK of a related sub-process is not received, the terminal is capable of performing an operation corresponding to a received ACK/NACK until the number of transmissions satisfies a preset value.

Figure 7:
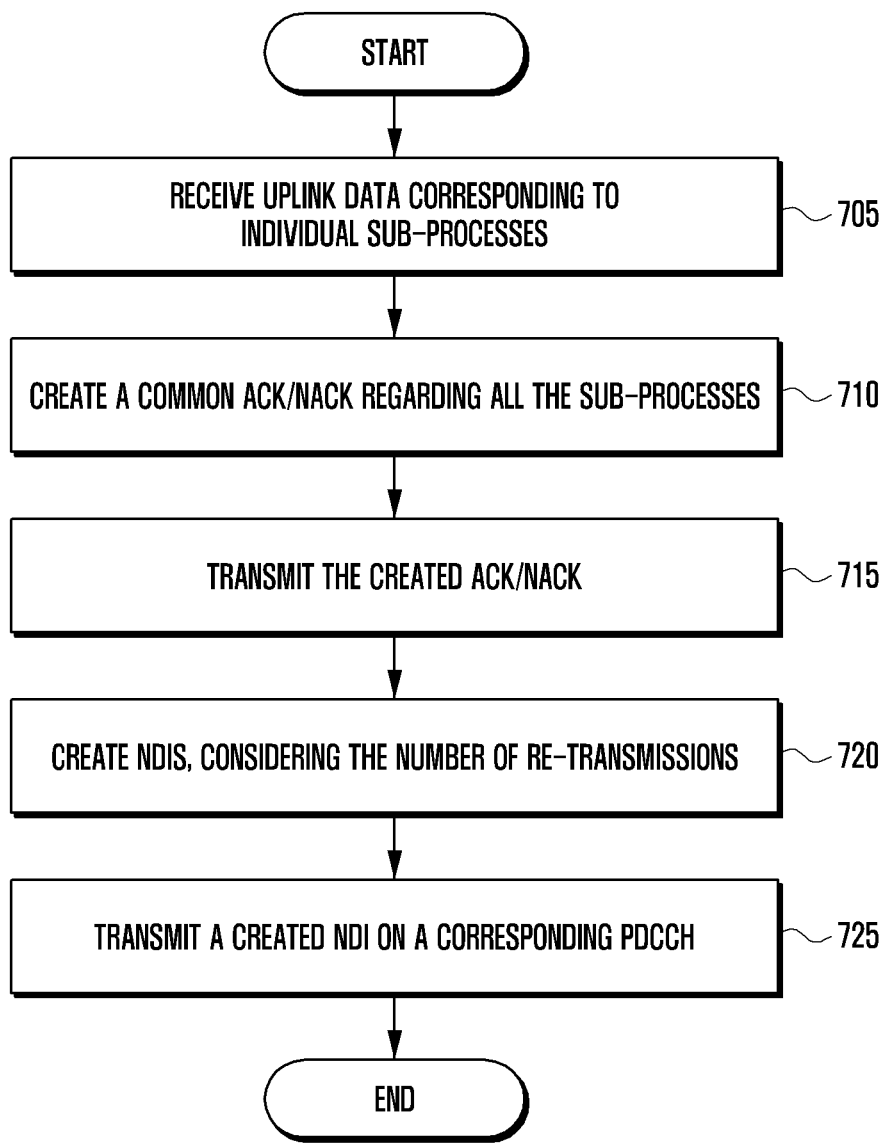
FIG. 7 is a flowchart that describes operations of a base station according to a first embodiment of the present disclosure.

FIG. 7 is a flowchart that describes operations of a base station according to a first embodiment of the present disclosure.

With reference to FIG. 7, the base station is capable of transmitting/receiving signals to/from a terminal.

The base station is capable of receiving uplink data corresponding to individual sub-processes included in a process in operation 705.

The base station is capable of creating a common ACK/NACK regarding the process, based on the reception results in the individual sub-processes in operation 710. More specifically, when any one of the sub-processes is NACK, the base station considers the result of the entire process to be NACK.

The base station is capable of performing the transmission of the created ACK/NACK in operation 715.

The base station is capable of creating NDIs, considering the number of re-transmissions in operation 720. The base station is capable of performing the transmission of the created NDI on a corresponding PDCCH in operation 725. The NDI may also be transmitted via a subframe identical to an ACK/NACK in a corresponding process.

In the embodiment, the base station is capable of creating a common ACK/NACK to all the related sub-processes per process. The created ACK/NACK may be transmitted via a specified subframe.

In the embodiment, common feedback in response to transmission that has been attempted N times is NACK, the base station toggles an NDI and performs the transmission of new data. N denotes a preset number of re-transmissions. When the number of feedback is N during the re-transmission, the base station is capable of setting the number of re-transmissions to '0,' and performing the transmission of new data.

Figure 8:
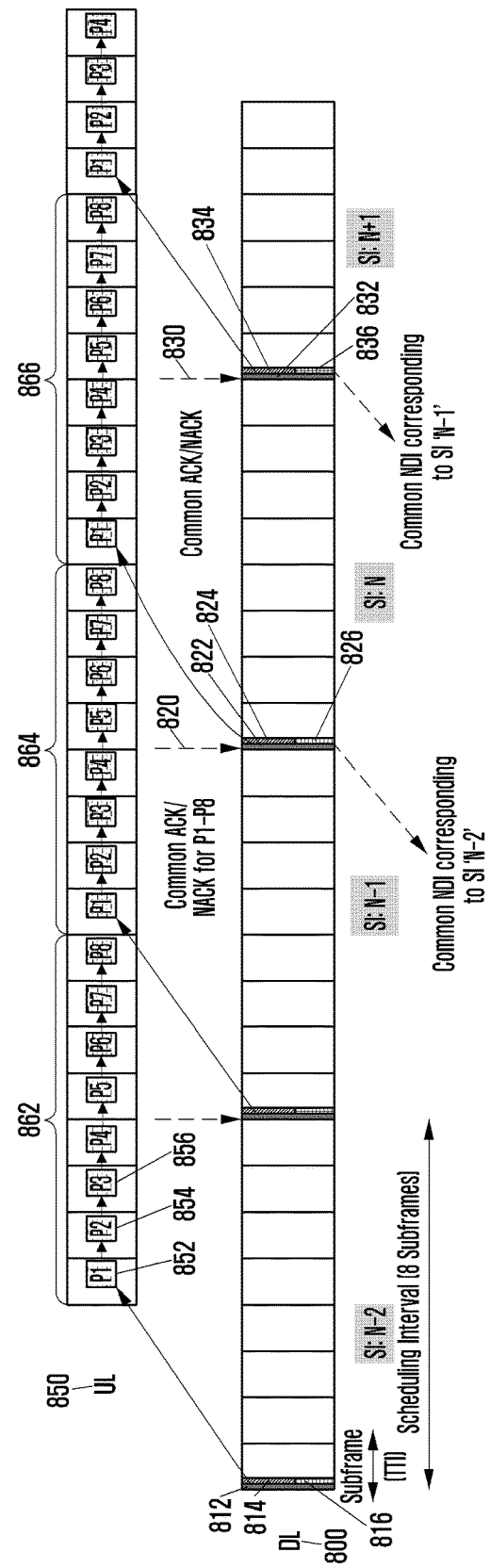
FIG. 8 is a structure of a subframe for an uplink HARQ according to a second embodiment of the present disclosure.

FIG. 8 is a structure of a subframe for an uplink HARQ according to a second embodiment of the present disclosure.

With reference to FIG. 8, a terminal is capable of transmitting, to a base station, data via an uplink channel 850 and receiving, from the base station, the feedback information via a downlink channel 800.

In the embodiment, an SI may contain 8 subframes. The first downlink subframe of each SI may contain at least one of the following: PHICHs 812, 822, and 832, PDCCHs 814, 824, and 834 or NDIs 816, 826, and 836.

PDCCH 814 containing uplink scheduling information may be transmitted via the first subframe of the N-2nd SI. Uplink data may be transmitted via uplink subframes 852, 854, 856, etc. of the uplink 862 according to the scheduling. Uplink subframes may transmit data of corresponding processes, respectively. In another embodiment, each process may transmit data bundled on two or more subframes. ACK/NACK feedback information 820 in response to the transmission of uplink data may be transmitted on PHICH 822. Feedback information 830 in response to the uplink subframe 864 may be transmitted on PHICH 834.

In the embodiment, a common NDI for the entire process of an MSS SI may be transmitted. More specifically, according to embodiments, a common NDI for the uplink transmission in the N-2nd SI may be transmitted via the first subframe of the downlink corresponding to the Nth SI. Alternatively, a common NDI for part of the process in the N-1st SI and part of the process in the N-2nd SI may be transmitted via the first subframe of the downlink corresponding to the Nth SI.

In the embodiment as described above, common feedback regarding the entire process of an MSS SI may be transmitted. More specifically, according to embodiments, common feedback regarding the uplink transmission in the N-2nd SI may be transmitted via the first subframe of the downlink corresponding to the Nth SI. Alternatively, common feedback regarding part of the process in the N-1st SI and part of the process in the N-2nd SI may be transmitted via the first subframe of the downlink corresponding to the Nth SI.

In the embodiment, data transmitted in a process, included in an SI in the initial transmission, may be re-transmitted at least once. The re-transmission may be performed in such a way as to transmit the same data as transmitted in the previous SI or not to transmit any data. Alternatively, the re-transmission may be performed in such a way as to transmit: data for another terminal; or preset data.

In the embodiment, downlink control information may carry NDIs for a number of processes.

Figure 9:
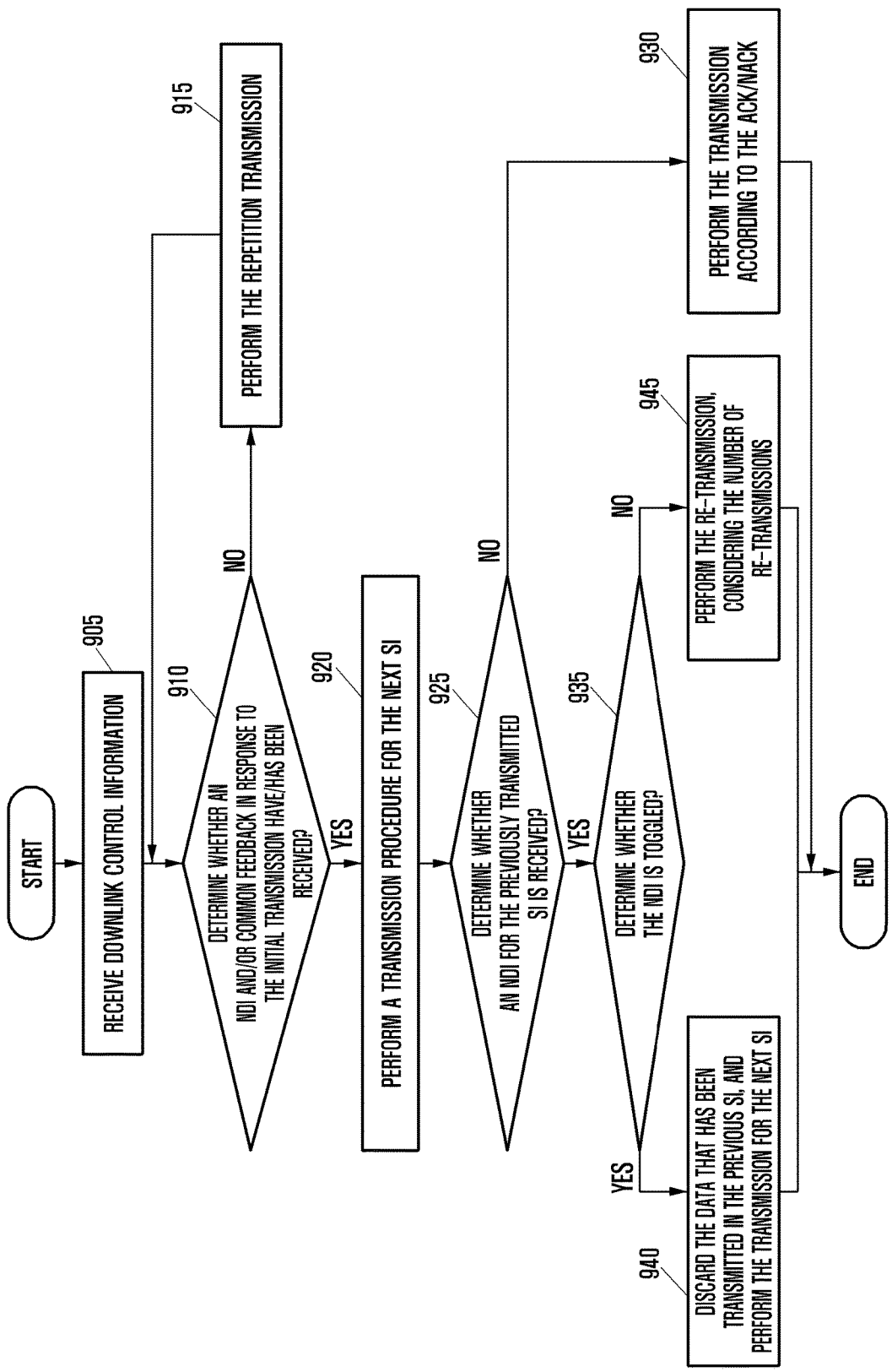
FIG. 9 is a flowchart that describes operations of a terminal according to a second embodiment of the present disclosure.

FIG. 9 is a flowchart that describes operations of a terminal according to a second embodiment of the present disclosure.

With reference to FIG. 9, the terminal is capable of transmitting/receiving signals to/from a base station.

The terminal is capable of receiving downlink control information from the base station in operation 905. In the embodiment, the terminal may perform the transmission of uplink data before operation 905.

The terminal is capable of determining whether an NDI and/or common feedback in response to the initial transmission have/has been received based on the received downlink control information in operation 910. When either or neither of the NDI and the common feedback in response to the initial transmission has/have not been received in operation 910, the terminal repeats the transmission of data that has been transmitted in the previous SI in operation 915.

When common feedback and/or an NDI have/has been received in operation 910, the terminal is capable of performing a transmission procedure for the next SI in operation 920. More specifically, the terminal is capable of performing a transmission procedure via a subframe scheduled in the received downlink control information.

The terminal is capable of determining whether an NDI for the previously transmitted SI is received in operation 925.

When an NDI for the previously transmitted SI has not been received in operation 925, the terminal is capable of performing the transmission according to the received feedback ACK/NACK in operation 930.

When an NDI has not been received in operation 925, the terminal is capable of determining whether the NDI is toggled in operation 935. When the NDI is toggled in operation 935, the terminal discards the data that has been transmitted in the previous SI and then performs the transmission for the next SI in operation 940. On the other hand, when the NDI is not toggled in operation 935, the terminal is capable of performing the re-transmission, considering the number of re-transmissions in operation 945.

In the embodiment described above, when the terminal ascertains that a process has been set and an NDI has been toggled in the uplink transmission of the first SI, it is capable of performing the transmission of data. In the embodiment, the terminal may perform the compulsory re-transmission in the next SI until a common NDI and common feedback is received. The compulsory re-transmission may be referred to as the repetition transmission of the same data.

In the embodiment, after performing the first transmission, the terminal may repeat the next operation until an NDI is toggled or up to a maximum number of re-transmissions. When an NDI has not been toggled, the terminal performs the re-transmission. When an NDI has been toggled, the terminal stops performing the transmission of uplink, currently transmitted according to the previous SI, and newly performs the transmission corresponding to the next SI.

In the embodiment, when an NDI has not been received, the terminal may perform operations according to received ACK/NACK feedback.

Figure 10:
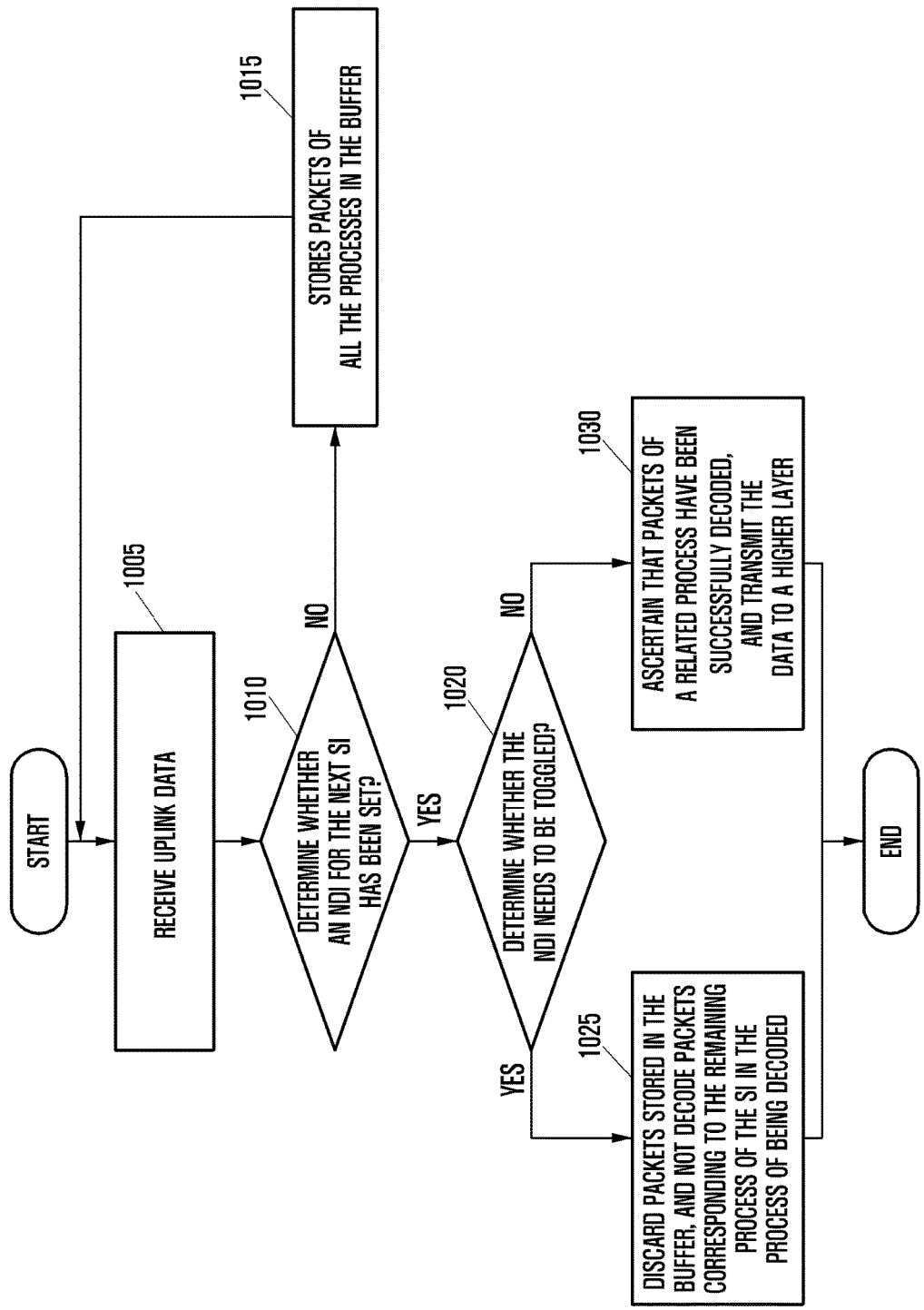
FIG. 10 is a flowchart that describes operations of a base station according to a second embodiment of the present disclosure.

FIG. 10 is a flowchart that describes operations of a base station according to a second embodiment of the present disclosure.

With reference to FIG. 10, the base station is capable of transmitting/receiving signals to/from a terminal.

The base station is capable of receiving uplink data corresponding to an SI in operation 1005. The base station may transmit scheduling information regarding the uplink data to the terminal before operation 1005.

The base station is capable of determining whether an NDI for the next SI has been set in operation 1010. The NDI may be set based on the received data and the number of re-transmissions.

When an NDI has not been set in operation 1010, the base station stores packets of all the processes in the buffer and simultaneously continues receiving uplink data in operation 1015.

When an NDI has been set in operation 1010, the base station is capable of determining whether the NDI needs to be toggled in operation 1020. A condition as to whether an NDI needs to be toggled may be determined based on the received data and the number of re-transmissions.

When the NDI needs to be toggled in operation 1020, the base station discards packets stored in the buffer, and may not decode packets corresponding to the remaining process of the SI in the process of being decoded in operation 1025.

When the NDI does not need to be toggled in operation 1020, the base station ascertains that packets of a related process have been successfully decoded and transmits the data to a higher layer in operation 1030.

In the embodiment, the base station may perform the transmission of an ACK/NACK feedback in response to the received uplink data. In the embodiment, the base station may store decoded packets of all the processes in a soft buffer until an NDI corresponding to the next SI is set, and may not transmit the packets to a higher layer until an NDI is set. In the embodiment, when the base station decides not to toggle the NDI, it may transmit the packets successfully decoded in a related process to a higher layer. When the base station decides to toggle the NDI, it discards packets stored in the buffer, and may not perform the decoding for the remaining process in the current SI.

Figure 11:
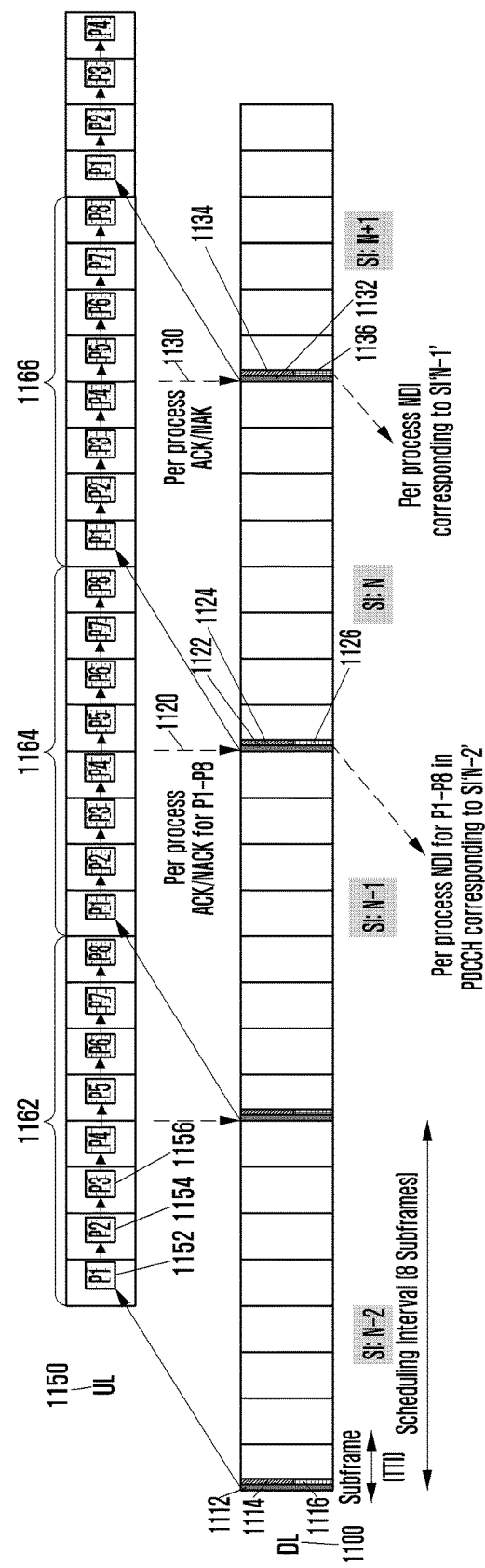
FIG. 11 is a structure of a subframe for an uplink HARQ according to a third embodiment of the present disclosure.

FIG. 11 is a structure of a subframe for an uplink HARQ according to a third embodiment of the present disclosure.

With reference to FIG. 11, a terminal is capable of transmitting, to a base station, data via an uplink channel 1150 and receiving, from the base station, the feedback information via a downlink channel 1100.

In the embodiment, an SI may contain 8 subframes. At least one of the following: PHICHs 1112, 822, and 832, PDCCHs 1114, 1124, and 1134 or NDI 1116, 1126, and 1136 may be transmitted via the first downlink subframe of an SI.

PDCCH 1114 containing uplink scheduling information may be transmitted via the first subframe of the N-2nd SI. Uplink data may be transmitted via uplink subframes 1152, 1154, 1156, etc. of the uplink 1162 according to the scheduling. Uplink subframes may transmit data of corresponding processes, respectively. In another embodiment, each process may transmit data bundled on two or more subframes. ACK/NACK feedback information 1120 in response to the transmission of uplink data may be transmitted on PHICH 1122. Feedback information 1130 in response to the uplink subframe 1164 may be transmitted on PHICH 1134.

In the embodiment, NDIs indicating new data according to all the processes of an MSS SI may be transmitted. More specifically, according to embodiments, NDIs for the individual processes in the uplink transmission in the N-2nd SI may be transmitted via the first subframe of the downlink corresponding to the Nth SI. Alternatively, NDIs for individual processes including part of the process in the N-1st SI and part of the process in the N-2nd SI may be transmitted via the first subframe of the downlink corresponding to the Nth SI. In the embodiment, NDIs indicating new data according to processes may be transmitted in the format of a bitmap corresponding to each process.

In the embodiment as described above, feedback in response to individual processes of an MSS SI may be transmitted. More specifically, according to embodiments, feedback according to individual processes in the uplink transmission in the N-2nd SI may be transmitted via the first subframe of the downlink corresponding to the Nth SI. Alternatively, feedback in response to individual processes including part of the process in the N-1st SI and part of the process in the N-2nd SI may be transmitted via the first subframe of the downlink corresponding to the Nth SI. In the embodiment, feedback information according to individual processes may be transmitted in the format of a bitmap corresponding to feedback information in response to each process.

In the embodiment, data transmitted in a process, included in an SI in the initial transmission, may be re-transmitted at least once. The re-transmission may be performed in such a way as to transmit the same data as transmitted in the previous SI or may not transmit any data. Alternatively, the re-transmission may be performed in such a way as to perform the transmission of: data for another terminal; or preset data.

Figure 12:
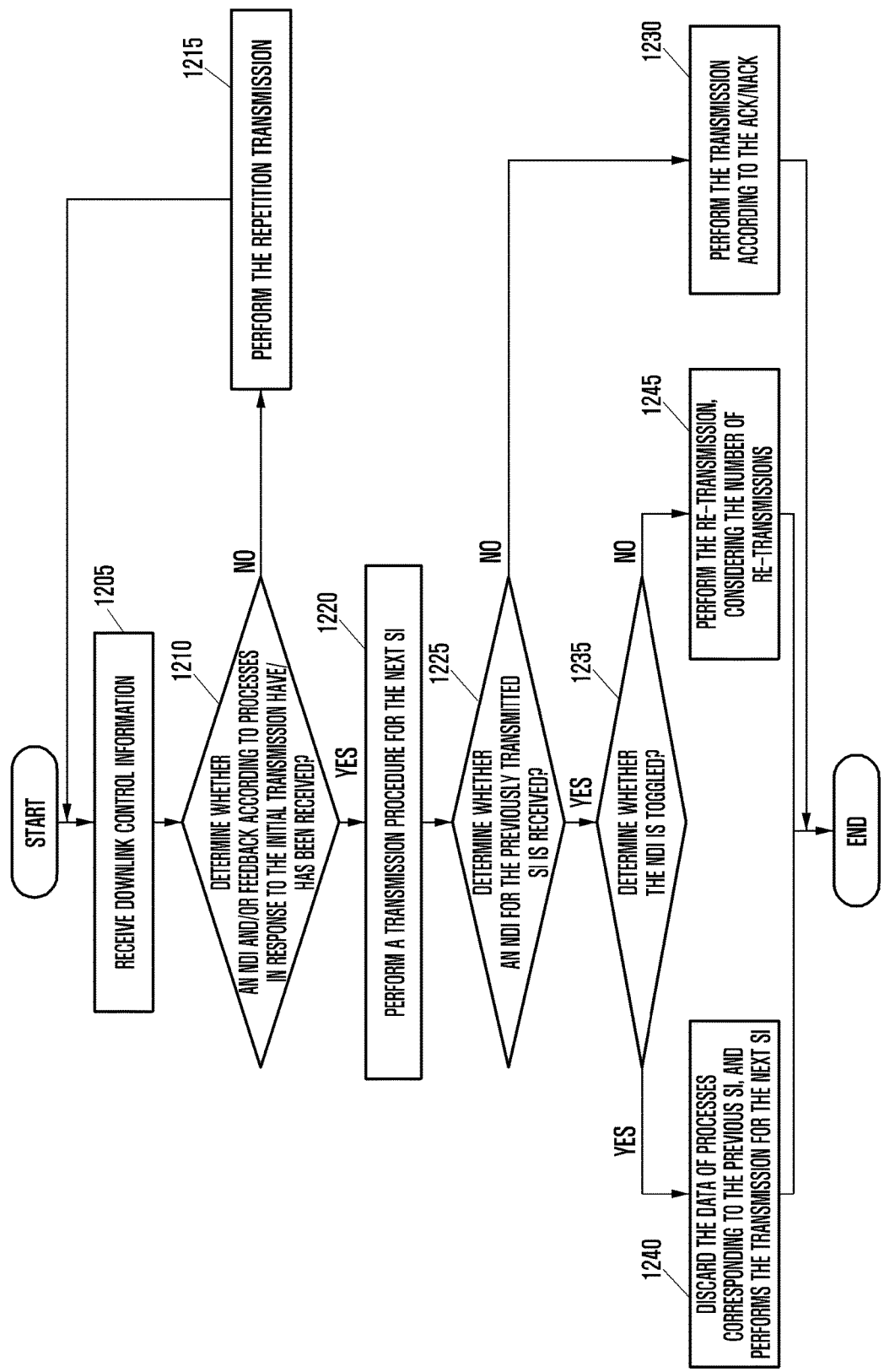
FIG. 12 is a flowchart that describes operations of a terminal according to a third embodiment of the present disclosure.

FIG. 12 is a flowchart that describes operations of a terminal according to a third embodiment of the present disclosure.

With reference to FIG. 12, the terminal is capable of transmitting/receiving signals to/from a base station.

The terminal is capable of receiving downlink control information from the base station in operation 1205. In the embodiment, the terminal may perform the transmission of uplink data before operation 1205.

The terminal is capable of determining whether an NDI and/or feedback according to processes in response to the initial transmission have/has been received based on the received downlink control information in operation 1210. When either or neither of the NDI and the feedback has/have not been received in operation 910, the terminal repeats the transmission of data that has been transmitted in the previous SI in operation 1215.

When the NDI and/or the feedback according to processes have/has been received in operation 1210, the terminal is capable of performing a transmission procedure for the next SI in operation 1220. More specifically, the terminal is capable of performing a transmission procedure via a subframe scheduled in the received downlink control information.

The terminal is capable of determining whether NDIs according to individual processes for the previously transmitted SI have been received in operation 1225.

When NDIs according to individual processes have not been received in operation 1225, the terminal is capable of performing the transmission according to the received feedback ACK/NACK according to individual processes in operation 1230.

When NDIs according to individual processes have been received in operation 1225, the terminal is capable of determining whether the NDIs according to individual processes are toggled in operation 1235. When the NDIs according to individual processes are toggled in operation 1235, the terminal discards the data of processes corresponding to the toggled NDIs, which have been transmitted in the previous SI, and then performs the transmission for the next SI in operation 1240. On the other hand, when the NDIs according to individual processes are not toggled in operation 1235, the terminal is capable of performing the re-transmission, considering the number of re-transmissions in operation 1245.

In the embodiment described above, when the terminal ascertains that a process has been set and an NDI has been toggled in the uplink transmission of the first SI, it is capable of performing the transmission of data. In the embodiment, the terminal may perform the compulsory re-transmission in the next SI until feedback according to processes and NDIs according to processes are received. The compulsory re-transmission may be referred to as the repetition transmission of the same data.

In the embodiment, after performing the first transmission, the terminal may repeat the next operation until NDIs according to processes are toggled or up to a maximum number of re-transmissions. When NDIs according to processes have not been toggled, the terminal performs the re-transmission. When NDIs according to processes have been toggled, the terminal stops performing the transmission of uplink, in a process corresponding to a toggled NDI, currently transmitted, according to the previous SI, and performs the transmission corresponding to the next SI.

In the embodiment, when NDIs according to individual processes have not been received, the terminal may perform operations according to received ACK/NACK feedback according to individual processes.

Figure 13:
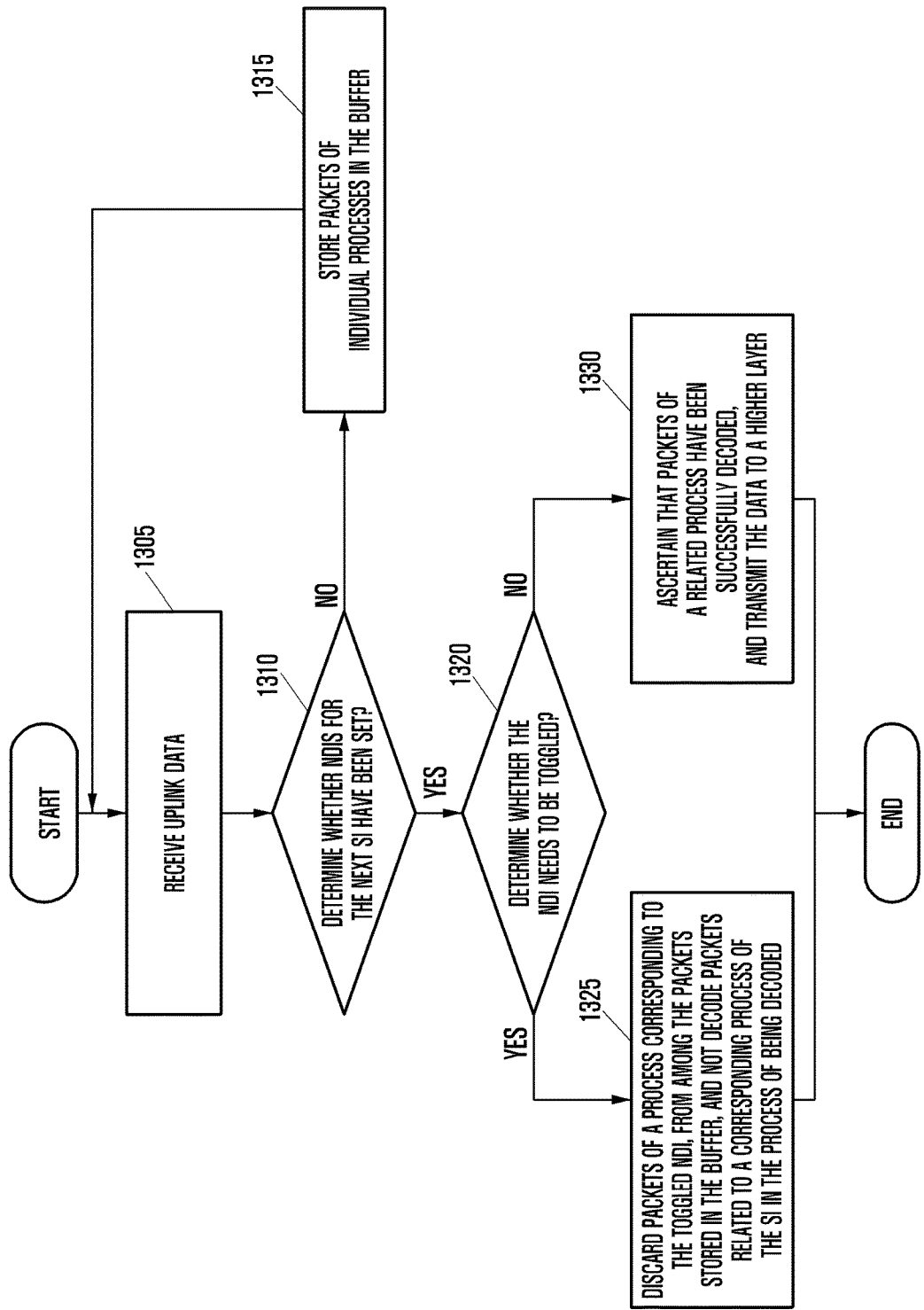
FIG. 13 is a flowchart that describes operations of a base station according to a third embodiment of the present disclosure.

FIG. 13 is a flowchart that describes operations of a base station according to a third embodiment of the present disclosure.

With reference to FIG. 13, the base station is capable of transmitting/receiving signals to/from a terminal.

The base station is capable of receiving uplink data corresponding to an SI in operation 1305. The base station may transmit scheduling information regarding the uplink data to the terminal before operation 1305.

The base station is capable of determining whether NDIs according to individual processes for the next SI have been set in operation 1310. The NDIs according to individual processes may be set based on the received data according to individual processes and the number of re-transmissions. The number of re-transmissions may be set to a common value or different values, according to individual processes.

When NDIs according to individual processes have not been set in operation 1310, the base station stores packets for a corresponding process in the buffer and simultaneously continues receiving uplink data in operation 1315.

When NDIs according to individual processes have been set in operation 1310, the base station is capable of determining whether the NDIs according to individual processes need to be toggled in operation 1320. A condition as to whether NDIs according to individual processes need to be toggled may be determined based on the received data and the number of re-transmissions.

When NDIs according to individual processes need to be toggled in operation 1320, the base station discards packets of a process corresponding to the toggled NDI, from among the packets stored in the buffer, and may not decode packets related to a corresponding process of the SI in the process of being decoded in operation 1325.

When NDIs according to individual processes do not need to be toggled in operation 1320, the base station ascertains that packets of a related process have been successfully decoded and transmits the data to a higher layer in operation 1330.

In the embodiment, the base station may perform the transmission of ACK/NACK feedback according to individual processes in response to the received uplink data. In the embodiment, the base station may store decoded packets of corresponding processes in a soft buffer until NDIs according to individual processes corresponding to the next SI are set, and may not transmit the packets to a higher layer until the NDIs are set. In the embodiment, when the base station decides not to toggle the NDI, it may transmit the packets successfully decoded in a corresponding process to a higher layer. When the base station decides to toggle the NDI, it discards packets related to a corresponding process, from among the packets stored in the buffer, and may not perform the decoding for a corresponding process in the current SI.

Figure 14:
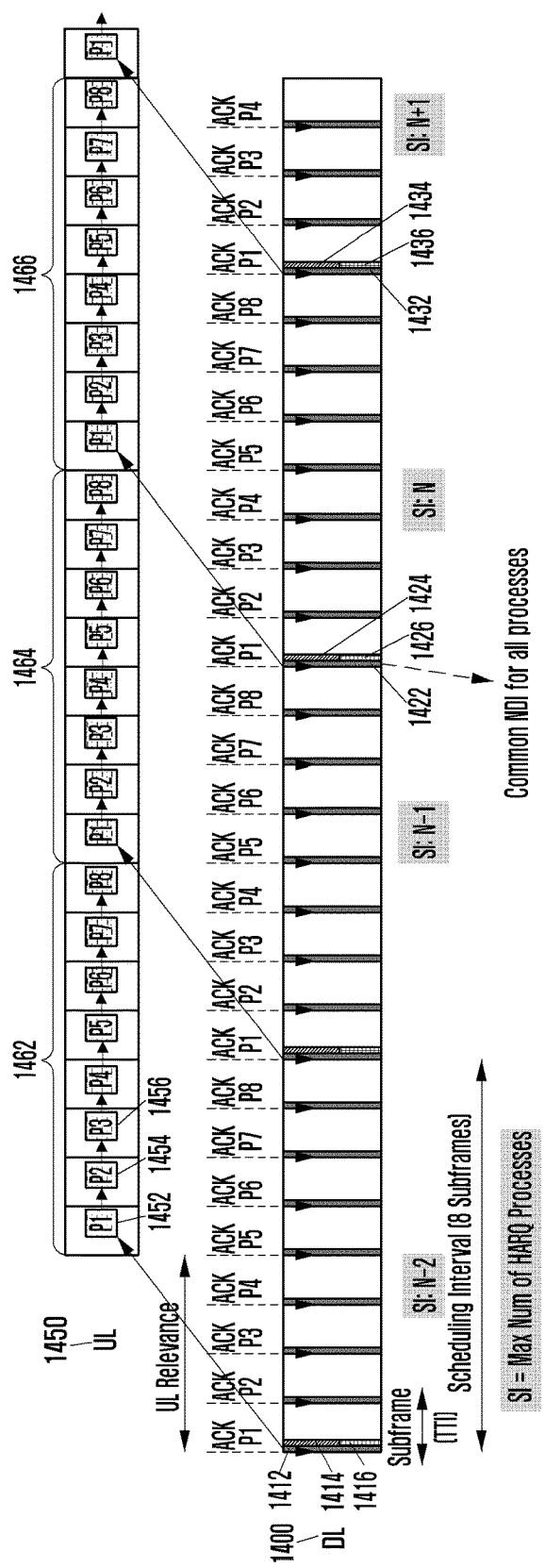
FIG. 14 is a structure of a subframe for an uplink HARQ according to a fourth embodiment of the present disclosure.

FIG. 14 is a structure of a subframe for an uplink HARQ according to a fourth embodiment of the present disclosure.

With reference to FIG. 14, a terminal is capable of transmitting, to a base station, data via an uplink channel 1450 and receiving, from the base station, the feedback information via a downlink channel 1400.

In the embodiment, an SI may contain 8 subframes. At least one of the following: PHICH 1412, 1422, and 1432, PDCCHs 1414, 1424, and 1434 or NDIs 1416, 1426, and 1436 may be transmitted via the first downlink subframe of an SI. In the fourth embodiment, PHICH containing feedback information regarding individual processes transmitting uplink data may be received via individual subframes of the downlink. In the embodiment, with respect to downlink control information, there may be a difference between uplink data transmissions by an UL Relevance, and the difference may be 4 subframes or any other value.

PDCCH 1414 containing uplink scheduling information may be transmitted via the first subframe of the N-2nd SI. Uplink data may be transmitted via uplink subframes 1452, 1454, 1456, etc. of the uplink 1462 according to the scheduling. Uplink subframes may transmit data of corresponding processes, respectively. In another embodiment, each process may transmit data bundled on two or more subframes. ACK/NACK feedback information in response to the transmission of uplink data may be transmitted on PHICH of a downlink subframe corresponding to each process. In the embodiment, feedback may be created according to individual processes and may be transmitted via PHICH of downlink subframes corresponding to individual processes.

In the embodiment, a common NDI for the entire process of an MSS SI may be transmitted. More specifically, according to embodiments, a common NDI for the uplink transmission in the N-2nd SI may be transmitted via the first subframe of the downlink corresponding to the Nth SI. Alternatively, a common NDI for part of the process in the N-1st SI and part of the process in the N-2nd SI may be transmitted via the first subframe of the downlink corresponding to the Nth SI.

In the embodiment, when an NDI is provided, a condition as to whether to re-transmit data which has been transmitted or to transmit new data, in the individual processes, may be determined according to the NDI. In the embodiment, downlink control information may transmit NDIs for a number of processes FIG. 15 is a flowchart that describes operations of a terminal according to a fourth embodiment of the present disclosure.

Figure 15:
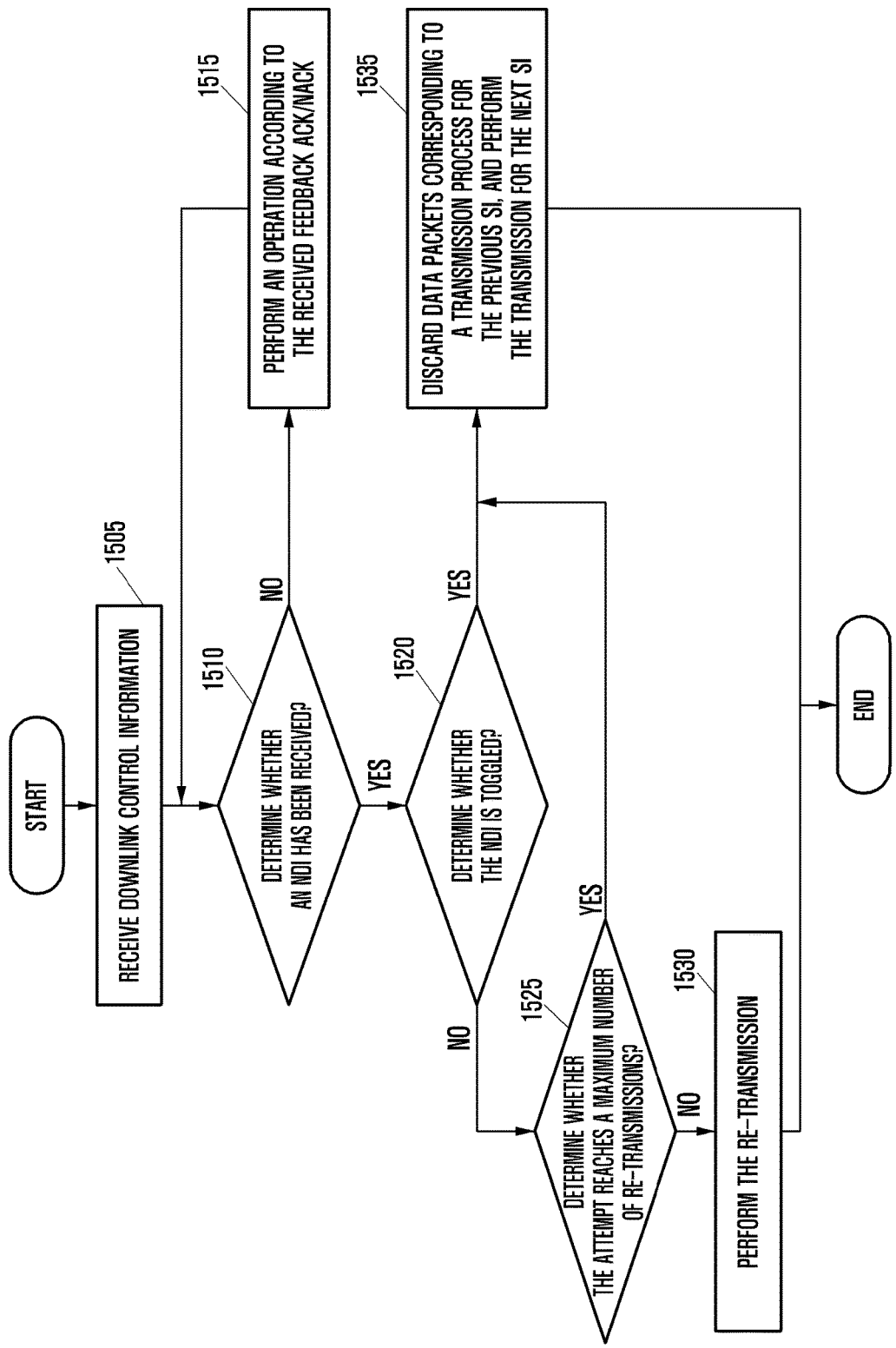
FIG. 15 is a flowchart that describes operations of a terminal according to a fourth embodiment of the present disclosure.

With reference to FIG. 15, the terminal is capable of transmitting/receiving signals to/from a base station.

The terminal is capable of receiving downlink control information from the base station in operation 1505. In the embodiment, the terminal may perform the transmission of uplink data before operation 1505. The downlink control information may contain feedback ACK/NACK information and/or a common NDI.

The terminal is capable of determining whether an NDI has been received based on the received downlink control information in operation 1510. When an NDI has not been received in operation 1510, the terminal is capable of performing an operation according to the received feedback ACK/NACK in operation 1515.

The terminal is capable of determining whether the received NDI is toggled in operation 1520. When the received NDI is toggled in operation 1520, the terminal discards data packets corresponding to a transmission process for the previous SI, and then performs the transmission for the next SI in operation 1535. On the other hand, when the received NDI is not toggled in operation 1520, the terminal is capable of determining whether the transmission attempt reaches a maximum number of re-transmissions in operation 1525. The maximum number of re-transmissions may be a pre-set value. When the transmission attempt reaches a maximum number of re-transmissions in operation 1525, the terminal proceeds with operation 1535. On the other hand, when the transmission attempt does not reach a maximum number of re-transmissions in operation 1525, the terminal performs the re-transmission in a corresponding process in operation 1530.

In the embodiment, the terminal is capable of ascertaining that a process has been set and an NDI has been toggled in the first transmission. When an NDI has been toggled or an NDI has been received until the attempt reaches a maximum number of re-transmissions, the terminal is capable of performing an operation related to the next transmission. When an NDI has not been toggled, the terminal is performing the re-transmission. When an NDI has been toggled, the terminal discards a data packet for a corresponding SI and prepares to perform the transmission for the next SI. When an NDI has not been received, the terminal performs an operation according to the received feedback ACK/NACK information.

Figure 16:
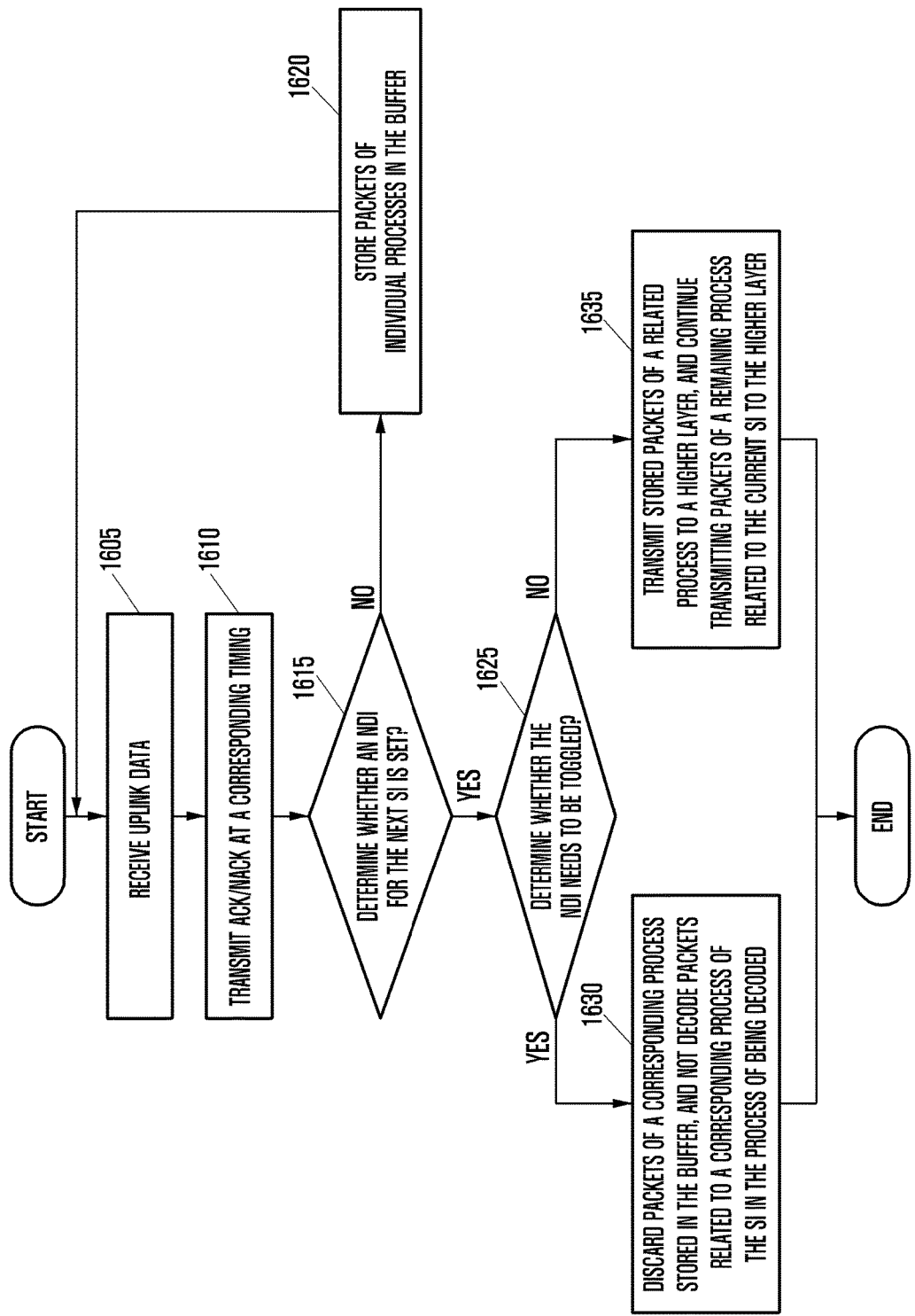
FIG. 16 is a flowchart that describes operations of a base station according to a fourth embodiment of the present disclosure.

FIG. 16 is a flowchart that describes operations of a base station according to a fourth embodiment of the present disclosure.

With reference to FIG. 16, the base station is capable of transmitting/receiving signals to/from a terminal.

The base station is capable of receiving uplink data corresponding to an SI in operation 1605. The base station may transmit scheduling information regarding the uplink data to the terminal before operation 1605.

The base station is capable of transmitting feedback ACK/NACK information to the terminal at a timing corresponding to a process related to the received uplink data in operation 1610. The corresponding timing may be set to any value according to embodiments. In the embodiment, the base station is capable of transmitting feedback ACK/NACK information via a downlink subframe corresponding to the fourth subframe after the received uplink data subframe.

The base station is capable of determining whether an NDI for the next SI is set in operation 1615. A condition as to whether an NDI for the next SI is set may be determined based on the received uplink data and/or feedback ACK/NACK information.

When an NDI for the next SI has not been set in operation 1615, the base station stores received uplink data packets of individual processes in the buffer in operation 1620.

When an NDI for the next SI has been set in operation 1615, the base station is capable of determining whether an NDI needs to be toggled in operation 1625. A condition as to whether an NDI needs to be toggled may be determined based on the received uplink data and a present number of re-transmissions.

When an NDI needs to be toggled in operation 1625, the base station discards packets of a corresponding process stored in the buffer, and may not decode packets related to a corresponding process of the SI in the process of being decoded in operation 1630.

When an NDI does not need to be toggled in operation 1625, the base station ascertains that data has been successfully received, transmits stored packets of a related process to a higher layer, and continues transmitting packets of a remaining process related to the current SI to the higher layer in operation 1635. More specifically, the base station continues transmitting successfully received packets corresponding to individual processes to the higher layer.

In the embodiment, the base station is capable of transmitting the feedback ACK/NACK information every timing point corresponding to each process. In the embodiment, the base station may store decoded packets of all the processes in a soft buffer until an NDI for the next SI is set, and may not transmit the packets to a higher layer until it ascertains the success of reception.

When the base station decides not to toggle the NDI, it may transmit the stored packets of a related process to a higher layer, and continues transmitting packets of the remaining process of a corresponding SI to the higher layer.

When the base station decides to toggle the NDI, it discards stored packets of a corresponding process, and does not decode packets corresponding to the remaining process of a corresponding SI.

Figure 17:
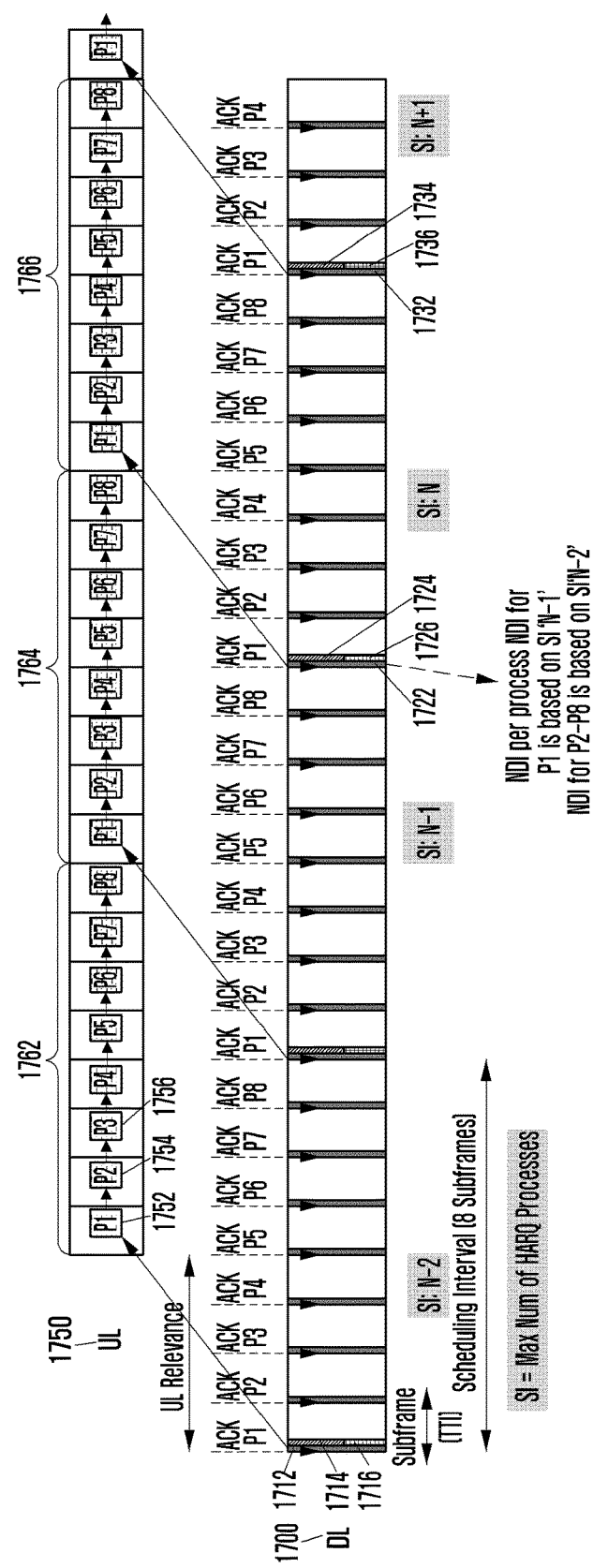
FIG. 17 is a structure of a subframe for an uplink HARQ according to a fifth embodiment of the present disclosure.

FIG. 17 is a structure of a subframe for an uplink HARQ according to a fifth embodiment of the present disclosure.

With reference to FIG. 17, a terminal is capable of transmitting, to a base station, data via an uplink channel 1750 and receiving, from the base station, the feedback information via a downlink channel 1700.

In the embodiment, an SI may contain 8 subframes. At least one of the following: PHICH 1712, 1722, and 1732, PDCCHs 1714, 1724, and 1734 or NDIs 1716, 1726, and 1736 may be transmitted via the first downlink subframe of an SI. In the fifth embodiment, PHICH containing feedback information regarding individual processes transmitting uplink data may be received via individual subframes of the downlink. In the embodiment, with respect to downlink control information, there may be a difference between uplink data transmissions by an UL Relevance, and the difference may be 4 subframes or any other value.

PDCCH 1717 containing uplink scheduling information may be transmitted via the first subframe of the N-2nd SI. Uplink data may be transmitted via uplink subframes 1752, 1754, 1756, etc. of the uplink 1762 according to the scheduling. Uplink subframes may transmit data of corresponding processes, respectively. In another embodiment, each process may transmit data bundled on two or more subframes. ACK/NACK feedback information in response to the transmission of uplink data may be transmitted on PHICH of a downlink subframe corresponding to each process. In the embodiment, feedback may be created according to individual processes and may be transmitted via PHICH of downlink subframes corresponding to individual processes.

In the embodiment, the base station may transmit NDIs of individual processes. More specifically, according to embodiments, a common NDI for the uplink transmission in the N-2nd SI may be transmitted via the first subframe of the downlink corresponding to the Nth SI. Alternatively, a common NDI for part of the process in the N-1st SI and part of the process in the N-2nd SI may be transmitted via the first subframe of the downlink corresponding to the Nth SI. In the embodiment, NDIs of individual processes may be transmitted in the format of a bitmap. The bit locations in each bitmap may correspond to the order of individual processes.

In the embodiment, when an NDI is provided, a condition as to whether to re-transmit data which has been transmitted or to transmit new data, in the individual processes, may be determined according to the NDI. In the embodiment, downlink control information may transmit NDIs for a number of processes FIG. 18 is a flowchart that describes operations of a terminal according to a fifth embodiment of the present disclosure.

Figure 18:
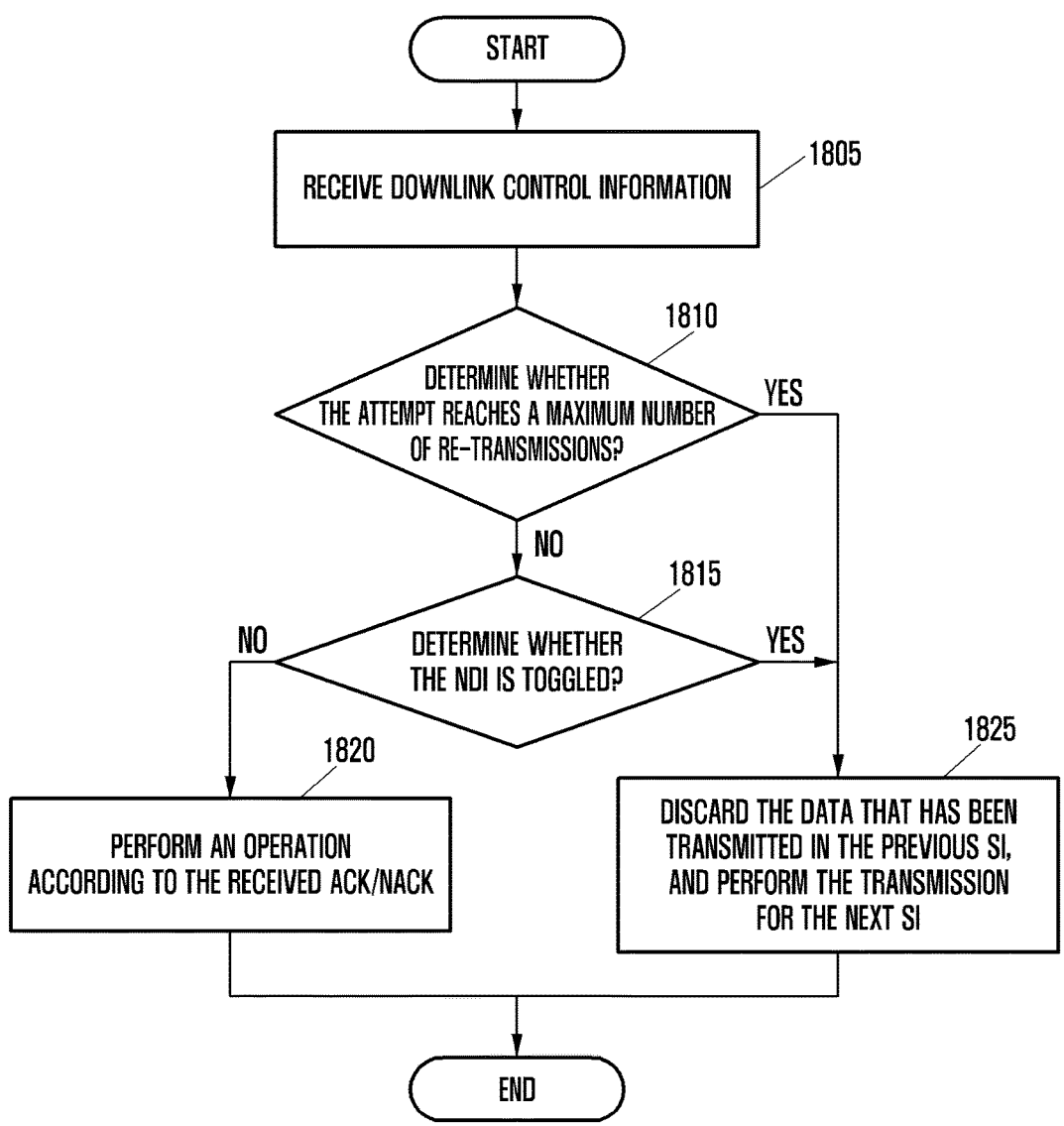
FIG. 18 is a flowchart that describes operations of a terminal according to a fifth embodiment of the present disclosure.

With reference to FIG. 18, the terminal is capable of transmitting/receiving signals to/from a base station.

The terminal is capable of receiving downlink control information from the base station in operation 1805. In the embodiment, the terminal may perform the transmission of uplink data before operation 1805. The downlink control information may contain feedback ACK/NACK information and/or a common NDI.

The terminal is capable of determining whether the uplink transmission attempt reaches a maximum number of re-transmissions in operation 1810. More specifically, the terminal is capable of determining whether the attempt to transmit uplink data that has been transmitted reaches a preset maximum number of re-transmissions. When the transmission attempt has reached a maximum number of re-transmissions in operation 1810, the terminal discards data that has been transmitted in the uplink transmission process of the previous SI, and then performs the transmission for the next SI in operation 1825.

The embodiment may also be modified in such a way as to perform operation 1815 before operation 1810.

When the transmission attempt has not reached a maximum number of re-transmissions in operation 1810, the terminal is capable of determining whether an NDI is toggled in operation 1815. When an NDI is toggled in operation 1815, the terminal performs operation 1825. When an NDI is not toggled in operation 1815, the terminal performs an operation according to the received feedback ACK/NACK corresponding to individual processes in operation 1820.

In the embodiment, the terminal is capable of ascertaining that an NDI of the first transmission is toggled when a process is set. When an NDI has been toggled or an NDI has been received until the attempt reaches a maximum number of re-transmissions, the terminal is capable of performing an operation related to the next transmission. When an NDI has not been toggled, the terminal is performing the re-transmission. When an NDI has been toggled, the terminal discards a data packet for a corresponding SI and prepares to perform the transmission for the next SI. When an NDI has not been received, the terminal performs an operation according to the received feedback ACK/NACK information.

Figure 19:
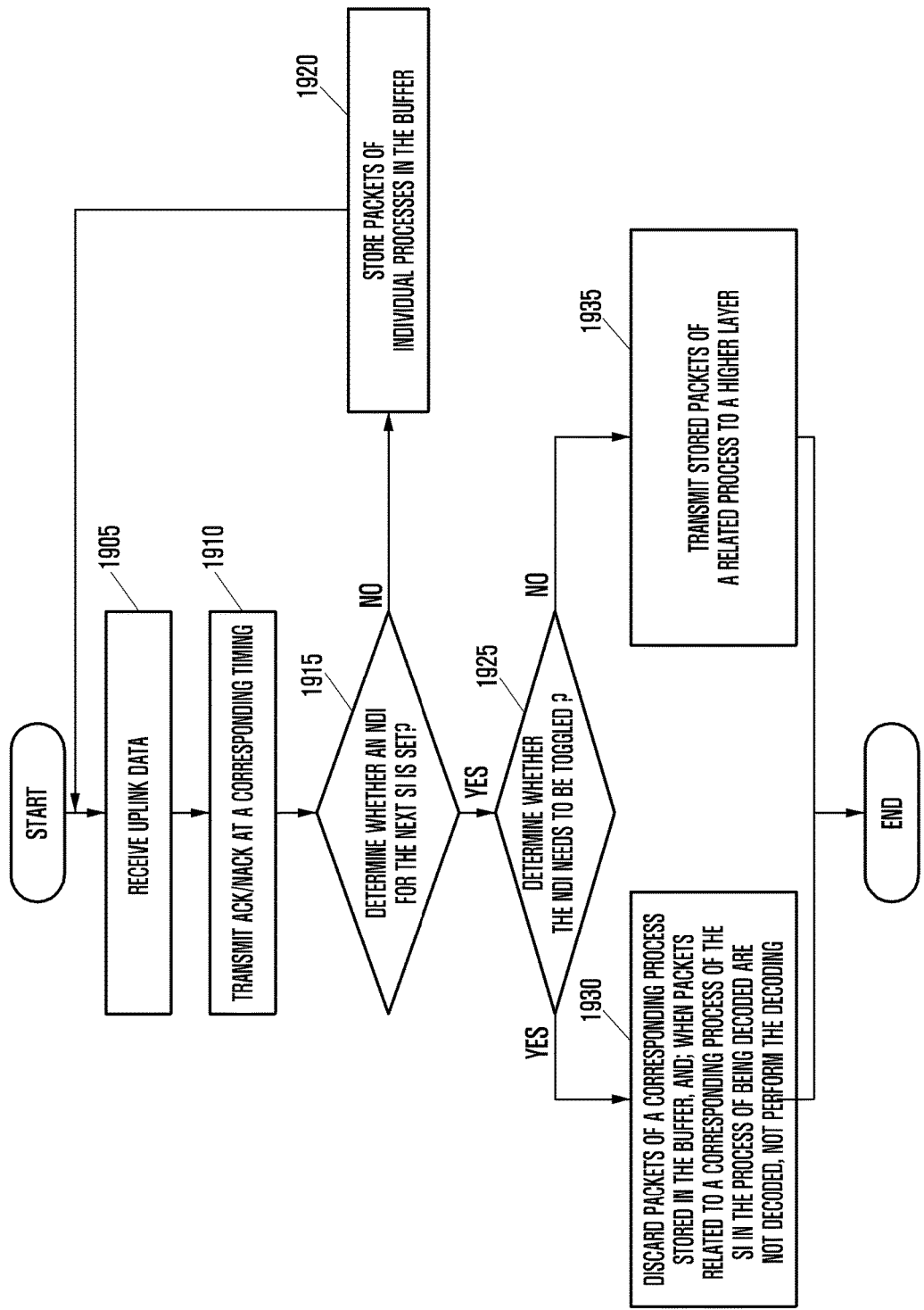
FIG. 19 is a flowchart that describes operations of a base station according to a fifth embodiment of the present disclosure.

FIG. 19 is a flowchart that describes operations of a base station according to a fifth embodiment of the present disclosure.

With reference to FIG. 19, the base station is capable of transmitting/receiving signals to/from a terminal.

The base station is capable of receiving uplink data corresponding to an SI in operation 1905. The base station may transmit scheduling information regarding the uplink data to the terminal before operation 1905.

The base station is capable of transmitting feedback ACK/NACK information to the terminal at a timing corresponding to a process related to the received uplink data in operation 1910. The corresponding timing may be set to any value according to embodiments. In the embodiment, the base station is capable of transmitting feedback ACK/NACK information via a downlink subframe corresponding to the fourth subframe after the received uplink data subframe.

The base station is capable of determining whether an NDI for the next SI is set in operation 1915. A condition as to whether an NDI for the next SI is set may be determined based on the received uplink data and/or feedback ACK/NACK information.

When an NDI for the next SI has not been set in operation 1915, the base station stores received uplink data packets of individual processes in the buffer in operation 1920.

When an NDI for the next SI has been set in operation 1915, the base station is capable of determining whether an NDI needs to be toggled in operation 1925. A condition as to whether an NDI needs to be toggled may be determined based on the received uplink data and a present number of re-transmissions.

When an NDI needs to be toggled in operation 1925, the base station discards packets of a corresponding process stored in the buffer, and may not decode packets related to a corresponding process of the SI in the process of being decoded in operation 1930. More specifically, when packets related to a corresponding process of the SI in the process of being decoded are not decoded, the base station may not perform the decoding.

When an NDI does not need to be toggled in operation 1925, the base station ascertains that data has been successfully received, transmits stored packets of a related process to a higher layer, and continues transmitting packets of a remaining process related to the current SI to the higher layer in operation 1935. More specifically, the base station continues transmitting successfully received packets corresponding to individual processes to the higher layer.

In the embodiment, the base station is capable of transmitting the feedback ACK/NACK information every timing point corresponding to each process. In the embodiment, the base station may store decoded packets of all the processes in a soft buffer until an NDI for the next SI is set, and may not transmit the packets to a higher layer until it ascertains the success of reception.

When the base station decides not to toggle the NDI, it may transmit the stored packets of a related process to a higher layer, and continues transmitting packets of the remaining process of a corresponding SI to the higher layer.

When the base station decides to toggle the NDI, it discards stored packets of a corresponding process, and may not decode packets corresponding to the remaining process of a corresponding SI.

Figure 20:
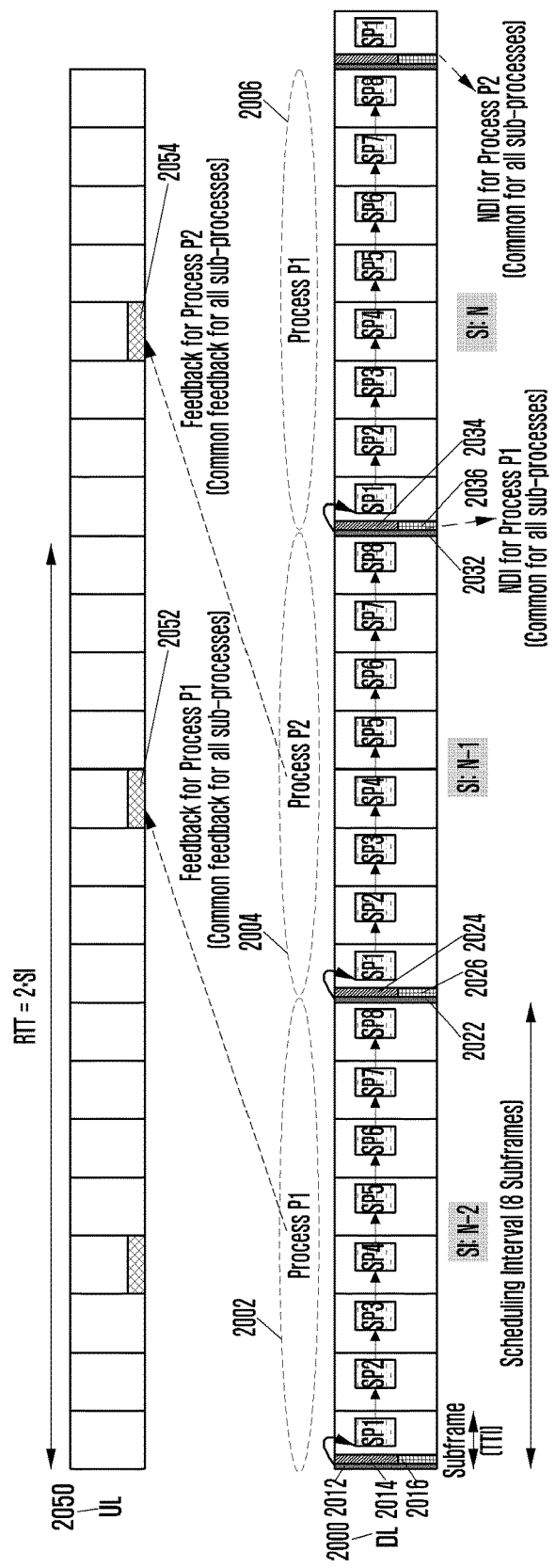
FIG. 20 is a structure of a subframe for a downlink HARQ according to a sixth embodiment of the present disclosure.

FIG. 20 is a structure of a subframe for a downlink HARQ according to a sixth embodiment of the present disclosure.

With reference to FIG. 20, a terminal is capable of receiving, from a base station, control information and data via a downlink channel 2000 and transmitting, to the base station, the feedback ACK/NACK information related to the received downlink data, via an uplink channel 2050. In the embodiment, ACK/NACK information may be transmitted via a Physical Uplink Control Channel (PUCCH).

In the embodiment, one process corresponds to a length of SI and may be configured to include eight subframes. The number of subframes configuring one process may be set to any other value according to embodiments. In the embodiment, an RTT corresponds to two SIs.

In the embodiment, the transmission of downlink data may be performed via a number of processes 2002, 2004, and 2006, each of which includes at least one sub-process.

In the embodiment, downlink control information, containing at least one of the following: PHICHs 2012, 2022, and 2032, PDCCHs 2014, 2024, and 2034 or NDIs 2016, 2026, and 2036 may be transmitted via the first downlink subframe of each SI.

PDCCHs 2014, 2024, and 2034 may contain scheduling information related to downlink data transmitted via subframes configuring an SI. More specifically, PDCCHs 2014, 2024, and 2034 may indicate the same resource areas of a number of subframes configuring an SI, so that the terminal can receive data via the indicated area.

The downlink data transmission of a first process 2002 may be performed according to downlink scheduling information allocated on PDCCH 2014. The transmission of a second process 2054 may be performed according to downlink scheduling information allocated on PDCCH 2024 of the next SI.

Feedback information containing all the sub-processes transmitted in the first process 2002 may be transmitted to the base station via an uplink control channel 2052. Alternatively, feedback information containing all the sub-processes transmitted in the second process 2004 may be transmitted to the base station via an uplink control channel 2054. Common feedback information may contain feedback information regarding transmission results of all the sub-processes. When the transmission result of at least one sub-process is NACK, the common feedback may be NACK.

The base station is capable of transmitting, to the terminal, a common NDI 2036 corresponding to the downlink data transmission according to a first process 2002. The base station is capable of transmitting, to the terminal, a common NDI corresponding to the downlink data transmission according to a second process 2004, via the first downlink subframe of the next SI. The common NDI may indicate whether new data according to all the sub-processes is transmitted.

In the embodiment, NDIs may indicate whether new data according to individual processes is transmitted. More specifically, an NDI of the downlink transmitted in the N-2nd SI may be transmitted via a specified subframe of the downlink corresponding to the Nth process, and an NDI, determined according to data transmitted via all the sub-processes included in each process, may be transmitted. Therefore, an NDI may be determined based on the downlink transmission of the previous process.

HARQ feedback may also be performed according to processes. More specifically, Ack/Nack of the downlink transmitted in the N-2nd SI may be transmitted via a specified subframe of the uplink corresponding to the Nth process, and feedback in response to data transmitted in all the sub-processes included in each process may be transmitted simultaneously. Therefore, an Ack/Nack may be determined based on the downlink transmission of the previous process.

In the embodiment, one process may be related to one or more transmissions per SI.

Individual sub-processes may be successively configured in a process. In this case, the downlink transmission is performed via two processes, and thus an RTT may be twice the value of a legacy RTT.

Figure 21:
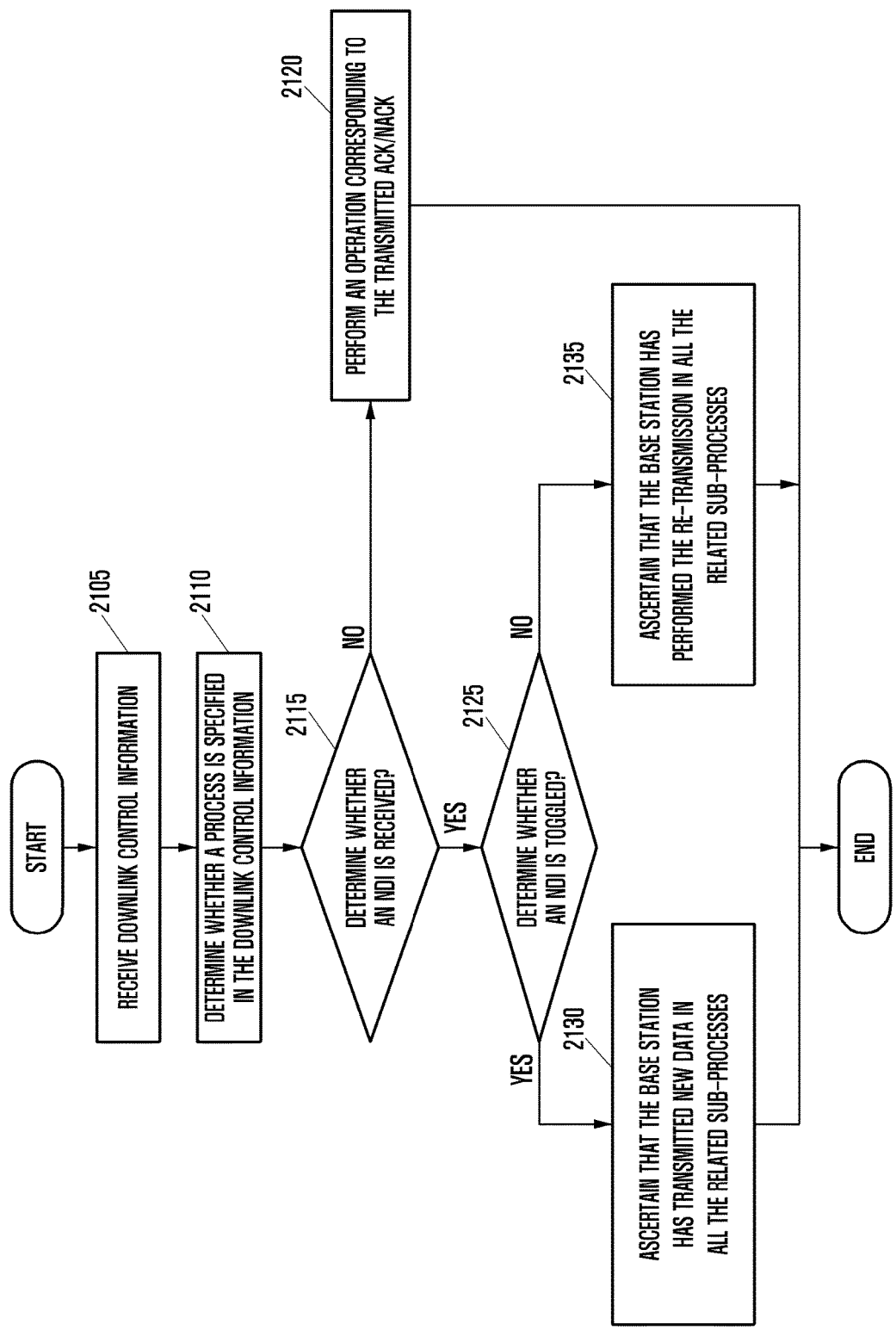
FIG. 21 is a flowchart that describes operations of a terminal according to a sixth embodiment of the present disclosure.

FIG. 21 is a flowchart that describes operations of a terminal according to a sixth embodiment of the present disclosure.

With reference to FIG. 21, the terminal is capable of transmitting/receiving signals to/from a base station.

The terminal is capable of receiving downlink control information from the base station in operation 2105. More specifically, the terminal is capable of receiving downlink control information via the first downlink subframe corresponding to one SI. The downlink control information may contain at least one of the following: scheduling information, feedback information and an NDI.

The terminal is capable of determining whether a process related to MSS is specified in the downlink control information and performing a corresponding operation according to the determination in operation 2110.

The terminal is capable of determining whether an NDI related to the downlink transmission is received in the downlink control information in operation 2115. When an NDI has not been received in operation 2115, the terminal is capable of receiving downlink data according to feedback ACK/NACK information, in the downlink, which has been transmitted to the base station in the previous process, in operation 2120. The related feedback ACK/NACK information may correspond to a process, and may represent feedback information regarding all the sub-processes included in the corresponding process.

When an NDI has been received in operation 2115, the terminal is capable of determining whether the received NDI is toggled in operation 2125.

When the received NDI has been toggled in operation 2125, the terminal ascertains that the base station has transmitted new data in all the sub-processes related to the toggled NDI, and receives downlink data from the base station in operation 2130.

When the received NDI has not been toggled in operation 2125, the terminal ascertains that the base station has performed the re-transmission in all the sub-processes related to the NDI which has not been toggled, and receives downlink data according to the ascertainment from the base station in operation 2135.

In the embodiment, when the terminal has been set with a process and receives all the related sub-processes, it ascertains that an NDI has been toggled and receives data of the corresponding process.

When an NDI is received and is not toggled, the terminal ascertains that the base station has performed the re-transmission in all the related sub-processes, and performs a corresponding operation. When an NDI is toggled, the terminal ascertains that the base station has transmitted new data in all the related sub-processes, and performs a corresponding operation.

Figure 22:
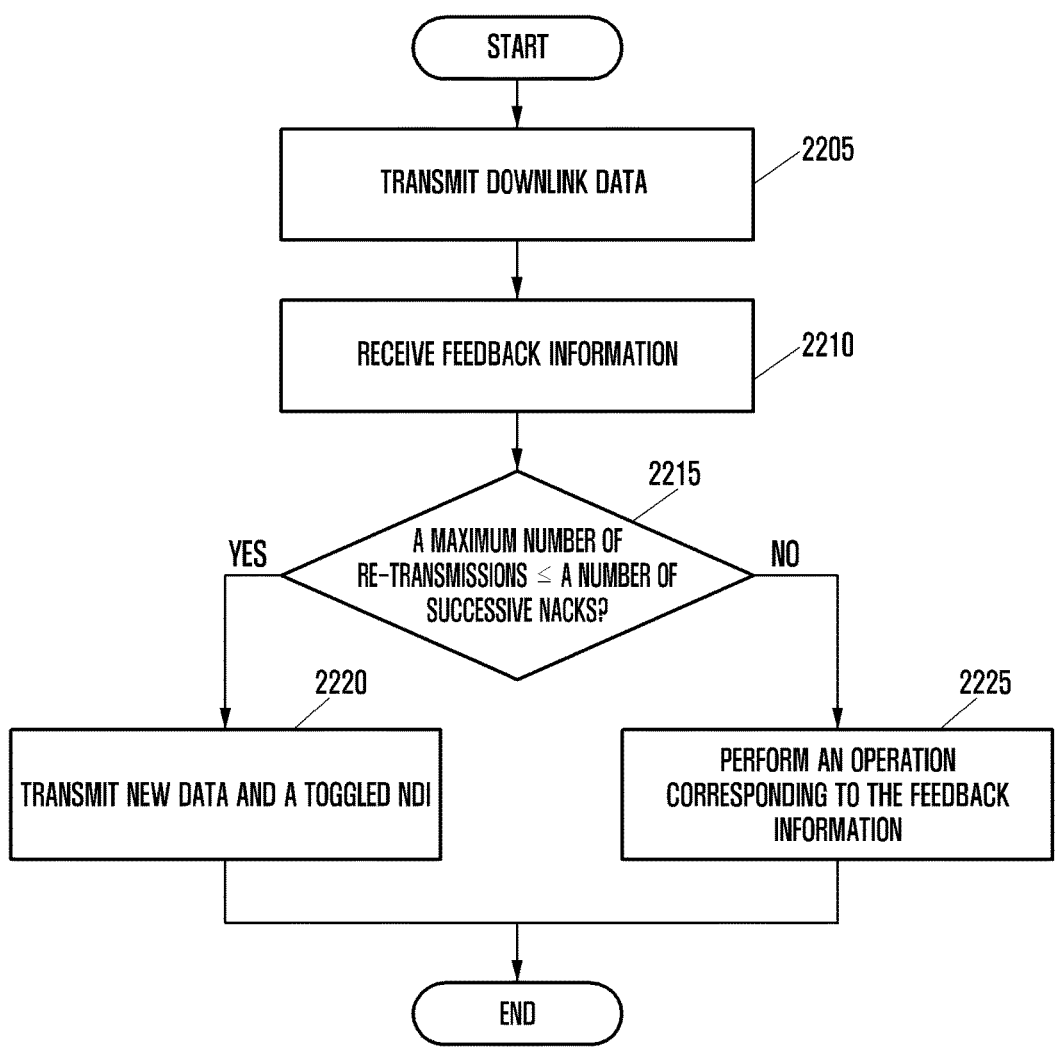
FIG. 22 is a flowchart that describes operations of a base station according to a sixth embodiment of the present disclosure.

FIG. 22 is a flowchart that describes operations of a base station according to a sixth embodiment of the present disclosure.

With reference to FIG. 22, the base station is capable of transmitting/receiving signals to/from a terminal.

The base station is capable of transmitting downlink data related to a corresponding process according to scheduling information that has been transmitted, in operation 2205. More specifically, a number of processes may be transmitted sequentially, and each process may contain a number of sub-processes.

The base station is capable of receiving feedback ACK/NACK information in response to the transmitted downlink data, in operation 2210. The feedback ACK/NACK information may be included in and transmitted via the uplink subframe corresponding to the transmitted process. The feedback ACK/NACK information may be common feedback ACK/NACK information regarding all the transmitted sub-processes.

When feedback information based on received feedback information is NACK and the number of successive NACKs is greater than or equal to a preset maximum number of re-transmissions in operation 2215, the base station is capable of transmitting new data along with a toggled NDI in operation 2220. The toggled NDI may be included in or transmitted via PDCCH of a downlink corresponding to a process receiving the NACK.

When the number of successive NACKs is less than a preset maximum number of re-transmissions in operation 2215, the base station is capable of performing an operation according to the feedback information in operation 2225. More specifically, when the base station receives NACK, it re-transmits the existing data according to the NACK. When the base station receives ACK, it transmits new data.

Figure 23:
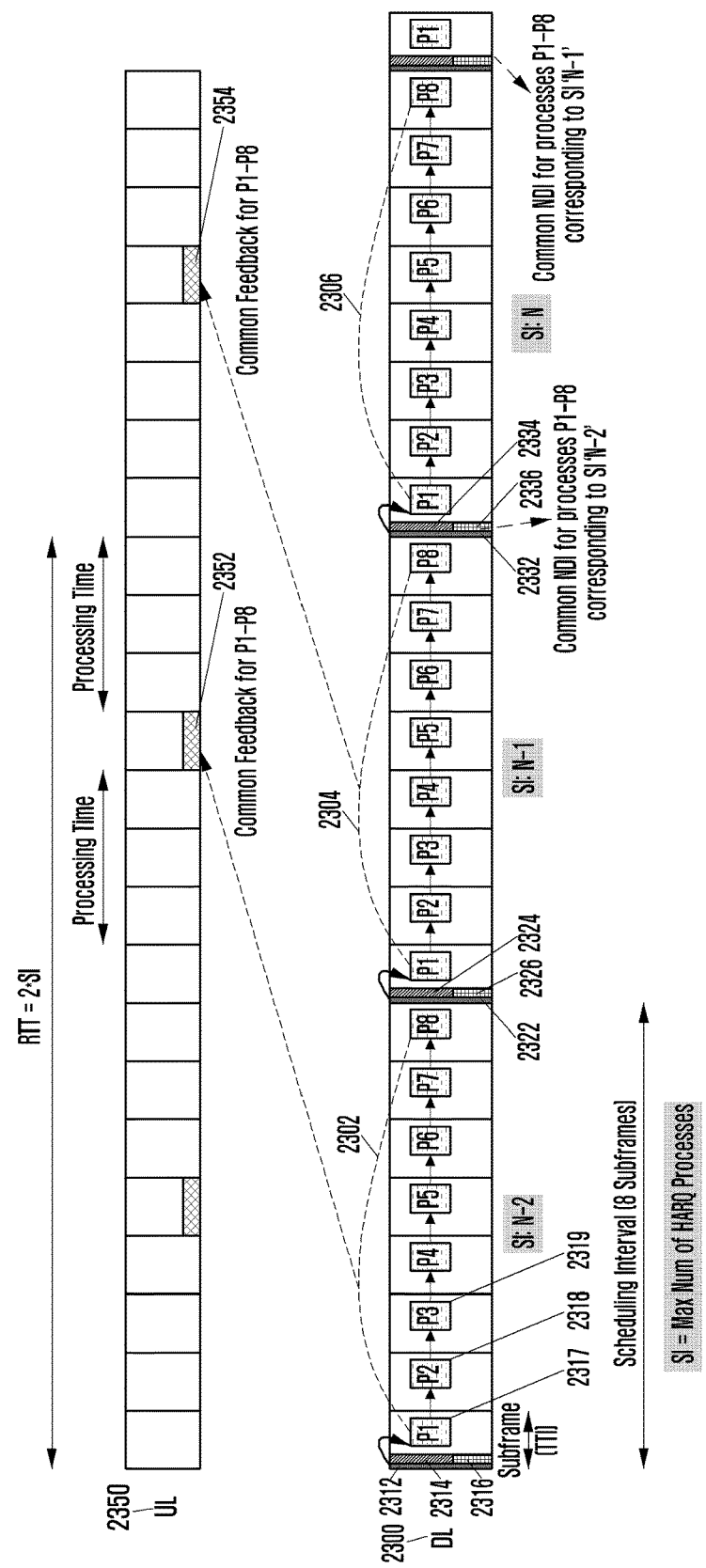
FIG. 23 is a structure of a subframe for a downlink HARQ according to a seventh embodiment of the present disclosure.

FIG. 23 is a structure of a subframe for a downlink HARQ according to a seventh embodiment of the present disclosure.

With reference to FIG. 23, a terminal is capable of receiving, from a base station, control information and data via a downlink channel 2300, and transmitting, to the base station, feedback ACK/NACK information in response to the received downlink data via an uplink channel 2350. In the embodiment, the ACK/NACK information may be transmitted via PUCCH of a specified subframe.

In the embodiment, an SI may include eight subframes, and data may be transmitted according to a process corresponding to each subframe. The number of subframes configuring one process may be set to any other value according to embodiments. In the embodiment, an RTT corresponds to two SIs.

In the embodiment, common feedback information regarding the downlink data transmission 2302 of the N-2nd SI may be transmitted via the transmission 2352, and common feedback information regarding the downlink data transmission 2304 of the N-1st SI may be transmitted via the transmission 2354. The feedback may contain common feedback ACK/NACK information regarding individual processes. When the transmission result of at least one process included in each SI is NACK, the common feedback may be NACK.

In the embodiment, downlink control information containing at least one of the following: PHICHs 2312, 2322, and 2332, PDCCHs 2314, 2324, and 2334 or NDIs 2316, 2326, and 2336 may be transmitted via the first downlink subframe of each SI.

PDCCHs 2314, 2324, and 2334 may contain scheduling information related to downlink data transmitted via subframes configuring an SI. More specifically, PDCCHs 2314, 2324, and 2334 may indicate the same resource area of a number of subframes configuring an SI, so that the terminal can receive data via the indicated area.

The base station is capable of transmitting, to the terminal, common NDI 2336 corresponding to the downlink data transmission according to the N-2nd SI, and common NDI corresponding to the downlink data transmission according to the N-1st SI via the first downlink subframe of the next SI. The common NDI may indicate whether new data according to all the sub-processes needs to be transmitted.

In the embodiment, one process may be related to one or more transmissions per SI.

In the embodiment, the downlink transmission is performed via two processes, and thus an RTT may be twice the value of a legacy RTT.

In the embodiment, a common NDI for all the processes of an MSS SI may be transmitted. More specifically, according to embodiments, a common NDI for the downlink transmission in the N-2nd SI may be transmitted via the uplink subframe corresponding to the Nth SI. Alternatively, a common NDI for part of the process in the N-1st SI and part of the process in the N-2nd SI may be transmitted via the uplink subframe corresponding to the Nth SI.

In the embodiment as described above, common feedback regarding all the processes of an MSS SI may be transmitted. More specifically, according to embodiments, common feedback regarding the downlink transmission in the N-2nd SI may be transmitted via a subframe of a corresponding specified uplink. Alternatively, common feedback regarding part of the process in the N-1st SI and part of the process in the N-2nd SI may be transmitted via a subframe of a corresponding specified uplink. In the embodiment, data transmitted in a process, included in an SI in the initial transmission, may be re-transmitted at least once. The re-transmission may be performed in such a way as to transmit the same data as transmitted in the previous SI or not to transmit any data. Alternatively, the re-transmission may be performed in such a way as to transmit: data for another terminal; or preset data. In the embodiment, downlink control information may carry NDIs for a number of processes. In the embodiment, data related to an SI, first received by the terminal, may be compulsorily re-transmitted.

Figure 24:
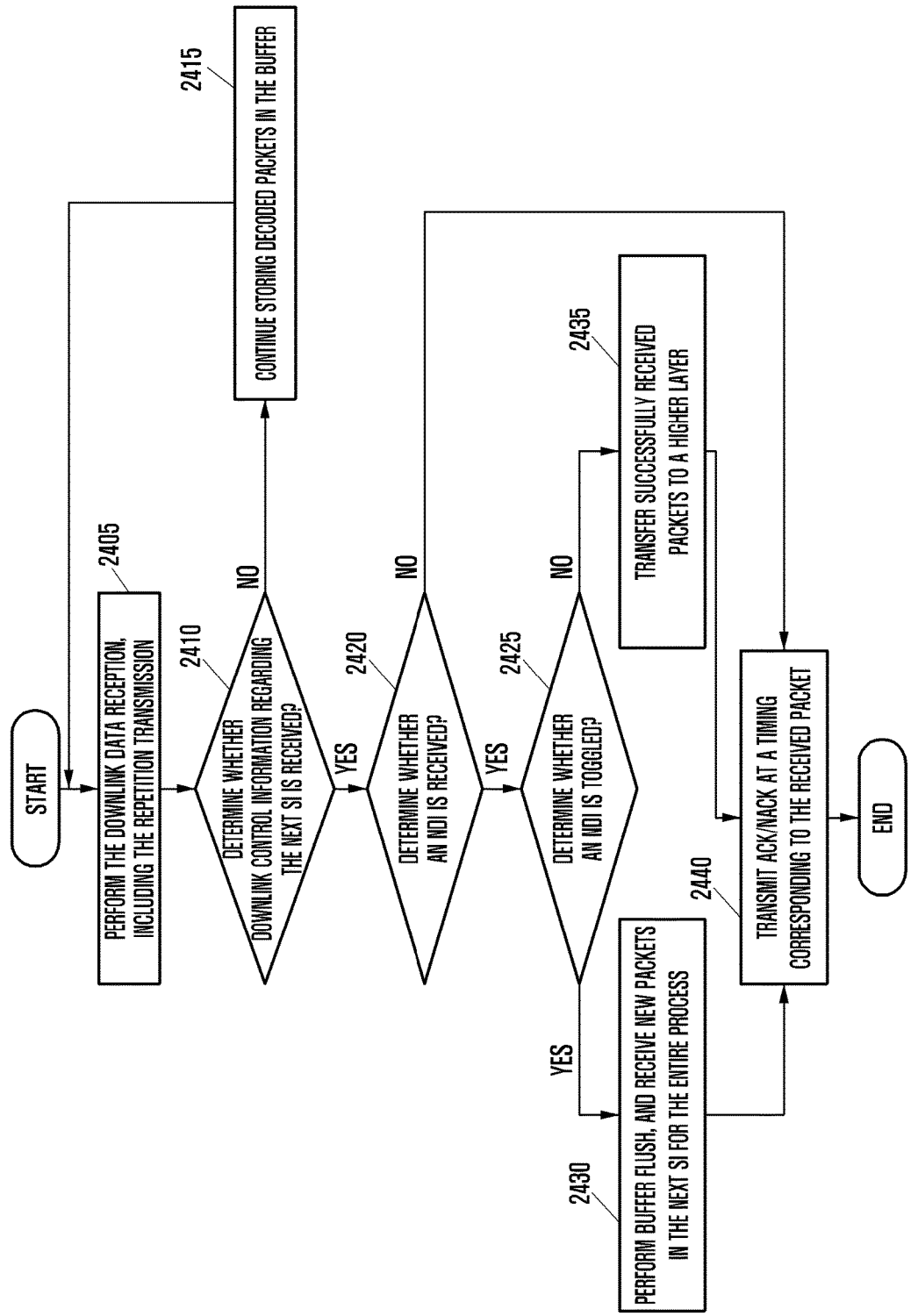
FIG. 24 is a flowchart that describes operations of a terminal according to a seventh embodiment of the present disclosure.

FIG. 24 is a flowchart that describes operations of a terminal according to a seventh embodiment of the present disclosure.

With reference to FIG. 24, the terminal is capable of transmitting/receiving signals to/from a base station.

The terminal is capable of receiving downlink data considering the repetition transmission, via at least one subframe scheduled according to downlink control information, in operation 2405. More specifically, as described above in the embodiment, the terminal is capable of receiving: scheduling information regarding a number of subframes via downlink control information; and downlink data considering the repetition transmission.

The terminal is capable of determining whether downlink control information regarding the next SI of the received downlink data is received in operation 2410. In the embodiment, the next SI may be referred to as an SI during which NDI information related to the downlink data transmission of the previous process.

When downlink control information has not been received in operation 2410, the terminal continues storing decoded packets in the buffer in operation 2415.

When downlink control information has been received in operation 2410, the terminal is capable of determining whether the received control information contains an NDI in operation 2420. When the received control information does not contain an NDI in operation 2420, the terminal is capable of transmitting common ACK/NACK information regarding the received packets to the base station via uplink control information in operation 2440.

When the received control information contains an NDI in operation 2420, the terminal is capable of determining whether an NDI is toggled in operation 2425. When an NDI is toggled in operation 2425, the terminal ascertains that new data is transmitted, flushes data stored in the buffer, and receives new packets in the next SI for the entire process in operation 2430. When an NDI is not toggled in operation 2425, the terminal is capable of transferring successfully received packets to a higher layer in operation 2435.

After that, the terminal is capable of transmitting ACK/NACK at a timing corresponding to the received packet in operation 2440.

In the embodiment, with respect to an SI first received since a process is set, the terminal may ascertain that an NDI has been toggled. With respect to data corresponding to the first received SI, the terminal may ascertain that the same data has been re-transmitted. This is because the base station may not determine whether the transmission succeeds before receiving the feedback. Therefore, the terminal may re-transmit data that has been transmitted or may transmit data for another terminal.

Alternatively, the terminal may decode packets corresponding to a process included in a specified SI and may transfer the decoded packets to the buffer until PDCCH for the next SI is transmitted. The terminal may not transfer the decoded packets to a higher layer.

In the embodiment, the terminal may repeat the following operations until an NDI is toggled or the attempt reaches a maximum number of re-transmissions. When an NDI is not toggled, the terminal ascertains that the stored packets have been successfully received, and transfers the packets to a higher layer. When an NDI is toggled, the terminal ascertains that new data is transmitted, flushes in the soft buffer, and stores packets received during the next SI in the buffer.

The terminal is capable of performing the transmission of feedback ACK/NACK in response to the received downlink data at a corresponding timing.

Figure 25:
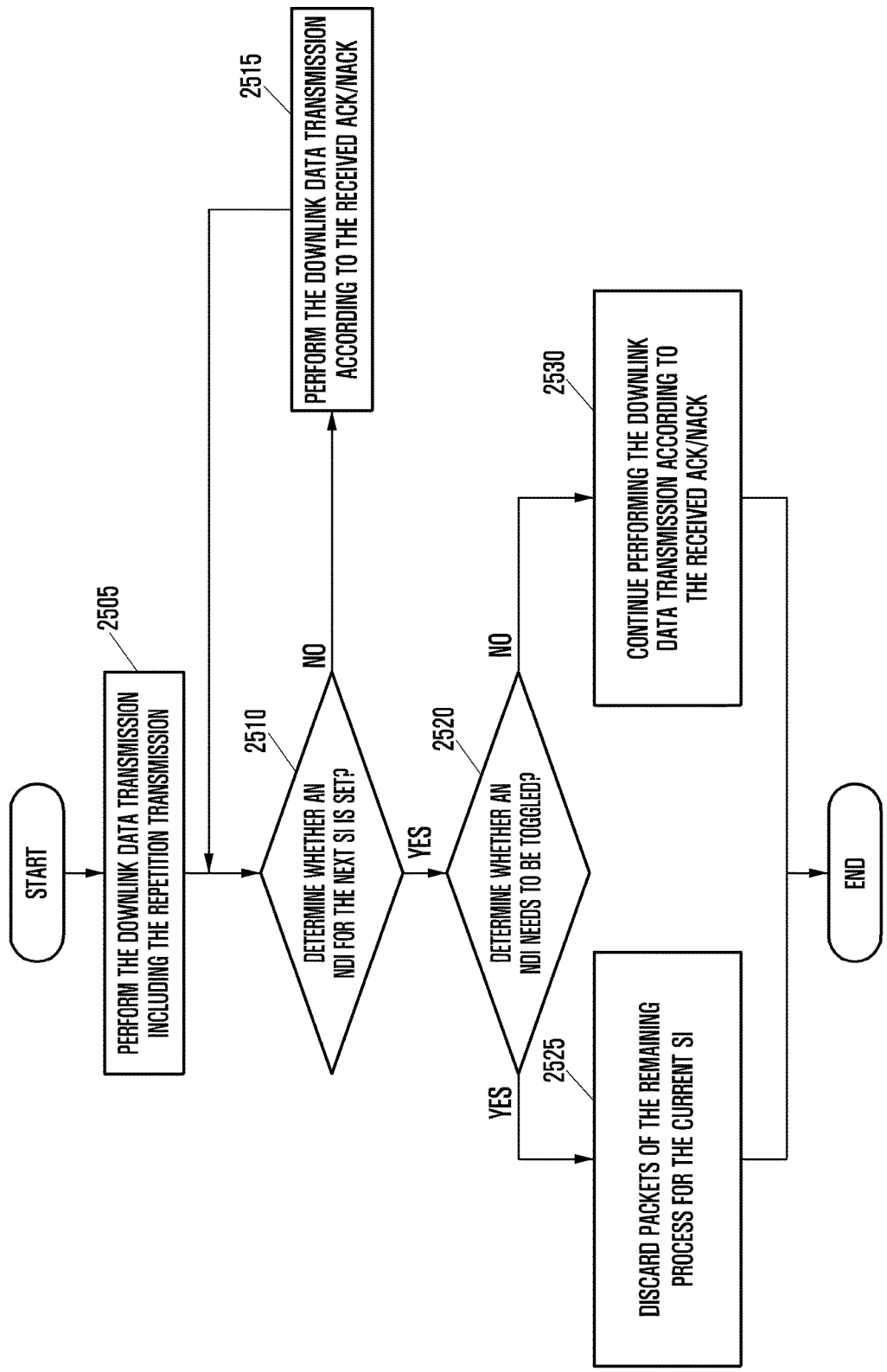
FIG. 25 is a flowchart that describes operations of a base station according to a seventh embodiment of the present disclosure.

FIG. 25 is a flowchart that describes operations of a base station according to a seventh embodiment of the present disclosure.

With reference to FIG. 25, the base station is capable of transmitting/receiving signals to/from a terminal.

The base station is capable of performing the downlink data transmission including the repetition transmission performed in the first transmission in operation 2505.

The base station is capable of determining whether an NDI for the next SI is set in operation 2510. When an NDI for the next SI has not been set in operation 2510, the base station is capable of transmitting, to the terminal, downlink data based on the feedback ACK/NACK information received from the terminal in operation 2515.

When an NDI for the next SI has been set in operation 2510, the base station is capable of determining whether an NDI needs to be toggled in operation 2520. When an NDI needs to be toggled in operation 2520, the base station discards received packets of the remaining process for the current SI in operation 2525. When an NDI does not need to be toggled in operation 2520, the base station continues performing the downlink data transmission according to the received ACK/NACK in operation 2530.

In the embodiment, the base station may ignore an NDI, with respect to the first transmission since a process is set. The base station may perform the compulsory re-transmission until an NDI is set since the first transmission. In the embodiment, the base station continues transmitting data to the terminal, based on feedback ACK/NACK information until an NDI for the next SI is set.

Figure 26:
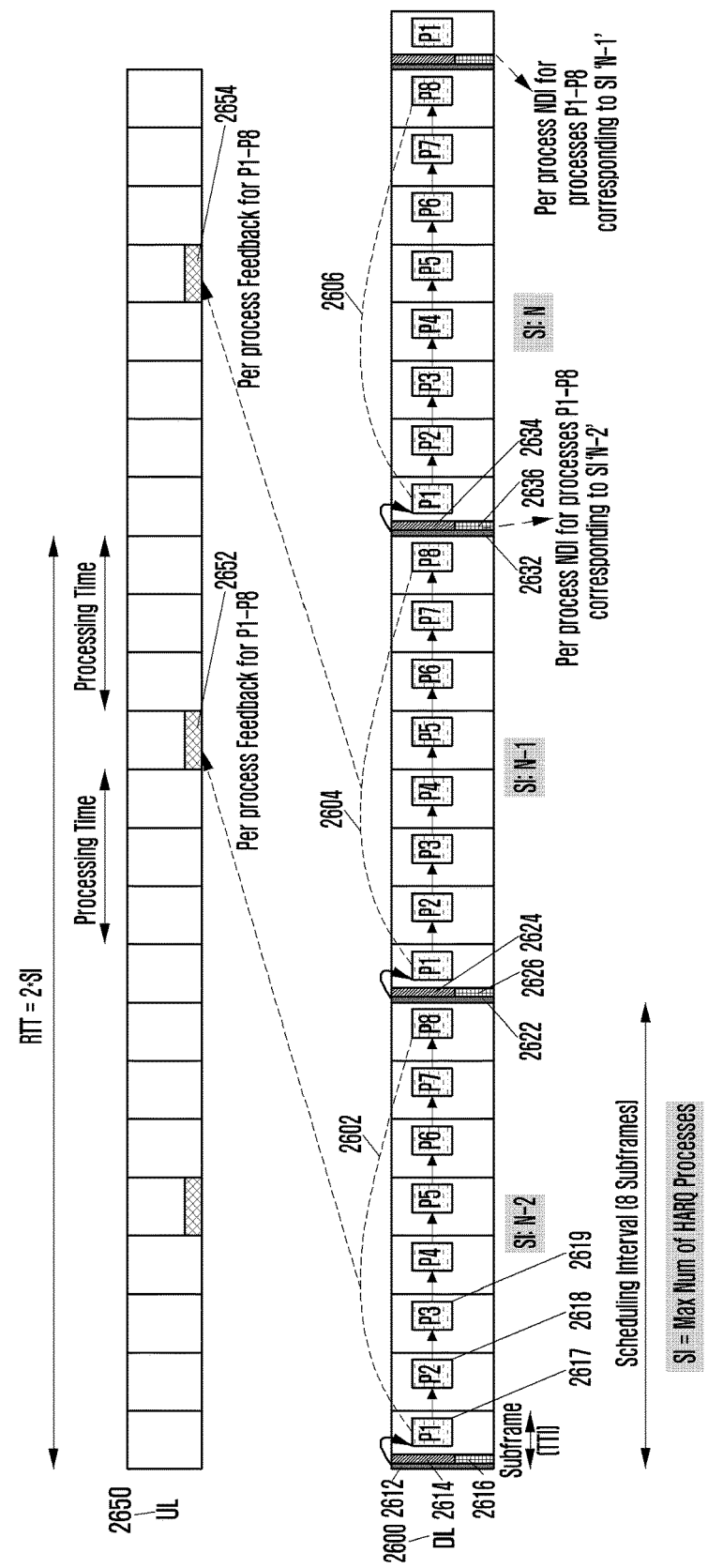
FIG. 26 is a structure of a subframe for a downlink HARQ according to an eighth embodiment of the present disclosure.

FIG. 26 is a structure of a subframe for a downlink HARQ according to an eighth embodiment of the present disclosure.

With reference to FIG. 26, a terminal is capable of receiving, from a base station, control information and data via a downlink channel 2600 and transmitting, to the base station, the feedback ACK/NACK information related to the received downlink data, via an uplink channel 2650. In the embodiment, ACK/NACK information may be transmitted via PUCCH of a specified subframe.

In the embodiment, an SI may include eight subframes, and data may be transmitted according to a process corresponding to each subframe. The number of subframes configuring one process may be set to any other value according to embodiments. In the embodiment, an RTT corresponds to two SIs.

In the embodiment, feedback information regarding each process in the downlink data transmission 2602 of the N-2nd SI may be transmitted via the transmission 2652, and feedback information regarding each process in the downlink data transmission 2604 of the N-1st SI may be transmitted via the transmission 2654. The feedback in response to individual processes may be transmitted in the format of bitmaps corresponding to the processes.

In the embodiment, downlink control information containing at least one of the following: PHICHs 2612, 2622, and 2632, PDCCHs 2614, 2624, and 2634 or NDIs 2616, 2626, and 2636 may be transmitted via the first downlink subframe of each SI.

PDCCHs 2614, 2624, and 2634 may contain scheduling information related to downlink data transmitted via subframes configuring an SI. More specifically, PDCCHs 2614, 2624, and 2634 may indicate the same resource area of a number of subframes configuring an SI, so that the terminal can receive data via the indicated area.

The base station is capable of transmitting, to the terminal, NDIs 2636 according to individual processes corresponding to the downlink data transmission according to the N-2nd SI, and NDIs according to individual processes corresponding to the downlink data transmission according to the N-1st SI via the first downlink subframe of the next SI. The common NDI may indicate whether new data according to all the sub-processes needs to be transmitted.

In the embodiment, NDIs may indicate whether new data according to individual processes needs to be transmitted. More specifically, an NDI for the downlink transmitted in the N-2nd SI may be transmitted via a specified subframe of a downlink corresponding to the Nth process, and an NDI, determined data transmitted in all the sub-processes included in each process, may be transmitted. Therefore, an NDI may be determined based on downlink transmitted in the previous process.

In the embodiment, one process may be related to one or more transmissions per SI.

In the embodiment, the downlink transmission is performed via two processes, and thus an RTT may be twice the value of a legacy RTT.

In the embodiment, NDIs for individual processes of an MSS SI may be transmitted. More specifically, according to embodiments, NDIs according to individual processes for the downlink transmission in the N-2nd SI may be transmitted via the uplink subframe corresponding to the Nth SI.

Alternatively, NDIs according to individual processes for part of the process in the N-1st SI and part of the process in the N-2nd SI may be transmitted via the uplink subframe corresponding to the Nth SI. In the embodiment, NDIs according to individual processes may have bitmap formats corresponding to the individual processes.

In the embodiment as described above, feedback regarding individual processes of an MSS SI may be transmitted. More specifically, according to embodiments, feedback according to individual processes for the downlink transmission in the N-2nd SI may be transmitted via a subframe of a corresponding specified uplink. Alternatively, feedback according to individual processes for part of the process in the N-1st SI and part of the process in the N-2nd SI may be transmitted via a subframe of a corresponding specified uplink.

In the embodiment, data transmitted in a process, included in an SI in the initial transmission, may be re-transmitted at least once. The re-transmission may be performed in such a way as to transmit the same data as transmitted in the previous SI or not to transmit any data. Alternatively, the re-transmission may be performed in such a way as to transmit: data for another terminal; or preset data. This re-transmission may also be called a compulsory re-transmission in the embodiments. In the embodiment, downlink control information may carry NDIs for a number of processes. In the embodiment, data related to an SI, first received by the terminal, may be compulsorily re-transmitted.

Figure 27:
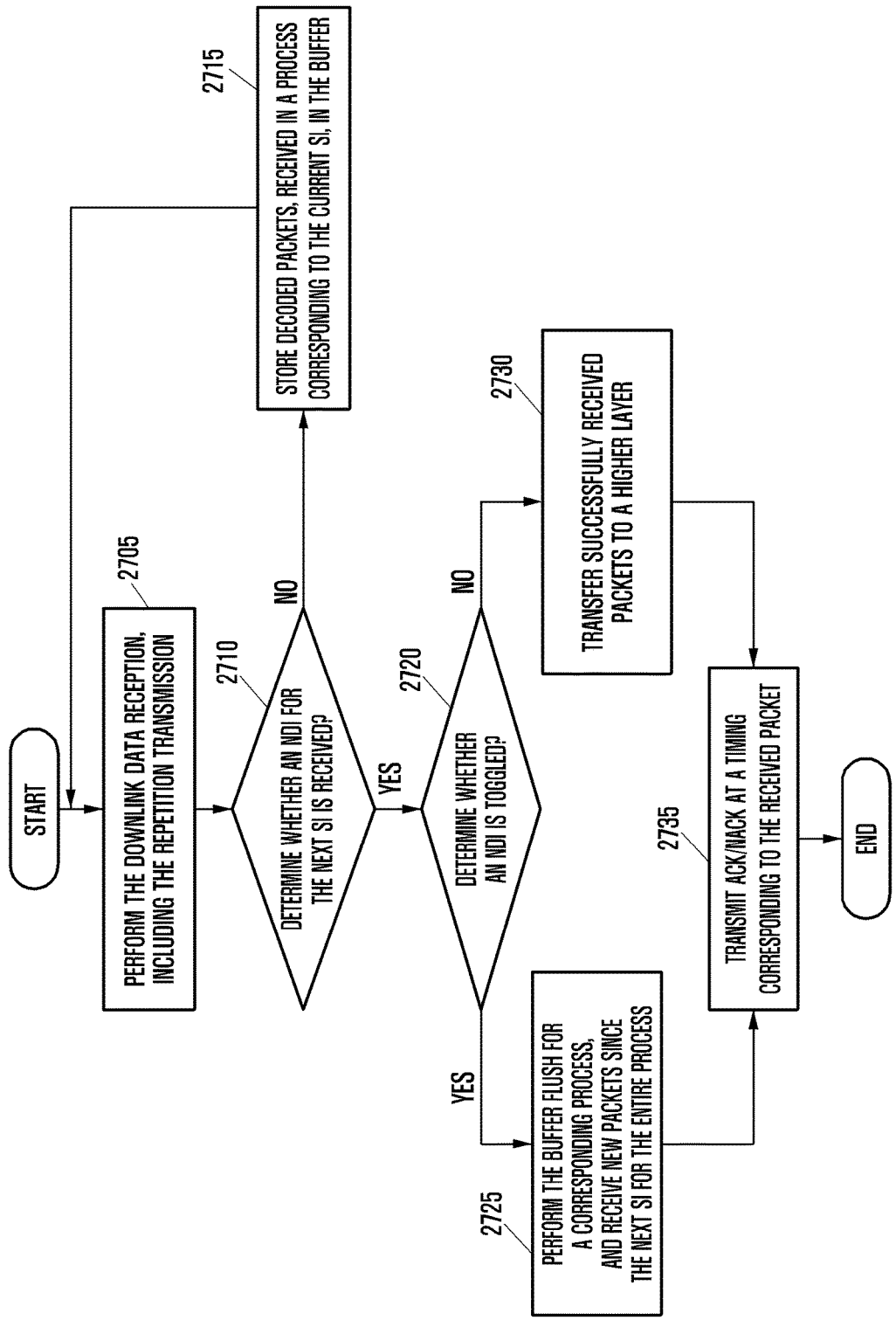
FIG. 27 is a flowchart that describes operations of a terminal according to an eighth embodiment of the present disclosure.

FIG. 27 is a flowchart that describes operations of a terminal according to an eighth embodiment of the present disclosure.

With reference to FIG. 27, the terminal is capable of transmitting/receiving signals to/from a base station.

The terminal is capable of receiving downlink data considering the repetition transmission, via at least one subframe scheduled according to downlink control information, in operation 2705. More specifically, as described above in the embodiment, the terminal is capable of receiving: scheduling information regarding a number of subframes via downlink control information; and downlink data considering the repetition transmission.

The terminal is capable of determining whether an NDI for the next SI is received in operation 2710. When an NDI for the next SI is not received in operation 2710, the terminal is capable of storing decoded packets, received in a process corresponding to the current SI, in the buffer in operation 2715.

When an NDI for the next SI is received in operation 2710, the terminal is capable of determining whether an NDI is toggled in operation 2720. In the embodiment, the determination for NDIs may be performed according to processes. When an NDI is toggled in operation 2720, the terminal performs the buffer flush for a corresponding process and receives new packets since the next SI for corresponding processes in operation 2725. When an NDI is not toggled in operation 2720, the terminal transfers successfully received packets to a higher layer in operation 2730.

After that, the terminal is capable of transmitting ACK/NACK via an uplink control channel at a timing corresponding to the received packet in operation 2735.

In the embodiment, with respect to an SI first received since a process is set, the terminal may ascertain that an NDI has been toggled. With respect to data corresponding to the first received SI, the terminal may ascertain that the same data has been re-transmitted. This is because the base station may not determine whether the transmission succeeds before receiving the feedback. Therefore, the terminal may re-transmit data that has been transmitted or may transmit data for another terminal.

Alternatively, the terminal may decode packets corresponding to a process included in a specified SI and may transfer the decoded packets to the buffer until PDCCH for the next SI is transmitted. The terminal may not transfer the decoded packets to a higher layer.

In the embodiment, the terminal may repeat the following operations until an NDI is toggled or the attempt reaches a maximum number of re-transmissions. When an NDI is not toggled, the terminal ascertains that the stored packets have been successfully received, and transfers the packets to a higher layer. When an NDI is toggled, the terminal ascertains that new data is transmitted, flushes in the soft buffer, and stores packets received during the next SI in the buffer.

The terminal is capable of performing the transmission of feedback ACK/NACK in response to the received downlink data at a corresponding timing.

Figure 28:
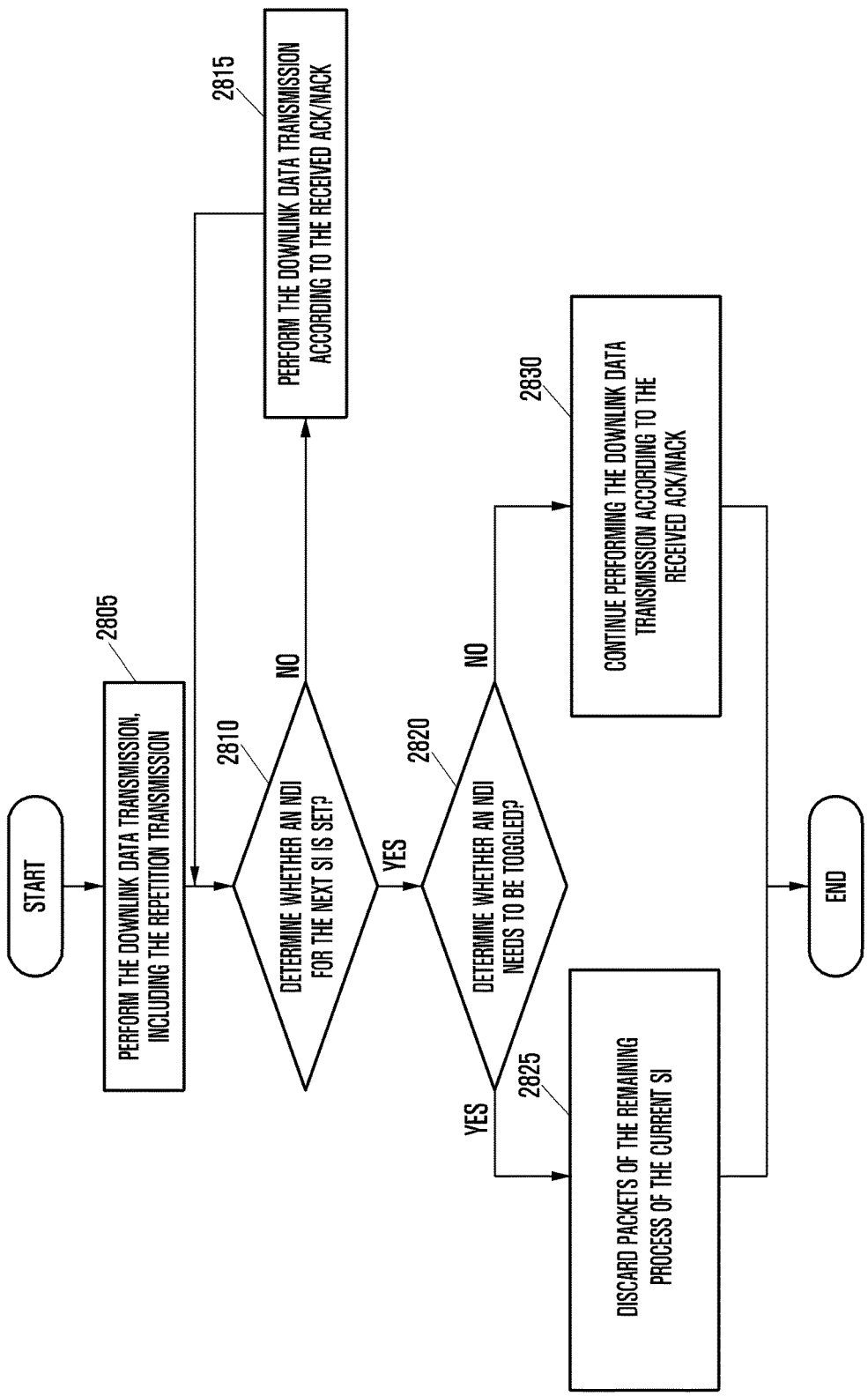
FIG. 28 is a flowchart that describes operations of a base station according to an eighth embodiment of the present disclosure.

FIG. 28 is a flowchart that describes operations of a base station according to an eighth embodiment of the present disclosure.

With reference to FIG. 28, the base station is capable of transmitting/receiving signals to/from a terminal.

The base station is capable of performing the downlink data transmission including the repetition transmission performed in the first transmission in operation 2805.

The base station is capable of determining whether an NDI for the next SI is set in operation 2810. When an NDI for the next SI has not been set in operation 2810, the base station is capable of transmitting, to the terminal, downlink data based on the feedback ACK/NACK information received from the terminal in operation 2815. In the embodiment, NDIs and feedback ACK/NACK information may be specified according to processes.

When an NDI for the next SI has been set in operation 2810, the base station is capable of determining whether an NDI for each process needs to be toggled in operation 2820. When an NDI for each process needs to be toggled in operation 2820, the base station discards received packets of the remaining process of the current SI in operation 2825. When an NDI for each process does not need to be toggled in operation 2820, the base station continues performing the downlink data transmission according to the received ACK/NACK in operation 2830.

In the embodiment, with respect to the first transmission since a process is set, the base station may ignore an NDI. The base station may perform the compulsory re-transmission until an NDI is set since the first transmission. In the embodiment, the base station continues transmitting data to the terminal, based on feedback ACK/NACK information according to individual processes, until NDIs for individual processes included in the next SI are set.

Figure 29:
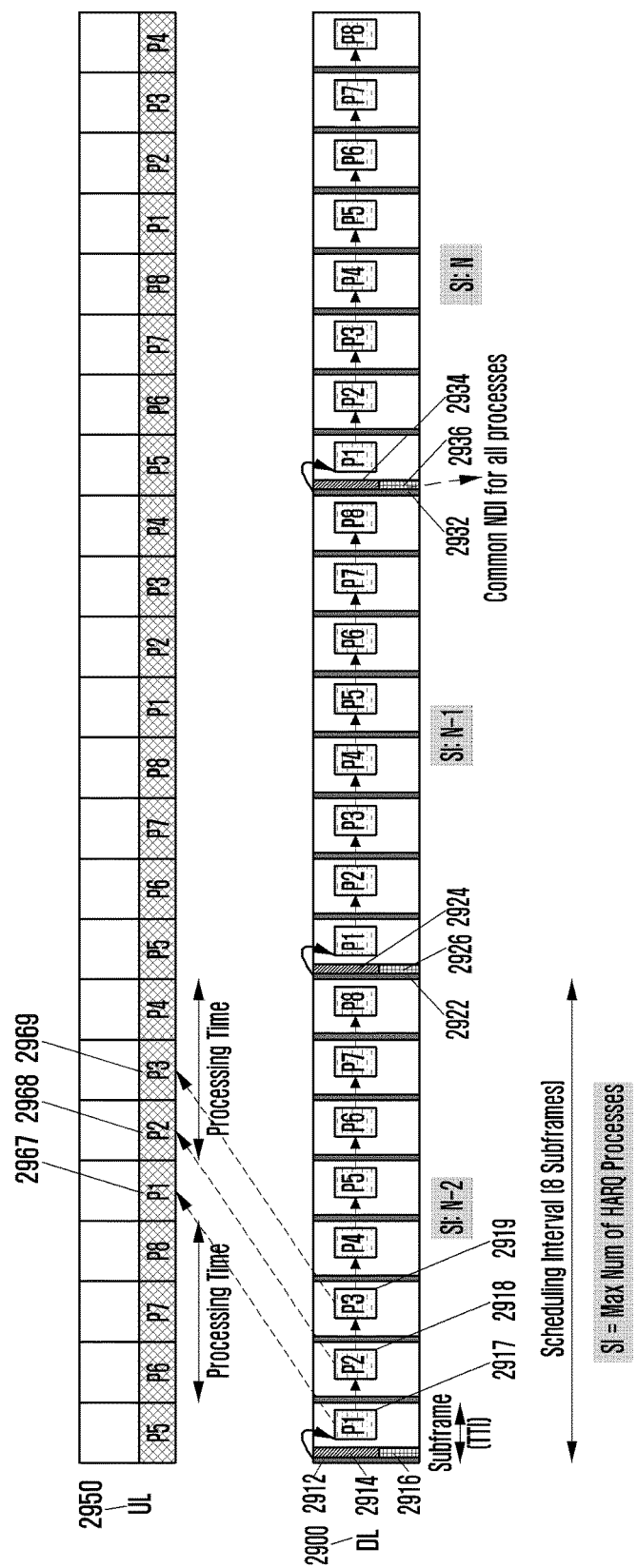
FIG. 29 is a structure of a subframe for a downlink HARQ according to a ninth embodiment of the present disclosure.

FIG. 29 is a structure of a subframe for a downlink HARQ according to a ninth embodiment of the present disclosure.

With reference to FIG. 29, a terminal is capable of receiving, from a base station, control information and data via a downlink channel 2900 and transmitting, to the base station, the feedback ACK/NACK information related to the received downlink data, via an uplink channel 2950. In the embodiment, ACK/NACK information may be transmitted via PUCCH of an uplink subframe corresponding to the received downlink subframe. More specifically, the terminal receives downlink data according to individual processes in reference numbers 2917 to 2919 and transmits the feedback information via reference numbers 2967 to 2969. Therefore, the terminal is capable of promptly transmitting feedback information regarding individual processes to the base station.

In the embodiment, an SI may include eight subframes, and data may be transmitted according to a process corresponding to each subframe. The number of subframes configuring a process may be set to any other value according to embodiments.

In the embodiment, downlink control information containing at least one of the following: PHICHs 2912, 2922, and 2932, PDCCHs 2914, 2924, and 2934 or NDIs 2916, 2926, and 2936 may be transmitted via the first downlink subframe of each SI. In the embodiment, PHICH may also be transmitted via each subframe.

PDCCHs 2914, 2924, and 2934 may contain scheduling information related to downlink data transmitted via subframes configuring an SI. More specifically, PDCCHs 2914, 2924, and 2934 may indicate the same resource area of a number of subframes configuring an SI, so that the terminal can receive data via the indicated area.

In the embodiment, a common NDI for all the processes of an MSS SI may be transmitted. More specifically, according to embodiments, a common NDI for the downlink transmission in the N-2nd SI may be transmitted via the uplink subframe corresponding to the Nth SI. Alternatively, a common NDI for part of the process in the N-1st SI and part of the process in the N-2nd SI may be transmitted via the uplink subframe corresponding to the Nth SI.

In the embodiment as described above, feedback regarding individual processes of an MSS SI may be transmitted. In the embodiment, feedback may be applied to SIs since the first transmission, and may be determined whether it needs to be re-transmitted based on an NDI.

In the embodiment, feedback ACK/NACK may be transmitted according to processes and the NDIs may be commonly transmitted.

Figure 30:
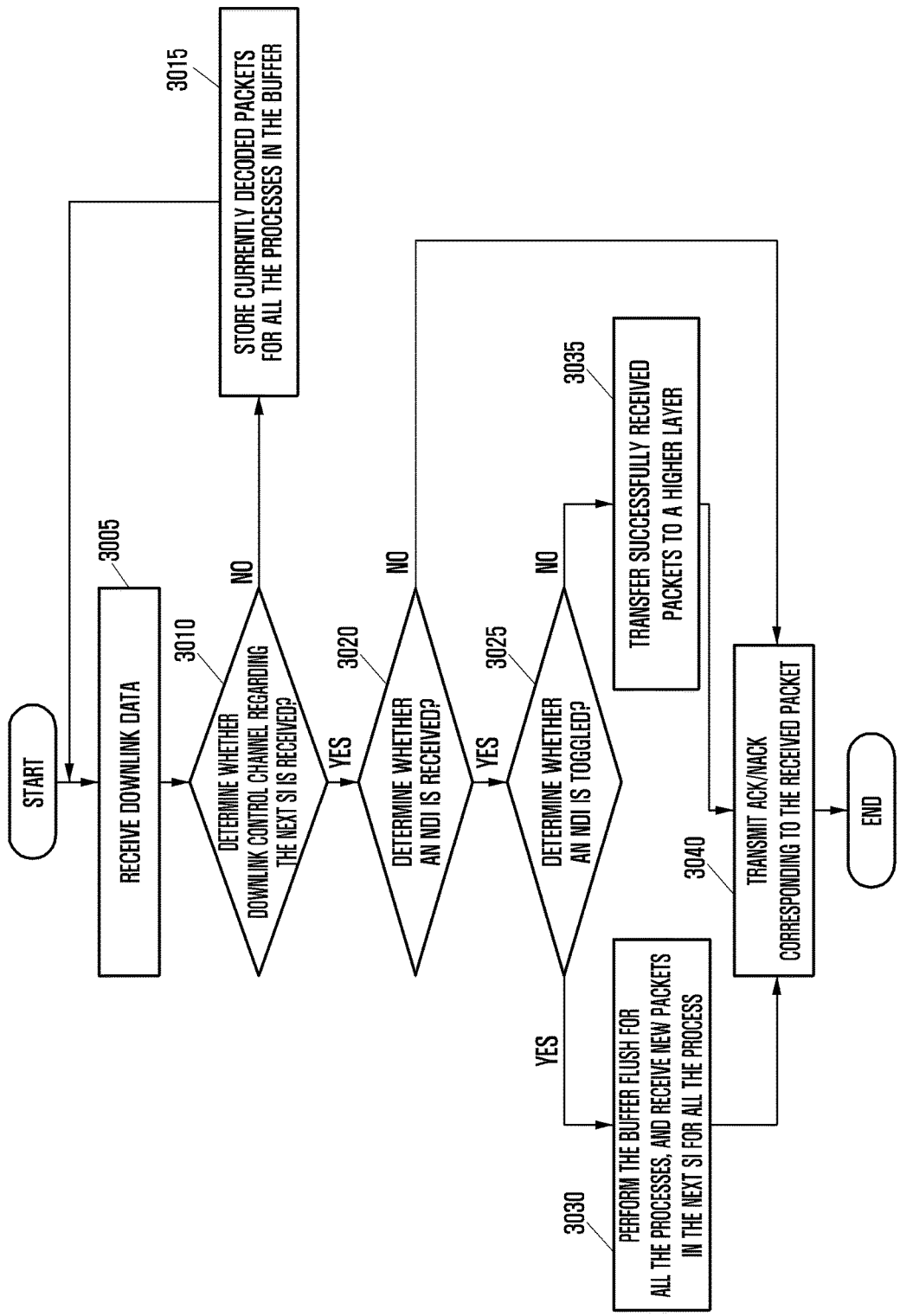
FIG. 30 is a flowchart that describes operations of a terminal according to a ninth embodiment of the present disclosure.

FIG. 30 is a flowchart that describes operations of a terminal according to a ninth embodiment of the present disclosure.

With reference to FIG. 30, the terminal is capable of transmitting/receiving signals to/from a base station.

The terminal is capable of receiving downlink data via at least one subframe scheduled according to downlink control information, in operation 3005. More specifically, as described above in the embodiment, the terminal is capable of receiving: scheduling information regarding a number of subframes via downlink control information; and downlink data considering the repetition transmission.

The terminal is capable of determining whether downlink control information regarding the next SI of the received downlink data is received in operation 3010. In the embodiment, the next SI may be referred to as an SI where an NDI related to the downlink data transmission in the previous process can be transmitted.

When downlink control information has not been received in operation 3010, the terminal is capable of continuing storing decoded packets for all the processes in the buffer in operation 3015.

When downlink control information has been received in operation 3010, the terminal is capable of determining whether an NDI is contained in the received control information in operation 3020. When an NDI is not contained in the received control information in operation 3020, the terminal is capable of transmitting, to the base station, common ACK/NACK information in response to the received packets via the uplink control information in operation 3040.

When an NDI is contained in the received control information in operation 3020, the terminal is capable of determining whether an NDI is toggled in operation 3025. When an NDI is toggled in operation 3025, the terminal ascertains that new data has been transmitted, flushes data corresponding to all the processes, stored in the buffer, and receives new packets in the next SI for all the processes in operation 3030. When an NDI is not toggled in operation 3025, the terminal transfers successfully received packets to a higher layer in operation 3035.

After that, the terminal is capable of transmitting ACK/NACK at a timing corresponding to the received packet in operation 3040.

In the embodiment, with respect to an SI first received since a process is set, the terminal may ascertain that an NDI has been toggled. With respect to data corresponding to the first received SI, the terminal may ascertain that the same data has been re-transmitted. This is because the base station may not determine whether the transmission succeeds before receiving the feedback. Therefore, the terminal may re-transmit data that has been transmitted or may transmit data for another terminal.

Alternatively, the terminal may decode packets corresponding to a process included in a specified SI and may transfer the decoded packets to the buffer until PDCCH for the next SI is transmitted. The terminal may not transfer the decoded packets to a higher layer.

In the embodiment, the terminal may repeat the following operations until an NDI is toggled or the attempt reaches a maximum number of re-transmissions. When an NDI is not toggled, the terminal ascertains that the stored packets have been successfully received, and transfers the packets to a higher layer. When an NDI is toggled, the terminal ascertains that new data is transmitted, flushes in the soft buffer, and stores packets received during the next SI in the buffer.

The terminal is capable of performing the transmission of feedback ACK/NACK in response to the received downlink data at a corresponding timing.

Figure 31:
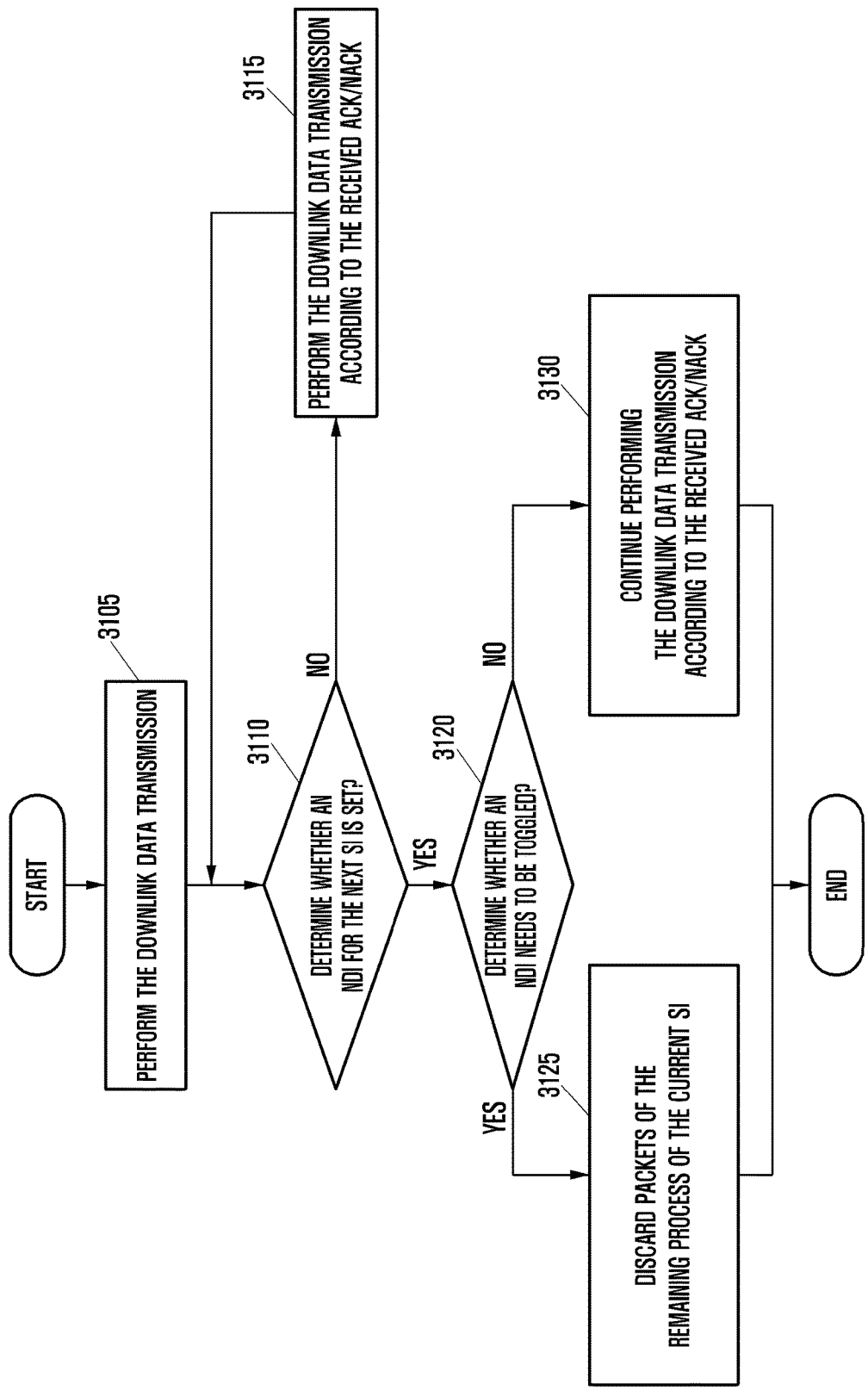
FIG. 31 is a flowchart that describes operations of a base station according to a ninth embodiment of the present disclosure.

FIG. 31 is a flowchart that describes operations of a base station according to a ninth embodiment of the present disclosure.

With reference to FIG. 31, the base station is capable of transmitting/receiving signals to/from a terminal.

The base station is capable of performing the downlink data transmission including the repetition transmission performed in the first transmission in operation 3105.

The base station is capable of determining whether an NDI for the next SI is set in operation 3110. When an NDI for the next SI has not been set in operation 3110, the base station is capable of transmitting, to the terminal, downlink data based on the feedback ACK/NACK information received from the terminal in operation 3115.

When an NDI for the next SI has been set in operation 3110, the base station is capable of determining whether an NDI needs to be toggled in operation 3120. When an NDI needs to be toggled in operation 3120, the base station discards received packets of the remaining process for the current SI in operation 3131. When an NDI does not need to be toggled in operation 3120, the base station continues performing the downlink data transmission according to the received ACK/NACK in operation 3130.

In the embodiment, the base station may ignore an NDI, with respect to the first transmission since a process is set. The base station may perform the compulsory re-transmission until an NDI is set since the first transmission. In the embodiment, the base station continues transmitting data to the terminal, based on feedback ACK/NACK information according to individual processes, until an NDI for the next SI is set.

Figure 32:
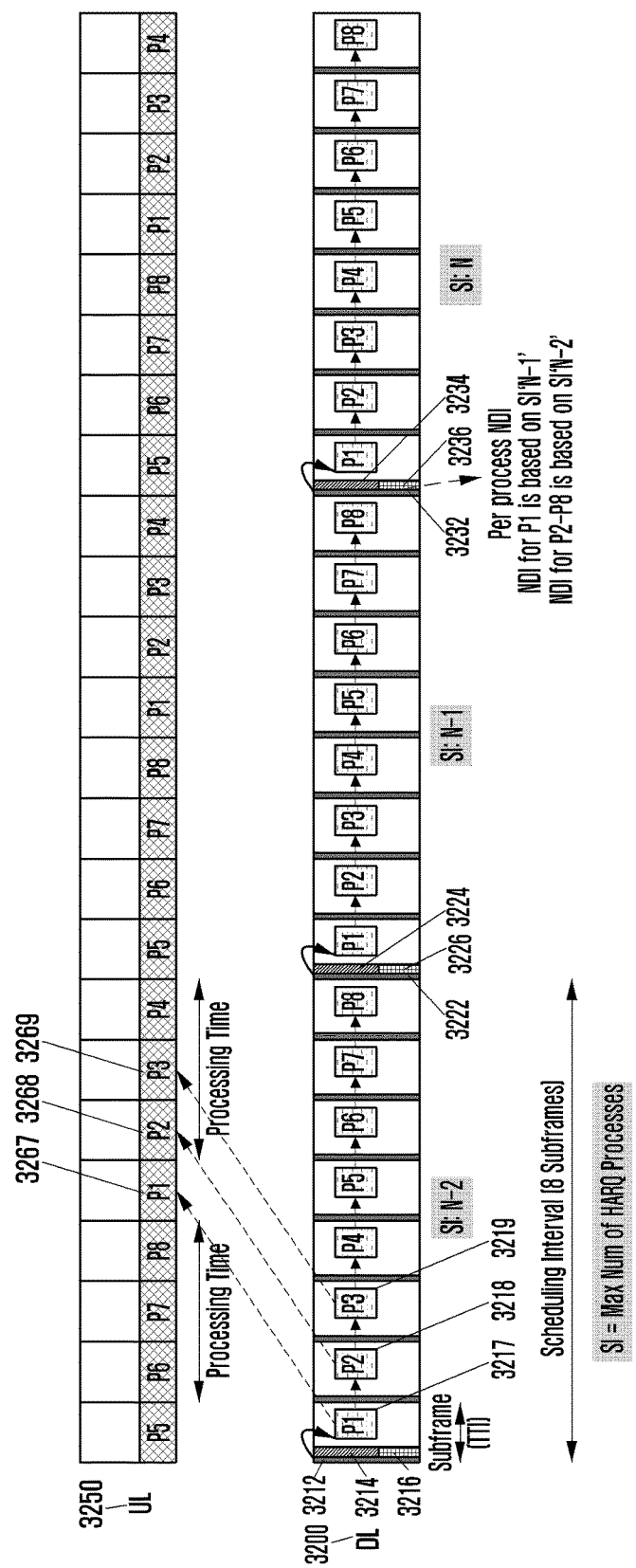
FIG. 32 is a structure of a subframe for a downlink HARQ according to a tenth embodiment of the present disclosure.

FIG. 32 is a structure of a subframe for a downlink HARQ according to a tenth embodiment of the present disclosure.

With reference to FIG. 32, a terminal is capable of receiving, from a base station, control information and data via a downlink channel 3200 and transmitting, to the base station, the feedback ACK/NACK information related to the received downlink data, via an uplink channel 3250. In the embodiment, ACK/NACK information may be transmitted via PUCCH of an uplink subframe corresponding to the received downlink subframe. More specifically, the terminal receives downlink data according to individual processes in reference numbers 3217 to 3219 and transmits the feedback information via reference numbers 3267 to 3269. Therefore, the terminal is capable of promptly transmitting feedback information regarding individual processes to the base station.

In the embodiment, an SI may include eight subframes, and data may be transmitted according to a process corresponding to each subframe. The number of subframes configuring a process may be set to any other value according to embodiments.

In the embodiment, downlink control information containing at least one of the following: PHICHs 3212, 3222, and 3232, PDCCHs 3214, 3224, and 3234 or NDIs 3216, 3226, and 3236 may be transmitted via the first downlink subframe of each SI. In the embodiment, PHICH may also be transmitted via each subframe.

PDCCHs 3214, 3224, and 3234 may contain scheduling information related to downlink data transmitted via subframes configuring an SI. More specifically, PDCCHs 3214, 3224, and 3234 may indicate the same resource area of a number of subframes configuring an SI, so that the terminal can receive data via the indicated area.

In the embodiment, NDIs for individual processes of an MSS SI may be transmitted. More specifically, according to embodiments, a common NDI for the downlink transmission in the N-2nd SI may be transmitted via the uplink subframe corresponding to the Nth SI. Alternatively, a common NDI for part of the process in the N-1st SI and part of the process in the N-2nd SI may be transmitted via the uplink subframe corresponding to the Nth SI. In the embodiment, NDIs may include the formats indicating NDIs according to the individual processes.

In the embodiment as described above, feedback regarding individual processes of an MSS SI may be transmitted. More specifically, according to embodiments, feedback according to individual processes in the downlink transmission of the N-2nd SI may be transmitted via a subframe of a corresponding specified unlink. In the embodiment, feedback may be applied to SIs since the first transmission, and may be determined whether it needs to be re-transmitted based on an NDI.

In the embodiment, feedback ACK/NACK may be transmitted according to processes and the NDIs may also be transmitted according to processes.

Figure 33:
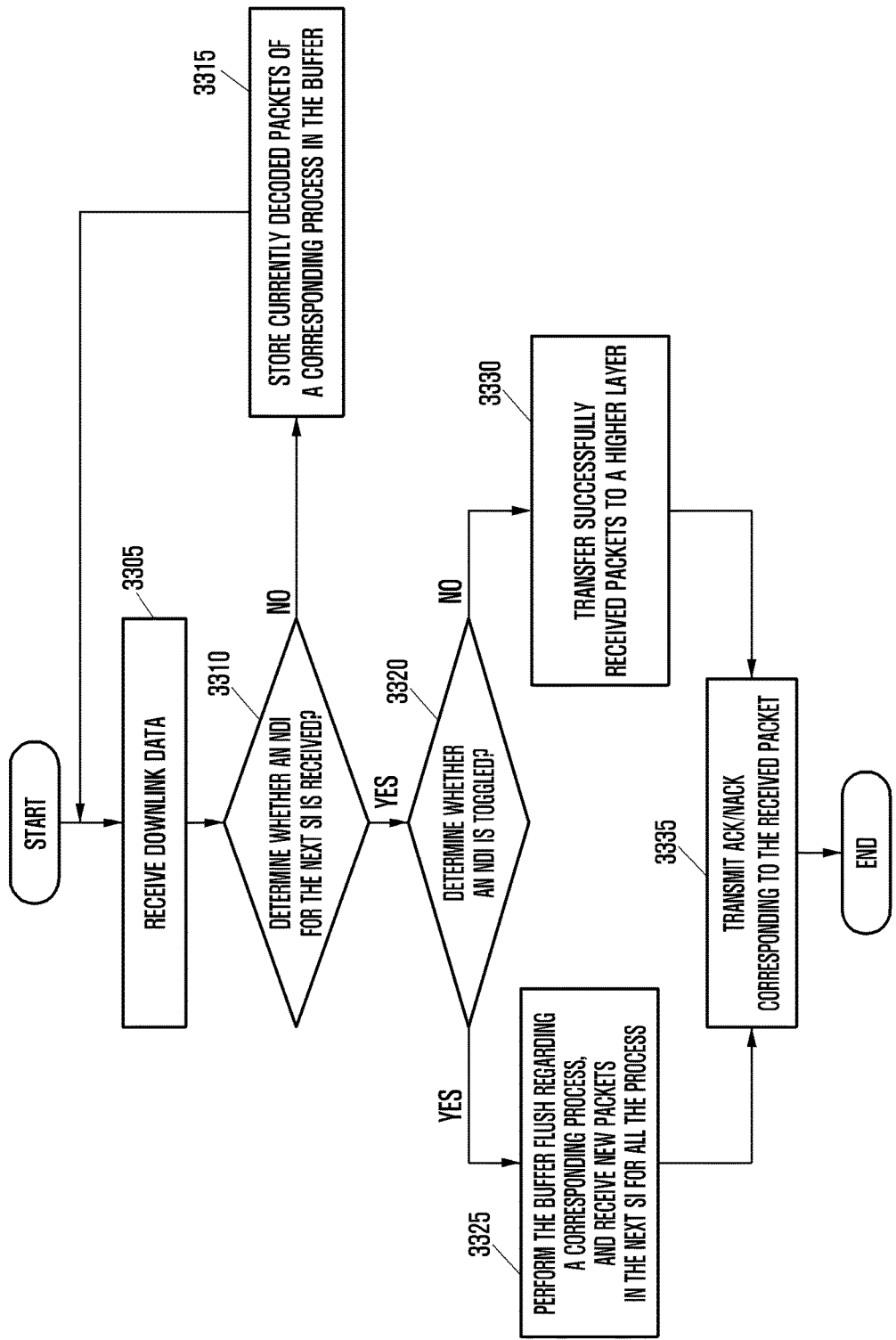
FIG. 33 is a flowchart that describes operations of a terminal according to a tenth embodiment of the present disclosure.

FIG. 33 is a flowchart that describes operations of a terminal according to a tenth embodiment of the present disclosure.

With reference to FIG. 33, the terminal is capable of transmitting/receiving signals to/from a base station.

The terminal is capable of receiving downlink data considering the repetition transmission, via at least one subframe scheduled according to downlink control information, in operation 3305. More specifically, as described above in the embodiment, the terminal is capable of receiving: scheduling information regarding a number of subframes via downlink control information; and downlink data considering the repetition transmission.

The terminal is capable of determining whether an NDI for the next SI is received in operation 3310. When an NDI for the next SI has not been received in operation 3310, the terminal is capable of storing decoded packets, received in a process corresponding to the current SI, in the buffer in operation 3315.

When an NDI for the next SI has been received in operation 3310, the terminal is capable of determining whether an NDI is toggled in operation 3320. In the embodiment, the determination for NDIs may be performed according to processes. When an NDI is toggled in operation 3320, the terminal performs the buffer flush for a corresponding process and receives new packets since the next SI for corresponding processes in operation 3325. When an NDI is not toggled in operation 3320, the terminal transfers successfully received packets to a higher layer in operation 3330.

After that, the terminal is capable of transmitting ACK/NACK via an uplink control channel at a timing corresponding to the received packet in operation 3335.

In the embodiment, with respect to an SI first received since a process is set, the terminal may ascertain that an NDI has been toggled. With respect to data corresponding to the first received SI, the terminal may ascertain that the same data has been re-transmitted. This is because the base station may not determine whether the transmission succeeds before receiving the feedback. Therefore, the terminal may re-transmit data that has been transmitted or may transmit data for another terminal.

Alternatively, the terminal may decode packets corresponding to a process included in a specified SI and may transfer the decoded packets to the buffer until PDCCH for the next SI is transmitted. The terminal may not transfer the decoded packets to a higher layer.

In the embodiment, the terminal may repeat the following operations until an NDI is toggled or the attempt reaches a maximum number of re-transmissions. When an NDI is not toggled, the terminal ascertains that the stored packets have been successfully received, and transfers the packets to a higher layer. When an NDI is toggled, the terminal ascertains that new data is transmitted, flushes in the soft buffer, and stores packets received during the next SI in the buffer.

The terminal is capable of performing the transmission of feedback ACK/NACK in response to the received downlink data at a corresponding timing.

Figure 34:
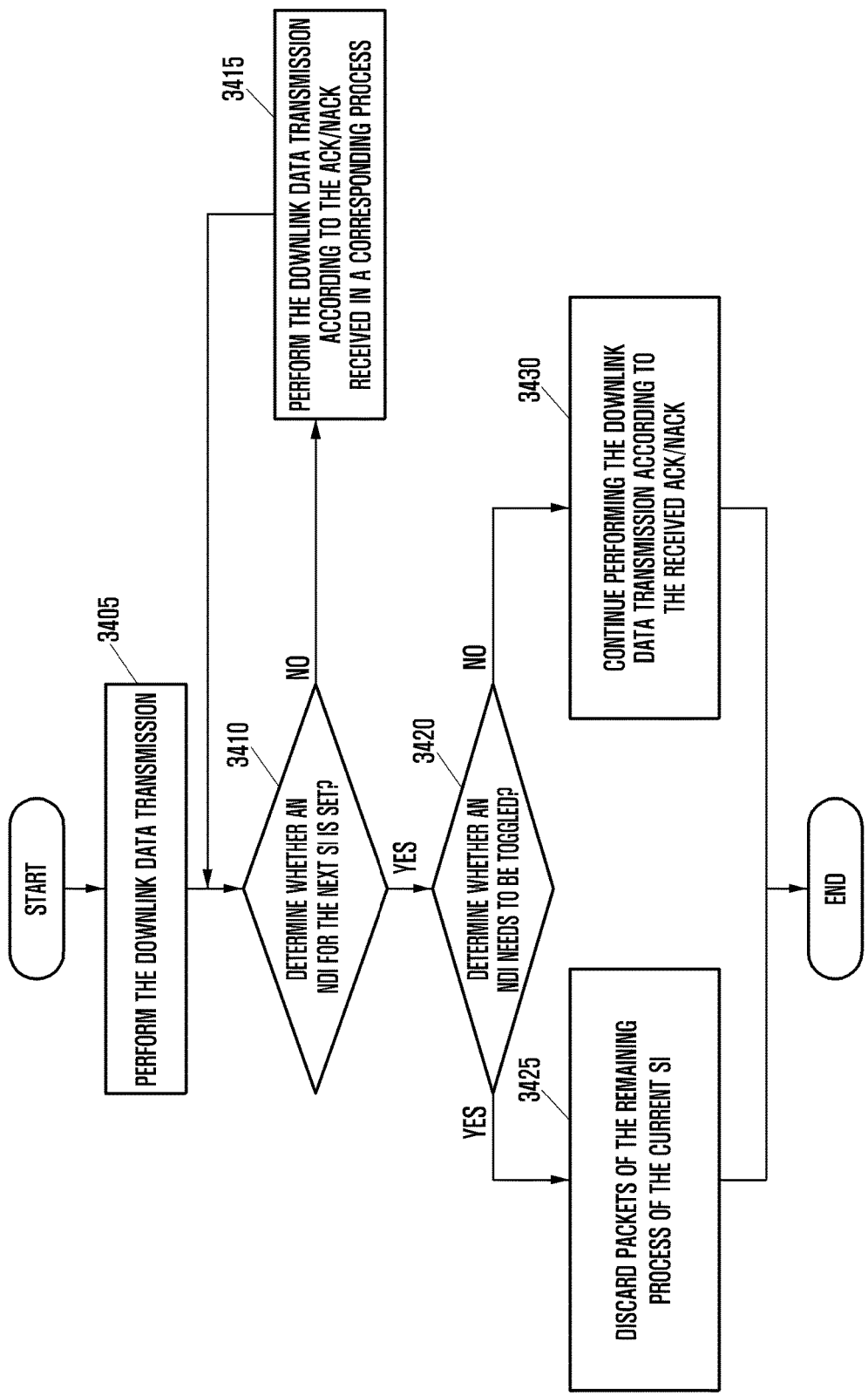
FIG. 34 is a flowchart that describes operations of a base station according to a tenth embodiment of the present disclosure.

FIG. 34 is a flowchart that describes operations of a base station according to a tenth embodiment of the present disclosure.

With reference to FIG. 34, the base station is capable of transmitting/receiving signals to/from a terminal.

The base station is capable of performing the downlink data transmission including the repetition transmission performed in the first transmission in operation 3405.

The base station is capable of determining whether an NDI for the next SI is set in operation 3410. When an NDI for the next SI has not been set in operation 3410, the base station is capable of transmitting, to the terminal, downlink data based on the feedback ACK/NACK information received from the terminal in operation 3415. In the embodiment, NDIs and feedback ACK/NACK information may be specified according to processes.

When an NDI for the next SI has been set in operation 3410, the base station is capable of determining whether an NDI for each process needs to be toggled in operation 3420. When an NDI for each process needs to be toggled in operation 3420, the base station discards received packets of the remaining process of the current SI in operation 3425. When an NDI for each process does not need to be toggled in operation 3420, the base station continues performing the downlink data transmission according to the received ACK/NACK in operation 3430.

In the embodiment, with respect to the first transmission since a process is set, the base station may ignore an NDI. The base station may perform the compulsory re-transmission until an NDI is set since the first transmission. In the embodiment, the base station continues transmitting data to the terminal, based on feedback ACK/NACK information according to individual processes, until NDIs for individual processes included in the next SI are set.

Figure 35:
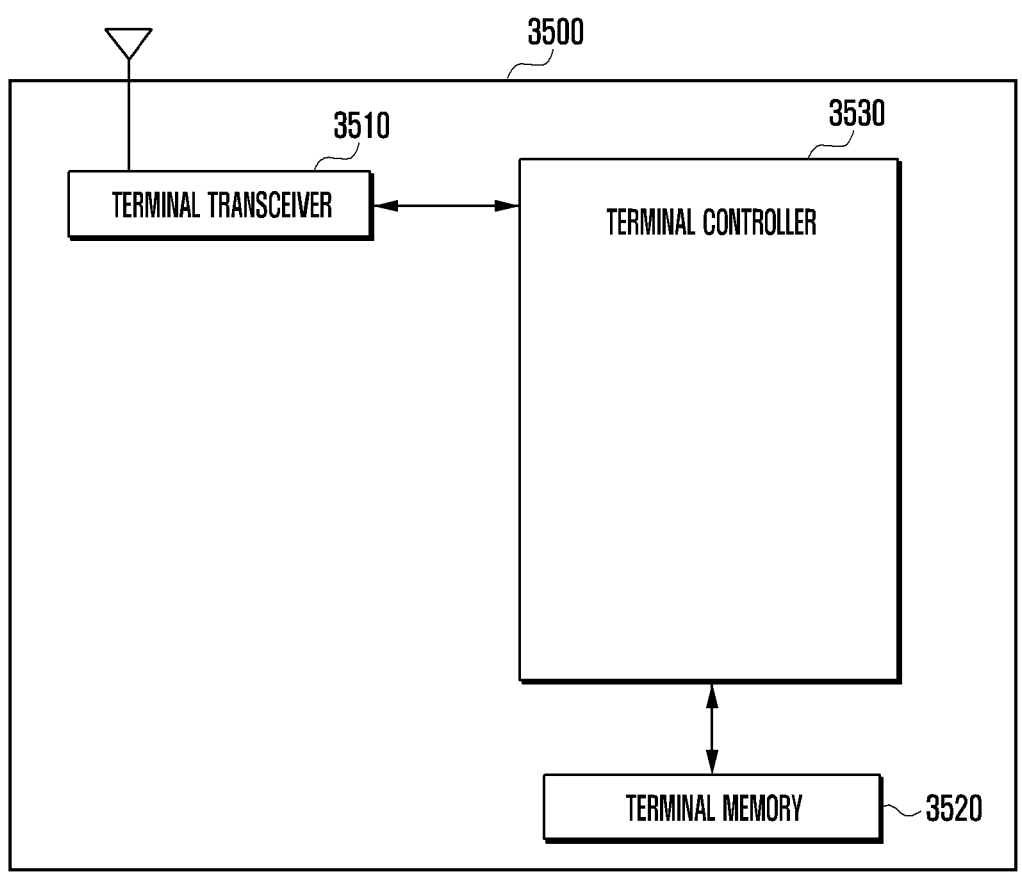
FIG. 35 is a block diagram of a terminal according to embodiments of the present disclosure.

FIG. 35 is a block diagram of a terminal according to embodiments of the present disclosure.

With reference to FIG. 35, the terminal 3500 is capable of including at least one of the following: a terminal transceiver 3510, terminal memory 3520 and terminal controller 3530.

The terminal transceiver 3510 is capable of transmitting/receiving signals to/from an base station. The transmitted/received signals may carry control information and/or data.

The terminal memory 3520 is capable of storing information related to operations of the terminal 3500 and/or information transmitted/received by the terminal transceiver 3510.

The terminal controller 3530 controls the terminal transceiver 3510 and terminal memory 3520. The terminal controller 3530 controls all the operations related to the terminal 3500 according to the embodiment. More specifically, the terminal 3500 transmits/receives signals to/from the base station under the control of the terminal controller 3530, and determines the following operations based on information included in the transmitted/received signals. In the embodiments described above, operations of the terminal are controlled by the terminal controller 3530.

Figure 36:
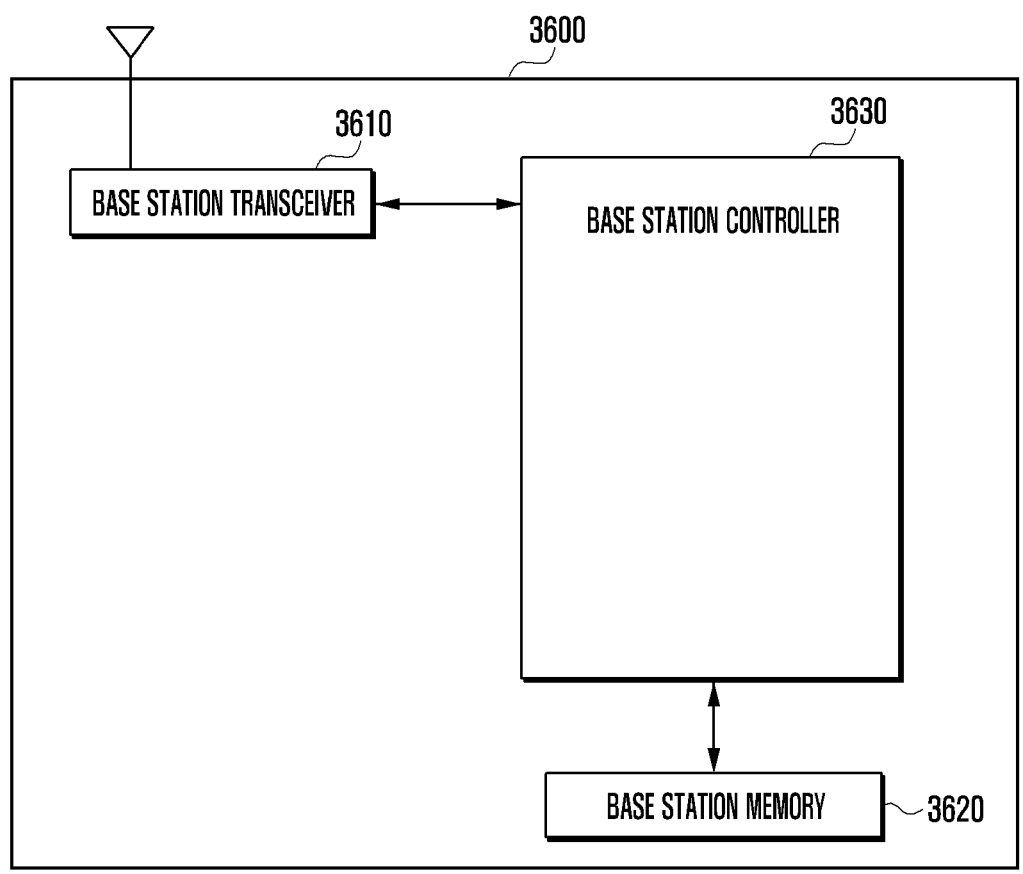
FIG. 36 is a block diagram of a base station according to embodiments of the present disclosure.

FIG. 36 is a block diagram of an base station according to embodiments of the present disclosure.

With reference to FIG. 36, the base station 3600 is capable of including at least one of the following: a base station transceiver 3610, base station memory 3620 and base station controller 3630.

The base station transceiver 3610 is capable of transmitting/receiving signals to/from a terminal or a core network. The transmitted/received signals may carry control information and/or data.

The base station memory 3620 is capable of storing information related to operations of the base station 3600 and/or information transmitted/received by base station transceiver 3610.

The base station controller 3630 controls the base station transceiver 3610 and base station memory 3620. The base station controller 3630 controls all the operations related to the base station 3600 according to the embodiment. More specifically, the base station 3600 performs the transmission/reception of terminal signals under the control of the base station controller 3630, and determines the following operations based on information included in the transmitted/received signals. In the embodiments described above, operations of the base station are controlled by the base station controller 3630.

The terms and words used in the description and drawings are not limited to the bibliographical meanings, but, are merely used by the inventor to enable a clear and consistent understanding of the present disclosure. Accordingly, it should be apparent to those skilled in the art that the description of various embodiments of the present disclosure is provided for illustration purpose only and not for the purpose of limiting the present disclosure as defined by the appended claims and their equivalents.

The invention claimed is:

1. A method by a terminal for transmitting and receiving a signal in a mobile communication system, the method comprising:

receiving, from a base station, control information comprising scheduling information for a plurality of subframes;

transmitting, to the base station, data on a resource determined based on the control information; and receiving, from the base station, feedback information indicating common feedback corresponding to the plurality of subframes for the data in a subframe and a new data indicator (NDI) in the subframe, wherein the NDI is generated based on a number of re-transmissions by the base station.

2. The method of claim 1, wherein the plurality of subframes include a plurality of uplink subframes, wherein the data comprises the plurality of uplink subframes, and wherein the feedback information corresponds to part or all of the data on at least one downlink subframe.

3. The method of claim 1, wherein the NDI is toggled based on the common feedback in response to a transmission that has been attempted N times being NACK, and wherein N denotes a preset number of re-transmissions.

4. The method of claim 1, wherein the common feedback is NACK in a case that at least one of feedbacks corresponding to the plurality of subframes for the data is NACK.

5. A method by a base station for transmitting and receiving a signal in a mobile communication system, the method comprising:

transmitting, to a terminal, control information comprising scheduling information for a plurality of subframes;

receiving, from the terminal, data on a resource determined based on the control information; and transmitting, to the terminal, feedback information indicating common feedback corresponding to the plurality of subframes for the data in a subframe and a new data indicator (NDI) in the subframe, wherein the NDI is generated based on a number of re-transmissions.

6. The method of claim 5, wherein the plurality of subframes includes a plurality of uplink subframes, wherein the data comprises the plurality of uplink subframes, and wherein the feedback information corresponds to part or all of the data on at least one downlink subframe.

7. The method of claim 5, wherein the NDI is toggled based on the common feedback in response to a transmission that has been attempted N times being NACK, and wherein N denotes a preset number of re-transmissions.

8. The method of claim 5, wherein the common feedback is NACK in a case that at least one of feedbacks corresponding to the plurality of subframes for the data is NACK.

9. A terminal in a mobile communication system, the terminal comprising:
a transceiver; and
at least one processor coupled with the transceiver and configured to:
receive, from a base station, control information comprising scheduling information for a plurality of subframes,
transmit, to the base station, data on a resource determined based on the control information, and
receive, from the base station, feedback information indicating common feedback corresponding to the plurality of subframes for the data in a subframe and a new data indicator (NDI) in the subframe,
wherein the NDI is generated based on a number of re-transmissions by the base station.

10. The terminal of claim 9,
wherein the plurality of subframes include a plurality of uplink subframes,
wherein the data comprises the plurality of uplink subframes, and
wherein the feedback information corresponds to part or all of the data on at least one downlink subframe.

11. The terminal of claim 9, wherein the NDI is toggled based on the common feedback in response to a transmission that has been attempted N times being NACK, and wherein N denotes a preset number of re-transmissions.

12. The terminal of claim 9, wherein the common feedback is NACK in a case that at least one of feedbacks corresponding to the plurality of subframes for the data is NACK.

13. A base station in a mobile communication system, the base station comprising:
a transceiver; and
at least one processor coupled with the transceiver and configured to:
transmit, to a terminal, control information comprising scheduling information for a plurality of subframes,
receive, from the terminal, data on a resource determined based on the control information, and
transmit, to the terminal, feedback information indicating common feedback corresponding to the plurality of subframes for the data in a subframe and a new data indicator (NDI) in the subframe,
wherein the NDI is generated based on a number of re-transmissions.

14. The base station of claim 13,
wherein the plurality of subframes include a plurality of uplink subframes,
wherein the data comprises the plurality of uplink subframes, and
wherein the feedback information corresponds to part or all of the data on at least one downlink subframe.

15. The base station of claim 13, wherein the NDI is toggled based on the common feedback in response to a transmission that has been attempted N times being NACK, and wherein N denotes a preset number of re-transmissions.

16. The base station of claim 13, wherein the common feedback is NACK in a case that at least one of feedbacks corresponding to the plurality of subframes for the data is NACK.

* * * * *